(12) United States Patent
Rawlins

(10) Patent No.: US 10,264,530 B2
(45) Date of Patent: Apr. 16, 2019

(54) METHOD, APPARATUS AND SYSTEM FOR RENDERING AN INFORMATION BEARING FUNCTION OF TIME

(71) Applicant: ParkerVision, Inc., Jacksonville, FL (US)

(72) Inventor: Gregory S. Rawlins, Chuluota, FL (US)

(73) Assignee: ParkerVision, Inc, Jacksonville, FL (US)

(*) Notice: Subject to any disclaimer, the term of this patent is extended or adjusted under 35 U.S.C. 154(b) by 0 days.

(21) Appl. No.: 15/411,723

(22) Filed: Jan. 20, 2017

(65) Prior Publication Data

US 2017/0201948 A1    Jul. 13, 2017

Related U.S. Application Data

(63) Continuation of application No. 14/489,121, filed on Sep. 17, 2014, now abandoned.

(60) Provisional application No. 61/878,867, filed on Sep. 17, 2013.

(51) Int. Cl.
*H04M 1/00*      (2006.01)
*H04W 52/02*     (2009.01)

(52) U.S. Cl.
CPC ................. *H04W 52/0261* (2013.01)

(58) Field of Classification Search
None
See application file for complete search history.

(56) References Cited

U.S. PATENT DOCUMENTS 7,027,500 B1 *   4/2006   Casas .................. H04L 25/0307
                                                      348/607
2002/0171476 A1 * 11/2002 Yamamoto ............. H03C 3/406
                                                       330/10

* cited by examiner

*Primary Examiner* — Adolf Dsouza
(74) *Attorney, Agent, or Firm* — Sterne, Kessler, Goldstein & Fox P.L.L.C.

(57) ABSTRACT

An embodiment of the present invention is directed to a method for partitioning an energy or power source. The energy source may be, for example, a battery or batteries or other power supply or power supplies for an electronic device, such as a cell phone, or mobile device. The energy source (battery for example), or power supply, provides power to a cell phone, or mobile device or any other load or power consuming device. Partitioning this energy source is a technique for controlling its operation so that power is provided to the power consuming device, such as a cell phone more efficiently, thereby extending the length of time the phone can be used between re-charging.

13 Claims, 43 Drawing Sheets

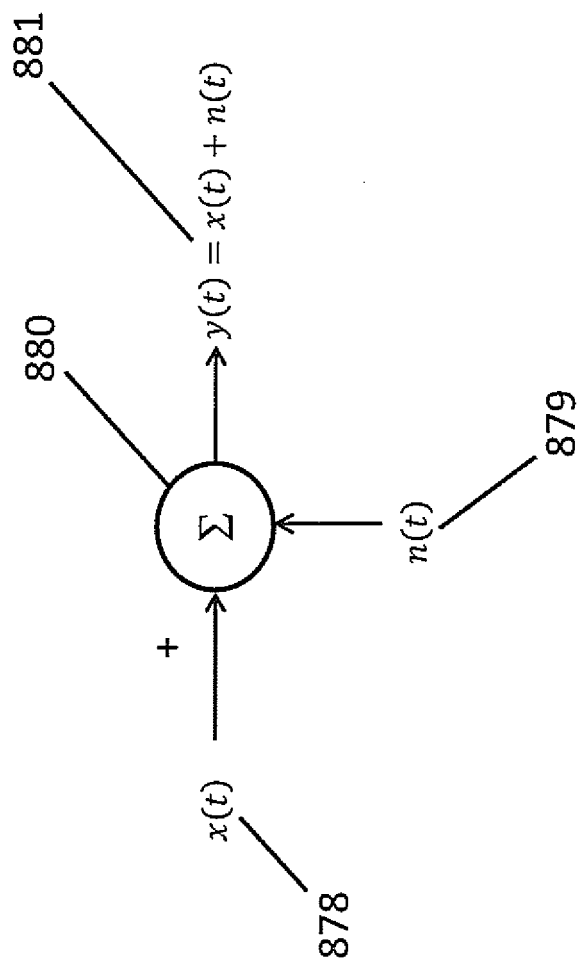

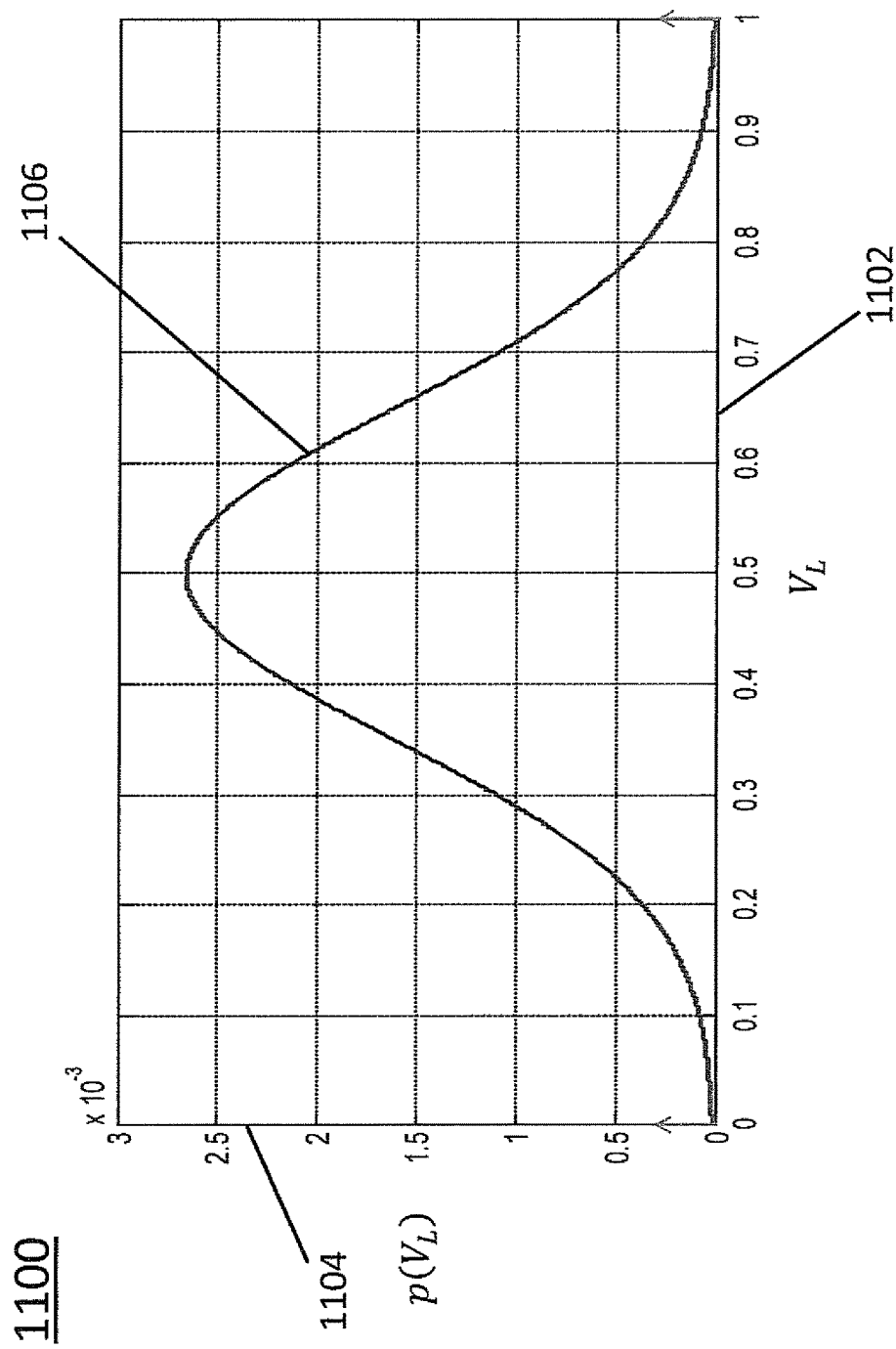

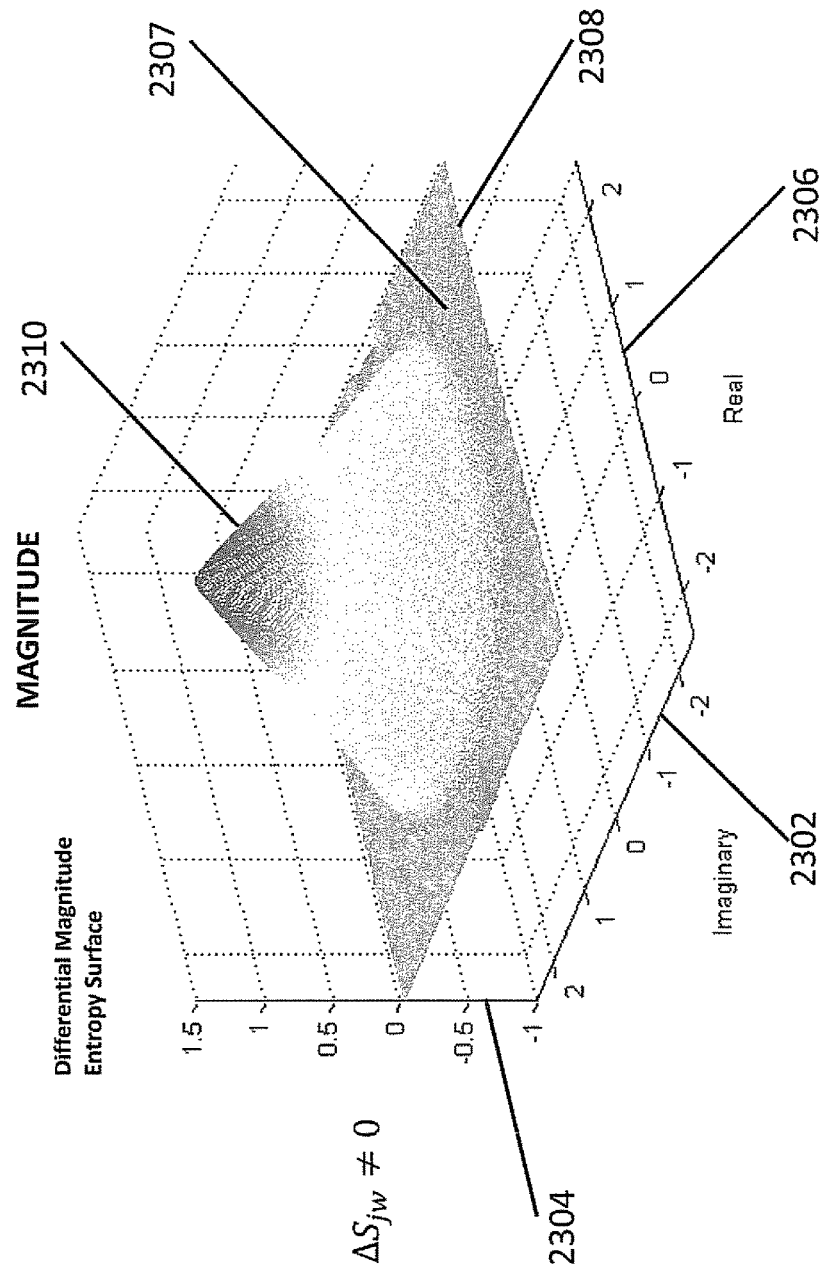

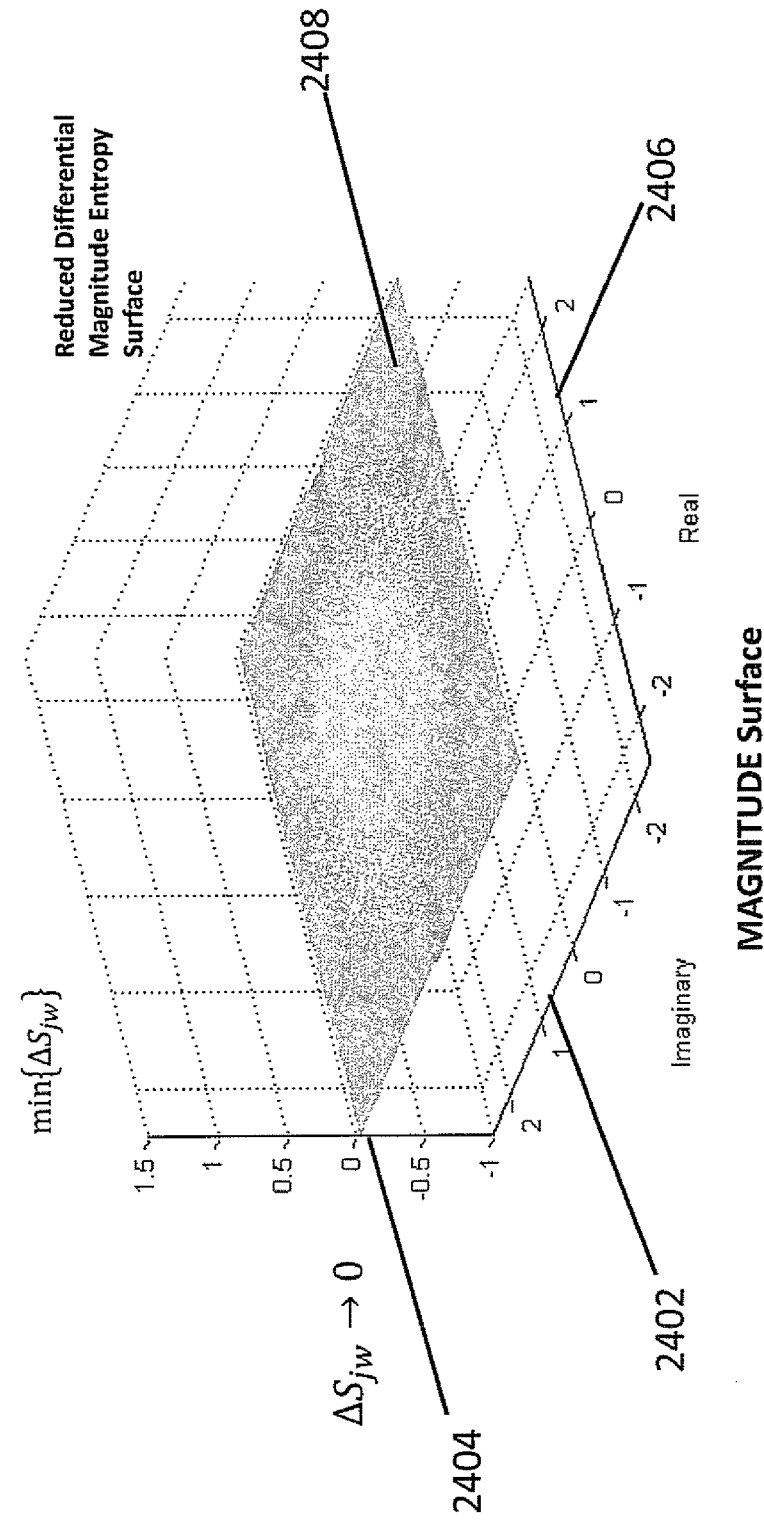

3800

METHOD, APPARATUS AND SYSTEM FOR RENDERING AN INFORMATION BEARING FUNCTION OF TIME

CROSS REFERENCE TO RELATED APPLICATION

This application is a Continuation Application of U.S. Ser. No. 14/489,121, filed Sep. 17, 2014, entitled, "Method, Apparatus and System for Rendering an Information Bearing Function of Time", which claims the benefit of U.S. provisional application 61/878,867 filed on Sep. 17, 2013. Both of which are hereby incorporated by reference in their entirety herein.

BACKGROUND

Field

Embodiments of the present invention relate generally to a method, apparatus and system for rendering an information bearing function of time based on input signals. Embodiments of the present invention present a novel solution to increasing operational battery life and reduced thermal footprint of a cell phone or other communications device, apparatus, module, subsystem or component by using enhanced information distribution and power supply control techniques. More particularly, embodiments of the present invention are directed to rendering the information bearing function of time based on efficient information distribution and without requiring feedback loops or pre-distortion techniques.

Background Discussion

Currently, cell phones and other mobile communications platforms use an integral battery as a power source. The power source has limited storage capacity and users are increasingly demanding better performance from their cell phones. Generally, the cell phone transmitter, and particularly the power amplifier (PA), consumes a significant amount of battery power and generates the most heat when compared with other phone functions. The relative battery power demand of the PA is driven by the RF link budget and PA efficiency. The PA is not efficient because it transmits signals while operating in a substantially linear mode of operation. Both high power output and linearity are required to ensure that the transmissions from the cell phone conform to currently defined industry standards, and to overcome communication link budget deficits. Unwanted heat is generated by the PA because of inefficiencies in PA operation.

Generally, PAs operating in a linear mode, are not particularly efficient, and so, currently, a compromise must be made between battery life and conformance to the defined industry standards. Since the defined industry standards are mandatory and inflexible, the reduced battery life due to the PAs higher power consumption has been expected as a necessary impact.

Several conventional PA techniques have been developed in an attempt to improve operational efficiency of cell phones. Some examples of these conventional techniques include: envelope tracking; pre-distortion; feedback loops; and polar modulation. Other conventional approaches include amplification techniques, which include: Class AB power amplifiers; stage switching amplifiers, or Doherty amplifiers; envelope elimination and restoration amplifiers (EER); and outphasing and linear amplification with non-linear components (LINC) amplifiers. Each of these conventional techniques has drawbacks that make it inadequate. Thus, embodiments of the present invention have innovated in a different direction to overcome the inadequacies of the conventional approaches. Some conventional approaches are described below.

Envelope Tracking

An objective of envelope tracking is to improve the efficiency of power amplifiers (PA) carrying high peak-to-average-power-ratio (PAPR) signals. The need to achieve high data throughput within limited spectrum resources requires the use of linear modulation with high peak to average power. Unfortunately, traditional fixed-supply power amplifiers operating under these conditions have low efficiency. One approach to improve the efficiency of a power amplifier is to vary the amplifier's supply voltage in synchronism with the amplitude envelope of the RF signal. This is known as envelope tracking.

Some types of envelope tracking may include: using direct current (DC) to direct current (DC) converters; power DAC (digital analog converter); and Class "AB" push pull video amplifiers. These are some of the methods used to amplify the amplitude signal. A single amplifier could also be used with Class "A" operation to transfer amplitude information to the carrier envelope. Unfortunately, this is a very inefficient method to transfer envelope energy to the radio frequency (RF) amplifier. Often envelope tracking is used to make slow adjustments to the DC supply only when envelope fluctuations are of relatively low bandwidth. Such an apparatus is not stable or competitively efficient if modulated at a higher rate as needed in present-day cell phones.

Another approach is envelope tracking through adjustment of an amplifier power supply using DC to DC converters. The DC to DC converter output is varied by its output duty cycle in proportion to a desired energy so that the resultant filtered voltage level reproduces an amplitude modulation signal. Unfortunately, a drawback to this approach is that a high modulation rate may not be achieved without distortion and/or stability problems.

In some DC to DC tracking converters the efficiency falls as the load current decreases. This drop is unsatisfactory for optimal modulation restoration techniques since it usually causes performance to fall outside industry specification requirements. Also, another disadvantage to this approach is that such DC converters often require a large, ferrite core inductor to convert the switched energy to envelop power. This undesirably adds to the complexity and cost of the DC converter. Other semiconductor tradeoffs force the issue of reduced efficiency versus power output and bandwidth.

Pre-Distortion

Typically, pre-distortion techniques apply a pre-distorted power amplifier (PA) input signal to a PA. This pre-distorted PA input signal is used to cancel or compensate for inherent distortion of the PA and attempts to improve linearization of the PA. Unfortunately, most digital implementations of pre-distortion utilize digital signal processing (DSP) and software, which can cause resource challenges and consume significant power associated with the management of current PAs, which follow rapid changes in power levels. Moreover, digital implementations of pre-distortion require significant investment of integrated circuit silicon area.

Yet another drawback to pre-distortion techniques is the need to insert a nonlinear module (typically known as a "pre-distorter" module) before the RF power amplifier. This pre-distorter module counters the nonlinear portion of the PA transfer characteristic. Thus the overall system response from input to the output of the PA is linear when compensated by the pre-distortion module. The philosophy of this approach identifies the PA nonlinearity as an undesirable design limitation or weakness which must be removed. Efficiency is not a primary optimization parameter for such schemes.

Adaptive digital pre-distortion is a technique that involves digital implementation of the pre-distorter module and a feedback loop that adapts to changes in the response of the PA due to varying operating conditions. The major drawbacks to this technique are increased power consumption, complexity, size and cost of the system due to the adaptive feedback architecture.

Feedback Loops

As mentioned with respect to pre-distortion above, a feedback loop is a circuit configuration that adapts to changes in the response of the PA due to varying operating conditions. For example, there is a specific type of feedback loop known as a "regenerative feedback loop".

Typically, any RF (radio frequency, which possesses a rate of oscillation in the range of about 3 kHz to 300 GHz, which corresponds to the frequency of radio waves, and the alternating currents, which carry radio signals) feedback oscillator can be operated as a regenerative receiver if modified to provide a controllable reduction in the feedback loop. It also requires coupling the feedback loop to an incoming signal source, and coupling audio frequencies out of the feedback loop to a subsequent audio amplification stage.

Unfortunately, feedback loops, including regenerative feedback loops, require additional components and therefore, increase the power consumption, complexity, size and cost of the circuit. Also, feedback loops introduce a number of waveform distortions that must be addressed. Thus, the feedback loops can actually introduce additional noise and errors into the system. These unwanted imperfections introduced by the feedback loop result in various waveform contaminations which often offset the benefits.

Polar Modulation

Polar modulation is a modulation technique that uses a modulated signal that is both phase modulated (PM) and amplitude modulated (AM). In one example of polar modulation, the low power modulated signal is split into two components: a phase component; and a magnitude component. The phase and increased magnitude components are then combined using an amplifier.

Unfortunately, polar modulation is an inadequate solution because it requires a relatively large sample rate compared to the signal Nyquist bandwidth and often requires the use of pre-distortion in the phase and magnitude. Feedback loops are often employed further complicating solutions at a significant cost in efficiency.

In addition to the conventional techniques described above, the field of power amplification also includes the use of amplifiers such as: Class "AB" Power Amplifiers; Stage Switching and Doherty Amplifiers; Envelope Elimination and Restoration (EER) Amplifiers; and Outphasing and Linear Amplification with Nonlinear Components (LINC) Amplifiers. Each of these amplification techniques suffers drawbacks that make them unsuitable for use with cell phones.

Class "AB" Power Amplifiers

While Class "AB" Power Amplifiers are a mature and popular technology for high production volume RF amplification circuits, such amplifiers suffer numerous drawbacks. For instance, Class "AB" amplifiers achieve only incremental efficiency gains by adaptive bias control, envelope tracking control, and power supply control. There is a detrimental tradeoff between linearity and efficiency. "Over-the-Air" specifications impose minimum linearity requirements such that precise input power backoff is required to balance linearity and efficiency. ("Input power backoff" is a reduction of the output power when reducing the input power. The efficiency of the power amplifier is reduced due to backoff of the output power, because the amplifier operates in a linear region.) Since input power backoff is waveform dependent, the input power backoff must be increased for higher peak to average waveforms, which reduces efficiency making Class "AB" amplifiers less than ideal for many applications.

Stage Switching Amplifiers and Doherty Amplifiers

Another conventional approach is to use either stage switching amplifiers or Doherty amplifiers.

Stage switching amplifiers are typically implemented with switches or staggered bias control, which can be optimized for efficiency at multiple operating points. Stage switching amplifiers have higher average efficiencies than traditional class "AB" power amplifiers when the output power range traverses the operating points and such amplifiers can also be integrated in various semiconductor processes.

Stage switching amplifiers have a number of undesirable drawbacks. For example, stage switching amplifiers are normally constructed using Class "AB" stages and therefore, have all of the limitations of Class "AB" power amplifiers, some of which were described above. These drawbacks include a tradeoff of linearity versus efficiency and heat dissipation.

Doherty amplifiers are another conventional technique. These amplifiers have increased efficiency for higher peak to average ratio waveforms and the carrier power amplifier PA is biased Class "B" amplification. Typically, with Doherty amplifiers, the carrier PA alone supplies the output power over most of the output power dynamic range. The peaking PA is biased as Class "C" amplification and the peaking PA is "off" during most of the output power dynamic range. The peaking PA and carrier PA of Doherty amplifiers both supply output power during waveform peaks.

Doherty amplifiers suffer numerous undesirable performance drawbacks. For example, they require precise control of the input drive and bias of the carrier and peaking PAs (power amplifiers). They also require precise impedance values to ensure minimum distortion crossover performance as well as having all of the limitations of linear Class "B" power amplifiers. As with the case of stage switching amplifiers, Doherty amplifiers also suffer from linearity versus efficiency tradeoff problems. Additionally, Doherty amplifiers have inadequacies due to input backoff considerations, heat dissipation versus linearity tradeoff.

Thus, both stage switching amplifiers and Doherty amplifiers suffer from numerous drawbacks, some of which have been discussed above. These numerous drawbacks result in less than desired performance for many applications.

Envelope Elimination and Restoration (EER) Amplifiers

EER amplifiers separate the phase and amplitude components from a modulated signal. This type of nonlinear power amplifier technology is employed in the phase signal path, which has no amplitude component. The amplitude signal path has no phase component. EER amplifiers can utilize Class "C", "D", "E", "F" and other nonlinear amplifiers.

EER amplifiers are also referred to as Kahn and/or polar amplifiers and are more efficient than Class "AB" power amplifiers at lower output power levels. The EER amplifier permits the bias and power supply voltages to be controlled so as to optimize power consumption at different power levels. Theses amplifiers can be largely integrated in various semiconductor technologies.

However, EER amplifiers (Kahn and/or polar amplifiers) have numerous undesirable characteristics. For example, ERR amplifiers have extreme difficulty maintaining phase signal path and amplitude signal path alignment. Furthermore, small alignment errors will result in the failure to pass most ACPR/ACLR requirements. Additionally, EER amplifiers generally require feedback to achieve linearity requirements. These feedback mechanisms typically involve polar feedback with separate amplitude correction and phase correction loops or Cartesian feedback loops. As discussed above herein, feedback loops greatly reduce amplifier efficiency. The EER amplifiers which utilize DC to DC converter also require the DC/DC converter bandwidth to be greater than the signal bandwidth and are dependent on input waveform linearity. This is a serious drawback since input waveforms must significantly exceed the output linearity requirements.

Another conventional approach has been to use polar amplifiers with Cartesian feedback. It requires a complex demodulator (I/Q (In-Phase/Quadrature) Receiver) for the feedback path. Furthermore, using this approach can cause errors in the complex demodulator such as Quadrature and Amplitude imbalance that will be present on the output signal. Other drawbacks of this approach include: difficulty maintaining feedback loop stability due to path delays from the baseband to the RF output; the complex demodulator reduces the efficiency; and the requirement that the amplitude envelope reconstruction bandwidth must be much greater than the desired output signal bandwidth.

Outphasing and Linear Amplification with Nonlinear Components (LINC) Amplifiers

Outphasing was first proposed by H. Chireix, ("High Power Outphasing Modulation," Proc. IRE, Vol. 23, No. 11, November 1935, pp. 1370-1392 as a method of Generating High Power/High Quality AM Signals with vacuum tubes. Starting around 1975, the term "Outphasing" was supplemented with LINC (Linear Amplification with Nonlinear Components) as the technology was adopted for use in microwave applications. Outphasing, or LINC, is a technique that provides In-Phase and Quadrature Phase Baseband Inputs and incorporates transmitter function. It eliminates the traditional RF transmitter to PA (power amplifier) input interface impedance match, filter, and back-off requirements. LINC is able to utilize multiple nonlinear amplifiers in an attempt to increase amplifier efficiency, favorable thermal characteristics and higher available output power. Indeed LINC does not have any amplitude and phase alignment issues that EER architectures do and LINC also has a simple transfer function. Another advantage of LINC techniques is that In-Phase and Quadrature inputs are transformed into two or more constant envelope signal components.

White LINC has some advantages, as discussed above, the technique suffers serious drawbacks. For example, LINC requires power combiner technology with the accompanying large physical size (quarter wave elements are 3.75 cm (1.5 inches) at 2 GHz and 7.5 cm (3.0 inches) at 1 GHz). Secondly, LINC cannot be integrated without large losses, which causes it to be impractical due to semiconductor die size. LINC also suffers from a relatively narrow practical application bandwidth. Moreover, parametric and temperature variations adversely affect performance. LINC has a limited operational temperature range for optimal performance.

Another significant drawback to LINC techniques is a requirement for isolation between branch power amplifiers. While lossless combiners (reactive elements only) have been used, this creates output waveform distortions. Simple Pi-networks have also been used and create undesired output waveform distortions.

Referring back to outphasing, the phase accuracy requirements and physical size are significant drawbacks. For example, at any given power level, to produce quality waveforms, 40 dB of output power dynamic range is desirable. Therefore, two sinusoids with perfect amplitude and phase balance need to vary between 0 degrees phase and 178.86 degrees phase to achieve a 40 dB dynamic power output range. The accuracy required to achieve 40 dB challenges the tolerance of practical circuits in a high volume application. Thus, this technique is not desirable for current cell phone applications.

With respect to the large physical size required by outphasing, as mentioned previously, quarter wave elements are 3.75 cm (~1.5 inches) at 2 GHz and 7.5 cm (~3.0 inches) at 1 GHz. With such large size requirements, this approach currently cannot be integrated without large losses, whenever quarter wave combiner techniques are used even on a silicon based substrate. Furthermore, it is impractical due to semiconductor die size. Other drawbacks, similar to those mentioned above include: narrow bandwidth; having real losses that adversely affect efficiency; parametric and temperature variations that adversely affect performance; unit-to-unit performance variations that unexpectedly vary loss, isolation, and center frequency. Additionally, outphasing has a limited temperature range for optimal performance and requires isolation between power amplifiers. Similar to LINC described above, lossless combiners (reactive elements only) have been used and create undesired output waveform distortions. Yet another drawback is that outphasing requires significant branch phase accuracy and branch amplitude accuracy to generate waveforms of acceptable quality.

BRIEF SUMMARY

Embodiments of the present invention are directed to methods, apparatus and systems, as well as components of the methods, apparatus and systems that provide blended control, (also known as BLENDED CONTROL BY PARKERVISION™, BLENDED CONTROL BY PARKERVISION™ is a registered trademark of ParkerVision, Inc., Jacksonville, Fla.) that enhances power efficiency or energy efficiency or thermodynamic efficiency (hereafter simply efficiency unless otherwise stated) for base band and RF modulation processes. This BLENDED CONTROL BY PARKERVISION™ utilizes a process of distributing domains of information to various apparatus modulation and encoding functions as well as one or more than one energy source to improve efficiency of communications systems, devices, and components including transmitters. This involves the process of information and energy partitioning, associated with a FLUTTER™ algorithm, (FLUTTER™ is a registered trademark of ParkerVision, Inc., Jacksonville, Fla.).

FLUTTER™ organizes input control signals, derived from the information source, into domains, which when processed and reintegrated, efficiently reconstitute a desired modulation and/or encoding. FLUTTER™ dynamically manipulates multiple degrees of freedom (v+i) in hardware and/or software, which control the magnitudes and phases of partitions, whilst allocating quantities of information per partition.

One novel embodiment of the present invention includes utilizing FLUTTER™ to render an information bearing function of time, which includes waveforms and/or signals and/or a combination of waveforms and signals, an RF modulated waveform, and/or an RF modulated carrier signal. The FLUTTER™ process includes compositing multiple signals, for example, three or more signals, to render the information bearing function of time, or a representation, or facsimile thereof, such as electronic data representing the information bearing function of time. These signals may include one or more phase functions and two or more amplitude functions. The compositing process includes processing constituent signals substantially simultaneously (or concurrently or in parallel), with each constituent signal assigned a weighting factor dependent on the information distributed by the constituent signal, the efficiency associated with the constituent signal statistical distribution and the efficiency for reintegrating constituent signals to form a desired information bearing function of time. Compositing may also include mapping of one or more signals or portions of one or more signals to ranges or domains of functions and their subordinate values according to a dynamic co-variance or cross-correlation of the functions distributed within blended controls to an apparatus that generates a desired output signal or signals. The composite statistic of the blended controls is determined by at least one information source with information entropy of H(x), the number of the available degrees of freedom for the apparatus, the efficiency of each degree of freedom, and the corresponding potential to reliably distribute a specific signal rate and information in each degree of freedom. Compositing includes a dynamically and statistically weighted calculation of a desired complex signal in terms of the encoded information, complex cross-correlations of subordinate functions, compositing signals and minimized waste energy per unit time. Furthermore, the compositing signals may have different bandwidths, and spectral distributions. The desired output composted signal may be an RF carrier signal or a base band signal. The desired output RF carrier or baseband signal may also exist at variable power levels.

A communications platform transmitter based on FLUTTER™ and BLENDED CONTROL BY PARKERVISION™ generates a desired communications signal at the proper signal level and frequency. The results of employing FLUTTER™ and BLENDED CONTROL BY PARKERVISION™ algorithms and architectures are increased efficiency, lower thermal footprint and universal signal construction. For example, using these algorithms and architectures, mobile communications devices can operate longer per battery charge cycle while running cooler. In addition, modern digital communications standards as well as Legacy modulation standards are accommodated.

FLUTTER™ significantly reduces the effective sampling rates and/or bandwidths as well as agile power source resolution critical to certain aspects of signal envelope reconstruction when compared to Legacy technologies. FLUTTER™ greatly relieves the specification of agile power supply design used in complex signal envelope construction. While current technology approaches seek to increase sample rates and resolution of switched power supplies to increase envelope reconstruction bandwidths and quality, FLUTTER™ enables the minimum information distributed to one or more agile power sources utilized as part of a desired complex signal reconstruction process.

Unlike legacy technologies, average complex envelope sample rates in the power source path may be tailored to fall below the Nyquist reconstruction sample rate using FLUTTER™, if so desired. Compliant signals may be created by the composite of sparsely sampled power sources with (i) degrees of freedom and additional (v) degrees of freedom within various encoding and modulation functions of the transmitter. Given a certain information entropy allocated to agile power source utilization, FLUTTER™ is the most efficient approach. The FLUTTER™ algorithm selects from a minimum number of specifically tailored power source metrics, distributed at irregular sample intervals of time dependent on envelope statistics, whilst assisting the other degrees of freedom in the transmitter in the process of signal envelope construction. Furthermore, this can be accomplished with an open loop feed forward (OLFF) algorithm if so desired. The feed forward approach can also be accompanied by a maximum pursuit of nonlinearity in a plurality of parallel algorithm paths to further enhance efficiency whilst preserving ultimate output signal integrity. Legacy approaches such as envelope tracking, Kahn's technique and envelope restoration, utilize Nyquist or greater sampling rates, distributing samples at regular intervals of time, in the power supply path to construct signal envelopes. Often these techniques utilize feedback algorithms to enhance quality and compensate for nonlinearities, in contrast to FLUTTER™. The sampled power supply values are not optimal, like values determined through FLUTTER™. Rather, they are determined through standard sampling approaches to follow the magnitude of a desired envelope at specific regular sample instants (sample instants are independent of signal envelope statistics) while interpolating between these sampled values, primarily using filtering technologies.

FLUTTER™, provides the maximum practical efficiency for signal envelope construction given finite energy or power supply resources and the desire to minimize energy or power supply resource performance requirements when those resources are dynamic.

One Embodiment: Partitioning an Energy Source

One embodiment of the present invention is directed to a method for partitioning an energy or power source. The energy source may be, for example, a battery or batteries or other power source or power supplies for an electronic device, such as a cell phone, or mobile device. The energy source (battery for example), or power supply, provides power to a cell phone, or mobile device or any other load or power consuming device. Partitioning this energy source is a technique for controlling its operation so that power is provided to the power consuming device, such as a cell phone more efficiently, thereby extending the length of time the phone can be used between re-charging. Each energy partition has one or more associated sample regions. A sample region corresponds to a range of voltage and current, from which metered quantities may be extracted, acquired, generated or sampled and allocated to power the electronic device, including circuits used for transmission and reception of information bearing functions of time. A sample region includes one or more samples that can be used to render a representation of a signal (information bearing function of time). This representation may be a reconstruction or rendering. The number of partitions and their associated metrics are a function of a desired efficiency to render the desired signal.

In one embodiment of the present invention, the number of partitions is bounded by a desired resolution $i \leq 2^K$ where;

i=number of partitions; and

K=desired resolution for rendering the signal (information bearing function of time).

Thus, the number of partitions (i) is less than or equal to 2 raised to the $K^{th}$ power.

A desired signal typically includes information, such as data that is encoded on a waveform.

The signal (information bearing function of time) that is rendered, using the partitioning method described herein, can have an information entropy value from zero to a maximum value determined by the dynamic range and ability to access or create resolution of the signal. The entropy value represents the degree of signal uncertainty; the greater the entropy the greater the uncertainty and information content.

The partitioning method described above can also utilize auxiliary degrees of freedom to determine one or more rendering parameters of a particular partition. The auxiliary degrees of freedom possess the quality of, for example, a dimension, or dimensions, or subset of a dimension, associated with a conceptual mathematical space known as phase space into which energy and/or information can individually or jointly be imparted and represented. Such a phase space may be multi-dimensional and sponsor multiple degrees of freedom. A single dimension may also support multiple degrees of freedom. There may be a number, up to and including v, of auxiliary degrees of freedom associated with each one of the i partitions. i is typically a number of power source partitions in a FLUTTER™ algorithm. Thus the v degrees of freedom are associated with other aspects of information encoding functions. Hereafter v, i and auxiliary degrees of freedom will be referred to as desired degrees of freedom unless otherwise stated.

Another embodiment of the present invention is directed toward the partitioning method described above wherein the partitioning method has parameters for rendering (i.e. rendering parameters) the signal (i.e., the information bearing function of time). The rendering parameters or rendering functions may be expressed as, for example, an amplitude function, a phase function, a frequency function, or combinations and permutations of amplitude functions, phase functions and frequency functions. The amplitude function may be, for example, a voltage or current versus time or a discrete set of sample values versus sample number or discrete time increment. The phase function may be for example a phase angle versus time or a discrete set of sample values versus sample number or discrete time increment. The frequency function may be, for example, a frequency versus time or a discrete set of sample values versus sample number or discrete time increment. Also, amplitude, phase, and frequency may be interrelated by functions. In addition, rendering parameters may also consist of operational constants along with some number of rendering functions. Rendering parameters can be obtained and assigned from knowledge of the signal and characterization of the apparatus used for signal construction. Rendering parameters are coordinated by and distributed by blended controls, which manipulate one or more degrees of freedom within the apparatus.

Yet another embodiment of the present invention is directed to the partitioning method described above in which the energy source (for example, one or more batteries) may be associated with a plurality of domains. Domains include a range of values or functions of values relevant to mathematical and/or logical operation or calculation within the FLUTTER™ algorithm. Domains may apply to multiple dimensions and therefore bound hyper-geometric quantities or objects and they may include real and imaginary numbers or sets of mathematical and/or logical functions or objects. Domains may be identified using subsets of the values from (v, i) indices the desirable degrees of freedom for the system or apparatus. (v, i) may be used to specify blended controls and associated functions. Domains may be associated with sub spaces of the phase space.

Yet another embodiment of the present invention is directed to the partitioning method described above and also utilizes current differentials. These current differentials provide energy to each partition in charge increments. In this case differential refers to a difference between some desired value and some preferred reference value.

Yet another embodiment of the present invention is directed to the partitioning method described above and also utilizes electromagnetic (EM) field differentials. These EM field differentials provide energy to each partition. In this case differential refers to a difference between some desired value and some preferred reference value.

Yet another embodiment of the present invention is directed toward the partitioning method described above wherein the energy source is either a fixed energy source or a variable energy source. A fixed energy source provides access to a fixed potential or rate of charge from one or more sources. A variable energy source provides access to a variable potential or rate of charge from one or more sources.

Yet another embodiment of the present invention is directed to the partitioning method described above and also includes defining a voltage domain as a function of $V_\xi - V_{\xi-1} = \Delta V_i$ where $\xi$ is a sample increment number. The voltage domain may be fixed or adjustable. A fixed voltage domain does not change. An adjustable voltage domain is adjustable over a range of $\Delta V_i$, or a multiplicity thereof. The adjustment may also be based on $H(x)_{v,i}$ or $H(x)_{v_i}$, a set of entropy functions dependent on a number of transmitter degrees of freedom and power source degrees of freedom. In this instance, $v_i$ is an index for blended controls for one or more degrees of freedom within a regulator apparatus, where v is a number of degrees of freedom and i is a power source partition number.

Yet another embodiment of the present invention is directed to the partitioning method described above and includes using at least a portion of prior knowledge to construct a complex signal envelope. The prior knowledge is information about the desired signal (information bearing function of time) that is known prior to the rendering of the signal. This prior knowledge is used in the partitioning procedure to determine partition metrics, and may include statistical characterization.

Yet another embodiment of the present invention is directed to the partitioning method described above and also includes parsing the system input information H(x) into constituent information functions $H(x)_{v,i}$ and/or $H(x)_{v_i}$ to form domains. Domains may possess jointly-statistically dependent functions of the constituent entropy sets $H(x)_{v,i}$, $H(x)_{v_i}$.

Yet another embodiment of the present invention is directed to the partitioning method described above and also includes adjusting v, i and/or $v_i$ based on, signal statistics and apparatus characterization, where v is an index for blended controls for one or more degrees of freedom.

Yet another embodiment of the present invention is directed to the partitioning method described above, wherein the partitioning step described above also includes generating a blended control function. The blended control function can be expressed as function $\tilde{\mathfrak{S}}\{H(x)_{v_i}\}$ and/or $\tilde{\mathfrak{S}}\{H(x)_{v,i}\}$ where v=1, 2, 3 . . . , and i=1, 2, 3, . . . . The blended control function is used to construct signals via the control of apparatus degrees of freedom. The blended control function may use a plurality of paths, including parallel paths, and may also include at least a partial cross-correlation between related domains.

Yet another embodiment of the present invention is directed to the partitioning method described above, wherein the blended control function excludes cross-correlation between domains. In this embodiment, the blended control function operates independent of cross-correlation.

Yet another embodiment of the present invention is directed to the partitioning method described above and also includes calculating and/or approximating a statistical dependence for the correlations and creating a composite statistic from the blended controls.

Yet another embodiment of the present invention is directed to the partitioning method described above and also includes establishing one or more paths for the partitioning procedure. FLUTTER™ can manipulate partitions which are based on any relevant dynamic operational parameter. For example, FLUTTER™ can manipulate energy, momentum, voltage, current, and entropy partitions. Manipulations of these quantities contain portions of the information of a desired signal distributed in blended controls to parallel segments of a transmitter apparatus. Information may be encoded in complex values (magnitude and phase) for each blended control path.

Yet another embodiment of the present invention is directed to the partitioning method described above and also includes switching a power source or other partition resource at a rate less than a sampling rate. This may also include switching the power source or other partition resource at a rate less than or equal to the Nyquist rate associated with a rendered output signal. This may also include switching a power supply or other energy partition resource at a rate greater than the Nyquist rate. This may include switching a power supply at irregular intervals. This may also include switching a power supply or other partition resource at a rate different than the rate used to reconstruct an output signal.

Yet another embodiment of the present invention is directed to the partitioning method described above and also includes establishing sampling rates related to domains. In this embodiment information entropy and entropy rate within the domain may be used to determine the domain sampling rate.

Yet another embodiment of the present invention is directed to the partitioning method described above and also includes establishing domain bandwidths. Bandwidths associated with processing domains may be less than a rendering bandwidth for a desired output signal.

Yet another embodiment of the present invention is directed to the partitioning method described above wherein one or more blended control paths manipulate energy partitions. The blended control paths can adjust the relative weight and access to degrees of freedom of any partition. The blended control paths, being dynamic, can vary as the information bearing function of time evolves.

Yet another embodiment of the present invention is directed to the partitioning method described above and also includes coordinating at least two partition paths based on one or more parameters of the information bearing function of time. Thus, partition paths may be structured depending on parameter(s) of the information bearing function of time (signal). The parameters of the information bearing function of time include, for example, functions of phase, and/or functions of amplitude, entropy, and efficiency.

Yet another embodiment of the present invention is directed to the partitioning method described above and also includes utilizing one or more partitions based on one or more energy sources.

Yet another embodiment of the present invention is directed to the partitioning method described above and also utilizes a prior characterization of a system response. The prior characterization can be used to determine the number of partitions, their associated metrics and associated sample rates. As described herein, the prior characterization of the system response is information about the signal that is known prior to the rendering of the signal.

Yet another embodiment of the present invention is directed to the partitioning method described above and also includes coordinating one or more FLUTTER™ algorithm parameters. These FLUTTER™ algorithm parameters may include, for example, statistics, ranges, domains, logic functions and/or metrics. The coordinating is a function of one or more transmitter parameters. The transmitter parameters may include, for example, power control states, temperature, power supply levels, antenna interface circuit impedance, waveform statistics, data rate, channel frequency, GPS coordinates, accelerometer data, compass information, and spatial orientation.

Yet another embodiment of the present invention is directed to the partitioning method described above, wherein one or more of the energy partitions are statistically allocated. The one or more of the energy partitions are allocated to transition between constellation points within a phase space. The energy partitions are allocated based on a radial difference of an average of a particular portion of phase space relative to the phase space center, where a radial value of zero is designated as the center position of the phase space. Different energy partitions possess different radial values.

Yet another embodiment of the present invention is directed to the partitioning method described above, wherein one or more of the energy partitions are allocated based on Peak to Average Power Ratio (PAPR) statistics of the rendered information bearing function of time.

IN Yet another embodiment of the present invention is directed to the partitioning method described above and also includes imparting information embedded within the functions $\tilde{S}\{H(x)_{v,j}\}$ and/or $\tilde{S}\{H(x)_{v,i}\}$ to one or more information domains from one or more information sources to interface to an RF signal modulation architecture. This information includes any data suitable for application.

Yet another embodiment of the present invention is directed to the partitioning method described above and also includes modifying an operational state of a power supply during the partitioning procedure. This modification may be for example, turning the power supply "on" or "off". This modification may also include switching between two or more power sources during the partitioning procedure. This modification may also include adjustment of two or more power sources during the partitioning procedure.

Yet another embodiment of the present invention is directed to the partitioning method described above in which one or more partitions are allocated based on efficiency of operation. Efficiency of operation may be determined by apparatus characterization, rendered signal statistics (such as PAPR), by a process of associating volumes of phase space with associated domain functions, in part based on rendered parameters. This process is used to develop blended controls. The blended controls can be used to coordinate partitions.

Another Embodiment: Generating an Information Bearing Function of Time

Yet another embodiment of the present invention is directed to a method to generate an information bearing function of time. The information bearing function of time may be, for example, a signal or waveform, RF modulated signal, representation of a signal, such as electronic data stored on a computer-readable medium, an information bearing energetic function of time and space that enables communication, or a modulated RF carrier waveform, having a dynamic range of approximately between 20 dB to 174 dB. The modulated RF carrier waveform may have one or more power levels. This method may be facilitated by storage on a computer-readable medium, such as software, or RAM (Random Access Memory) ROM (Read Only Memory), PROM (Programmable Read Only Memory), EEPROM (Electrically Erasable Programmable Read Only Memory), non-volatile memory, flash memory, memory stick, or other suitable electronic storage medium.

This method includes utilizing a mathematical description of modulation and characterization of apparatus based on prior knowledge of the apparatus. This mathematical description or substantially equivalent functional representation provides a model suitable for describing the modulation and/or information encoding process of the apparatus. A functional description of an original data set is generated and an estimation is also generated. The estimation function represents an approximation of a deviation from an expected, or desired, function of a signal compared to a signal at the output of the apparatus model. One or more values for the output information bearing function of time (signal) are calculated based on real-time input samples, apparatus characterization and/or real time measurements, and used to develop the estimation function. The real-time input samples are signals or other inputs received by the system.

Yet another embodiment of the present invention is directed to the method to generate an information bearing function of time in which the mathematical description of modulation includes real and imaginary components. The mathematical description includes digital I and Q components. The I-components include "In-phase" and the Q-components include "Quadrature-phase".

Another Embodiment: Rendering a Representation of an Information Bearing Function of Time Yet another embodiment of the present invention is directed to a method for rendering a representation of an information bearing function of time. The information bearing function of time may be a signal or a waveform, or an RF carrier signal or a modulated RF carrier waveform.

The method includes accessing parameters of a desired information bearing function of time. These parameters include, for example, amplitude, phase, frequency or functions thereof and may be based on prior system knowledge. Multiple signals are composited to form a desired output signal. Compositing includes, for example, mapping one or more signals or portions of one or more signals to ranges or domains of functions and their subordinate values. Mapping is accomplished according to the FLUTTER™ algorithm. FLUTTER™ manages the apparatus functions which generate the constituent signals of the blended controls. The composite statistic of the blended controls is determined by an information source with source entropy of H(x), the number of the available degrees of freedom for the apparatus, the efficiency of each degree of freedom, and the corresponding potential to distribute a specific signal rate as well as information rate in each degree of freedom. A representation of the desired information bearing function of time is rendered based on the compositing step. The rendering may be an output signal or waveform, or an electronic representation stored on an electronic medium, such as a computer-readable medium.

Yet another embodiment of the present invention is directed to the method for rendering a representation of an information bearing function of time, as described above, wherein the compositing step includes managing a covariance of statistical parameters of constituent signals. Functions of the constituent signals are reintegrated in the compositing process to form a desired output signal.

Yet another embodiment of the present invention is directed to the method for rendering a representation of an information bearing function of time, as described above, wherein the compositing step includes cross-correlations. The cross-correlations are measurements or calculations of similarity between two or more waveforms and/or signals.

Yet another embodiment of the present invention is directed to the method for rendering a representation of an information bearing function of time, as described above, wherein the compositing step includes calculations or measurements of statistical dependencies. The statistical dependencies include, for example, a condition in which two or more random variables are not statistically independent.

Yet another embodiment of the present invention is directed to the method for rendering a representation of an information bearing function of time, as described above, wherein the composited signals include one or more subsets of signals.

Yet another embodiment of the present invention is directed to the method for rendering a representation of an information bearing function of time, as described above, wherein compositing consists of a function of three or more signals. This set of signals may include, for example, two or more amplitude functions and one or more phase functions. Indeed, each of the two or more amplitude functions may have an associated spectral distribution and respective bandwidths. For example; the first amplitude function has a first spectral distribution and the second amplitude function has a second spectral distribution; the first spectral distribution and bandwidth being different than the second spectral distribution and bandwidth. In a like manner the multiplicity of phase functions may possess unique spectral distributions and bandwidths.

Yet another embodiment of the present invention is directed to the method for rendering a representation of an information bearing function of time, as described above, wherein two or more functions (amplitude and/or phase) have an associated spectral density. Indeed, a first function has a first spectral density and a second function has a second spectral density; these first and second spectral densities being at least partially statistically independent of one another or partially uncorrelated.

Yet another embodiment of the present is directed to the method for rendering a representation of an information bearing function of time, as described above, wherein the parameters of a desired information bearing function of time are based, at least in part, on prior knowledge obtained by apparatus characterization.

Another Embodiment: Generating an Information Bearing Function of Time Using a Synthesizing Step Yet another embodiment of the present invention is directed to a method for generating an information bearing function of time, or a representation thereof, that includes identifying one or more characteristics of an information bearing function of time. The information bearing function of time may be, for example, a signal, waveform, RF modulated signal, an RF carrier signal, or wave representation or composite waveforms. A representation, such as a waveform, signal, data set, electronic rendering or other manifestation, of the information bearing function of time may be synthesized based upon a composition or compositing of multiple signals.

The composition or compositing includes mapping of one or more signals or portions of one or more signals to ranges or domains of functions and their subordinate values according to a dynamic co-variance or cross-correlation of the functions that distribute blended controls to an apparatus which generates signals. A composite statistic of the blended controls can be determined by an information source with source entropy of H(x), the number of the available degrees of freedom for the apparatus, the efficiency of each degree of freedom, and the corresponding potential to distribute a specific signal rate in and information each degree of freedom. The composition may include, for example: examining covariance of statistical parameters of a signal of interest; and cross-correlations and/or calculated and/or measured dependencies.

Yet another embodiment of the present invention is directed toward the method for generating an information bearing function of time, described above wherein the multiple signals include three or more signals. The three or more signals include two or more amplitude functions and one or more phase functions. Indeed, each of the two or more amplitude functions has a spectral distribution. For example, a first amplitude function has a first spectral distribution and bandwidth and a second amplitude function has a second spectral distribution and bandwidth; the first spectral distribution does not necessarily equal the second spectral distribution, or the two spectral distributions may be at least partially correlated.

Yet another embodiment of the present invention is directed to the method for generating an information bearing function of time, described above wherein parameters of a desired information bearing function of time are based, at least in part, on prior characterization (prior knowledge) of the apparatus. The prior knowledge may include, for example, prior known information about the desired information bearing function of time, as well as characteristics of an apparatus such as modulator, encoder or transmitter.

Another Embodiment: Generating an Information Bearing Function of Time-Accessing Parameters Yet another embodiment of the present invention is directed to a method for generating an information bearing function of time. This method includes accessing parameters of a desired information bearing function of time. These parameters include, for example, amplitude, phase, frequency, or functions thereof. A first subset representation of the desired information bearing function of time is generated based on one or more input signals and a first function. The first subset representation of the desired information bearing function of time is compared to the parameters of a desired information bearing function of time and a differential quantity is identified based on the comparison. The input signals are composited with additional one or more input signals when the differential quantity exceeds a predetermined threshold and a second subset representation of the desired information bearing function of time is generated based on the compositing step. In this case differential refers to a difference between some desired value and some preferred reference value.

Yet another embodiment of the present invention is directed to the method described above, wherein the differential quantity is a function of desirable characteristics of the information bearing function of time. Indeed, the desirable characteristics of the information bearing function of time include one or more of function of amplitude, function of frequency and/or function of phase.

Yet another embodiment of the present invention is directed to the method described above and also includes identifying one or more statistics of amplitude, frequency and/or phase.

Yet another embodiment of the present invention is directed to the method described above, wherein the parameters of a desired information bearing function of time are based on prior characterization (prior knowledge) of the apparatus. This apriori or a priori or prior knowledge includes information that was known, or identified, prior to the rendering of the information bearing function of time.

Yet another embodiment of the present invention is directed to the method described above, wherein the first subset representation and the second subset representation are based on nonlinear functions. Thus, the subset representations are not linear.

Yet another embodiment of the present invention is directed to the method described above, wherein the parameters of a desired information bearing function of time include real and imaginary components that are established prior to generating a first subset representation of the desired information bearing function of time.

Another Embodiment: Optimizing a Power Source

Yet another embodiment of the present invention is directed to a method for optimizing the relevant metrics of one or more power sources. This method includes accessing characterizations of an information bearing function of time. The information bearing function of time may be, for example, a signal, waveform, RF modulated signal, an RF carrier signal, or representation or composite waveforms or electronic replication thereof. A plurality of input sources providing power are accessed. These input power sources also serve as constituent input signals, which may be nonlinear and/or switched. Two or more of the input signals are composited to generate a representation of the desired output information bearing function of time. This representation may be a waveform, signal, or electronic representation. An operational state of at least one of the power sources is controlled based on the compositing step.

Another Embodiment: Apparatus to Control an Energy Source

Yet another embodiment of the present invention is directed to an apparatus to control one or more energy sources. The apparatus includes a storage module adapted to store one or more functions of the characteristics of a desired information bearing function of time. These functions may include, for example, one or more of function of amplitude, function of frequency and/or function of phase. The information bearing function of time may be, for example, a signal, waveform, RF modulated signal, an RF carrier signal, or representation of composite waveforms.

The apparatus also includes a first module adapted to receive one or more input signals and provide a first subset of output signals. A second module, which is operatively coupled to the first module, is adapted to receive one or more input signals and provide a second subset of output signals. The first subset of output signals are composited with the second subset of output signals to generate a representation of the desired information bearing function of time. The compositing includes mapping of one or more signals or portions of one or more signals to ranges or domains of functions and their subordinate values according to a dynamic co-variance or cross-correlation of the functions that distribute blended controls to an apparatus which generates signals. The composite statistic of the blended controls is determined by an information source with source entropy of H(x), the number of the available degrees of freedom for the apparatus, the efficiency of each degree of freedom, and the corresponding potential to distribute a specific signal rate as well as information in each degree of freedom. The compositing process may include, for example: examining covariance of statistical parameters of a signal of interest; and cross-correlations and/or calculated dependencies.

Yet another embodiment of the present invention is directed to the apparatus described above, wherein the first module and the second module are nonlinear modules. That is, the first and second modules obtain nonlinear input signals.

Yet another embodiment of the present invention is directed to the apparatus described above and also includes a node, operatively coupled to the second module, adapted to receive the representation of the desired information bearing function of time and provide a linear representation of the desired information bearing function of time.

Yet another embodiment of the present invention is directed to the apparatus described above, wherein the signal is reconstituted during compositing of the one or more first subset of input signals, which are derived from blended controls, and one or more of the second subset of input signals, which are derived from blended controls. The reconstitution is a desired information bearing function of time which is compliant to a quality metric, often a standard, for example.

Another Embodiment: A Method of Rendering Representation of an Information Bearing Function of Time Yet another embodiment of the present invention is directed to a method for rendering a representation of an information bearing function of time. The information bearing function of time may be, for example, a signal, waveform, RF modulated signal, an RF carrier signal, or wave representation or composite waveforms or electronic representation thereof.

The method includes utilizing one or more energy sources. These energy sources may be, for example, one or more batteries, one or more power supplies, other power source or sources, or combinations of these energy sources. The one or more energy sources are partitioned within selected domains to efficiently generate signals used to form a rendered information bearing function of time. Domains, for example, include a range of values or functions of values relevant to mathematical and/or logical operations or calculations within the FLUTTER™ algorithm. Domains may apply to multiple dimensions and therefore bound hypergeometric quantities and they may include real and imaginary numbers or any suitable mathematical and/or logical function. The signals, which have been generated, are allocated to render the representation of the information bearing function of time, such that the allocation associates with the change of an operational state of at least one or more than one of the energy sources. The allocation may be coordinated by a blended control or blended controls, such as BLENDED CONTROL FUNCTION BY PARKERVISION™ according to a FLUTTER™ algorithm.

Yet another embodiment of the present invention is directed to the rendering method described above and also includes iteratively optimizing a blending function for the allocation of the input signals. This optimization includes characterization of the implementing apparatus and the information bearing function of time that it renders and constructing a blended control, such as BLENDED CONTROL FUNCTION BY PARKERVISION™ according to a FLUTTER™ algorithm.

Yet another embodiment of the present invention is directed to the rendering method described above, wherein the information bearing function of time is a waveform. This waveform is based on a stimulus function, which may include the stimulus of some or all of the degrees of freedom, dimensions and domains of the apparatus.

Another Embodiment: Rendering an Information Bearing Function of Time by Accessing Parameters Yet another embodiment of the present invention is directed to a method for rendering a representation of an information bearing function of time. The method includes accessing parameters of a plurality of desired information bearing functions of time, such as signals, waveforms, RF modulated signals, and RF carrier signals, or wave representations or composite waveforms. The plurality of desired information bearing functions of time may be rendered substantially simultaneously (or concurrently or in parallel). Multiple signals (signal subsets) associated with each of the plurality of desired information bearing functions of time are composited. This composition includes, for example, mapping of one or more signals or portions of one or more signals to ranges or domains of functions and their subordinate values according to a dynamic co-variance or cross-correlation of said functions that distribute blended controls to an apparatus which generates signals. The composite statistic of the blended controls is determined by an information source with source entropy of H(x), the number of the available degrees of freedom for the apparatus, the efficiency of each degree of freedom, and the corresponding potential to distribute a specific signal rate as well as information in each degree of freedom. A representation of each of the plurality of the desired information bearing functions of time is generated as a part of the compositing step. This representation may be, for example, a waveform, a signal, an RF modulated signal or electronic data that may be stored on an electronic storage medium, computer-readable medium and/or transmitted to a remote location via a communication medium, such as a network, wireless medium or wired medium.

Another Embodiment: Accounting for Degrees of Freedom

Yet another embodiment of the present invention is directed to a method that includes accounting for a number and/or impact of desired degrees of freedom in a system and accounting for a number and/or impact of undesired degrees of freedom in the system. One or more of the desired degrees of freedom are excited with energetic waveforms and/or signals and/or other excitation source. A response by one or more of the undesired degrees of freedom is assessed. This embodiment is used in a system that has desired degrees of freedom and undesired degrees of freedom. Energy may be applied to the system to excite one or more of the desired degrees of freedom. Undesired degrees of freedom will be excited by the applied energy and a response to the applied energy by the undesired degrees of freedom can be assessed. Also desired degrees of freedom may be monitored and assessed for corresponding excitations.

Yet another embodiment of the present invention is directed to the method described above and also includes utilizing prior characterization (prior knowledge) of the apparatus and desired signal, apriori information, to identify and/or characterize the desired degrees of freedom. This prior knowledge is previously obtained, or previously acquired data about the apparatus and desired information bearing function of time prior to final rendering. The desired information bearing function of time may be, for example, a signal, waveform. RF modulated signal, an RF carrier signal, or wave representation or composite waveforms.

Yet another embodiment of the present invention is directed to the method described above and also includes characterizing the desired degrees of freedom for the system. This includes, for example, degrees of freedom that are purposefully designed into the system.

Yet another embodiment of the present invention is directed to the method described above, wherein the undesired degrees of freedom include undesirable phenomena scavenging energy. This may include, for example, rotational, translational vibrational, as well as other forms of energy, including apparatus modes which generate heat or any undesirable spurious phenomena. The undesired degrees of freedom include degrees of freedom that are not purposefully designed into the system.

Yet another embodiment of the present invention is directed to the method described above and also includes identifying and/or characterizing a total number of degrees of freedom.

Yet another embodiment of the present invention is directed to the method described above and also includes estimating a probability or probabilities that one or more of the undesired degrees of freedom will be in an excited state or an relatively unexcited state as well as the probability vs. energy distributed in those states. The effect(s) of one or more of the undesired degrees of freedom are controlled, or moderated, utilizing the estimated probability or probabilities. The probability or probabilities is/are estimated based on prior, or apriori, apparatus characterization and the statistics of the desired information bearing function of time.

Yet another embodiment of the present invention is directed to the method described above and also includes identifying one or more thermal characteristics to calculate the probability that one or more of the undesired degrees of freedom will be in an excited or unexcited state as well as the probability vs. energy level distributed in those states.

Another Embodiment: Multiple Input Multiple Output Systems

Yet another embodiment of the present invention is directed to a method that includes processing one or more information source inputs, $H_1(x), H_2(x) \ldots H_m(x)$, where in is any suitable integer using FLUTTER™ and blended control algorithms to produce one or more information bearing functions of time. Such information bearing functions of time, known also as output signals are enumerated 1, 2 . . . n where n is a suitable integer, are rendered from any number in information sources and FLUTTER™ algorithms via blended controls. For example, any number of m inputs may be mapped to any number of n outputs where m may or may not equal n. Each of the n output signals or alternatively output channels may be a result of independent or dependent compositing. That is, each of then outputs may share information to any extent required or desired. This algorithm may be used in applications such as multiple input multiple output (MIMO) and diversity processing. In addition, n may be less than in, thus mapping m input information sources to fewer output signals.

Accordingly, embodiments of the present invention are desired to not encompass any previously known product, process of making the product, or method of using the product such that Applicants reserve the right and hereby disclose a disclaimer of any previously known product, process, or method. It is further noted that embodiments of the present invention do not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of have the meaning ascribed to them in U.S. patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The patent or application file contains at least one drawing executed in color. Copies of this patent or patent application publication with color drawing(s) will be provided by the Office upon request and payment of the necessary fees.

To the accomplishment of the foregoing and related ends, certain illustrative aspects of the invention are described herein in connection with the following description and the annexed drawings. These aspects are indicative, however, of but a few of the various ways in which the principles of the invention may be employed and embodiments of the present invention are intended to include such aspects and their equivalents. Other advantages, embodiments and novel features of the invention may become apparent from the following description of embodiments of the present invention when considered in conjunction with the drawings. The following description, given by way of example, but not intended to limit the invention solely to the specific embodiments described, may be understood in conjunction with the accompanying drawings, in which:

FIG. 8 shows a schematic of a summing node with two input signals and/or waveforms and one output signal.

FIG. 11 shows a graphical representation of an approximately Gaussian Probability Density Function (pdf) for output voltage at particular parameters.

FIGS. 23A and 23B show a particular graphical illustration of differential magnitude and differential phase entropy surfaces, respectively.

FIGS. 24A and 24B show a particular graphical illustration of reduced differential magnitude and differential phase entropy surfaces, respectively.

DETAILED DESCRIPTION

Figure 1:
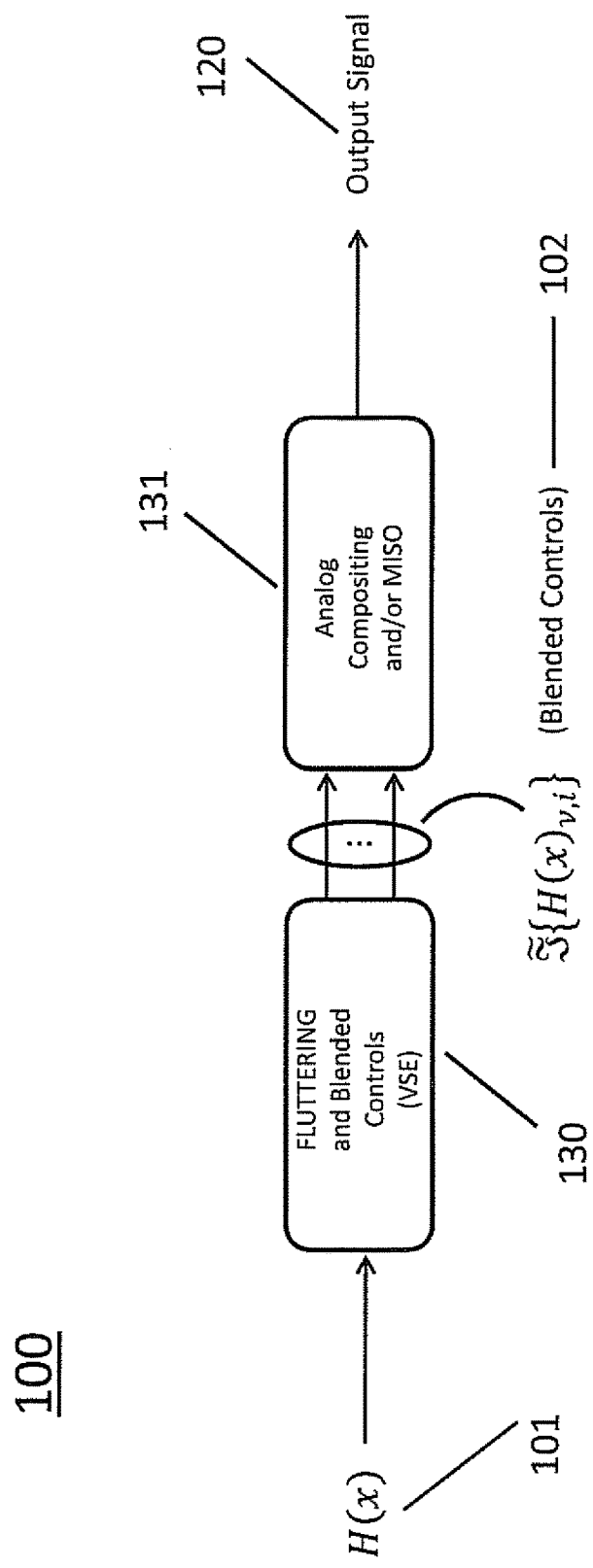
FIG. 1 shows a block diagram of inter connect and relation between FLUTTER™, blended control and compositing.

The embodiments of the invention and the various features and advantageous details thereof are explained more fully with reference to the non-limiting embodiments, aspects and examples that are described and/or illustrated in the accompanying figures and detailed in the following description. It should be noted that the features of one embodiment or aspect may be employed with other embodiments as the skilled artisan would recognize, even if not explicitly stated herein. The examples used herein are intended merely to facilitate an understanding of ways in which the invention may be practiced and to further enable those of skill in the art to practice the embodiments of the present invention. Accordingly, the examples and embodiments herein should not be construed as limiting the scope of the invention, which is defined solely by the appended claims.

Definitions $1^{st}$ Law of Thermodynamics: The first law is often formulated by stating that the change in the internal energy of a closed system is equal to the amount of heat supplied to the system, minus the amount of work done by the system on its surroundings. Other forms of energy (including electrical) may be substituted for heat energy in an extension of the first law formulation. The first law of thermodynamics is an energy conservation law with an implication that energy cannot be created or destroyed. Energy may be transformed or transported but a numerical calculation of the sum total of energy inputs to an isolated process or system will equal the total of the energy stored in the process or system plus the energy output from the process or system. The law of conservation of energy states that the total energy of an isolated system is constant. The first law of thermodynamics is referenced occasionally as simply the first law.

$2^{nd}$ Law of Thermodynamics: The second law is a basic postulate defining the concept of thermodynamic entropy, applicable to any system involving measurable energy transfer (classically heat energy transfer). In statistical mechanics information entropy is defined from information theory using Shannon's entropy. In the language of statistical mechanics, entropy is a measure of the number of alternative microscopic configurations or states of a system corresponding to a single macroscopic state of the system. One consequence of the second law is that practical physical systems may never achieve 100% thermodynamic efficiency. Also, the entropy of an isolated system will always possess an ever increasing entropy up to the point equilibrium is achieved. The second law of thermodynamics is referred to as simply the second law.

ACPR: Adjacent Channel Power Ratio usually measured in decibels (dB) as the ratio of an "out of band" power per unit bandwidth to an "in band" signal power per unit bandwidth. This measurement is usually accomplished in the frequency domain. Out of band power is typically unwanted.

A.C.: An alternating current which corresponds to a change in the direction of charge transport and/or the electromagnetic fields associated with moving charge through a circuit. One direction of current flow is usually labeled as positive and the opposite direction of current flow is labeled as negative and direction of current flow will change back and forth between positive and negative over time.

Access: Obtain examine or retrieve; ability to use; freedom or ability to obtain or make use of something.

Account: Record, summarize; keeping a record of; reporting or describing an existence of.

A.C. Coupled: A circuit or system/module is A.C. coupled at is interfaced to another circuit or system/module if D.C. current cannot pass through the interface but A.C. current or signal or waveform can pass through the interface.

A.C.L.R: Adjacent channel leakage ratio is a measure of how much signal from a specific channel allocation leaks to an adjacent channel. In this case channel refers to a band of frequencies. Leakage from one band or one channel to another band or channel occurs when signals are processed by nonlinear systems.

A/D: Analog to digital conversion.

Adapt: Modify or adjust or reconstruct for utilization.

Adjust: Alter or change or arrange for a desired result or outcome.

Algorithm: A set of steps that are followed in some sequence to solve a mathematical problem or to complete a process or operation such as (for example) generating signals according to FLUTTER™.

Align: Arrange in a desired formation; adjust a position relative to another object, article or item, or adjust a quality/characteristic of objects, articles or items in a relative sense.

Allocate: Assign, distribute, designate or apportion.

Amplitude: A scalar value which may vary with time. Amplitude can be associated as a value of a function according to its argument relative to the value zero. Amplitude may be used to increase or attenuate the value of a signal by multiplying a constant by the function. A larger constant multiplier increases amplitude while a smaller relative constant decreases amplitude. Amplitude may assume both positive and negative values.

Annihilation of Information: Transfer of information entropy into non-information bearing degrees of freedom no longer accessible to the information bearing degrees of freedom of the system and therefore lost in a practical sense even if an imprint is transferred to the environment through a corresponding increase in thermodynamic entropy.

Apparatus: Any system or systematic organization of activities, algorithms, functions, modules, processes, collectively directed toward a set of goals and/or requirements: An electronic apparatus consists of algorithms, software, functions, modules, and circuits in a suitable combination depending on application which collectively fulfill a requirement. A set of materials or equipment or modules designed for a particular use.

Application Phase Space: Application phase space is a higher level of abstraction than phase space. Application phase space consists of one or more of the attributes of phase space organized at a macroscopic level with modules and functions within the apparatus. Phase space may account for the state of matter at the microscopic (molecular) level but application phase space includes consideration of bulk statistics for the state of matter where the bulks are associated with a module function, or degree of freedom for the apparatus.

Approximate: Approximate: almost correct or exact; close in value or amount but not completely precise; nearly correct or exact.

apriori: What can be known based on inference from common knowledge derived through prior experience, observation, characterization and/or measurement. Formed or conceived beforehand; relating to what can be known through an understanding of how certain things work rather than by observation; presupposed by experience. Sometimes separated as a priori.

Articulating: Manipulation of multiple degrees of freedom utilizing multiple facilities of an apparatus in a deliberate fashion to accomplish a function or process.

Associate: To be in relation to another object or thing; linked together in some fashion or degree.

Auto Correlation: Method of comparing a signal with or waveform itself. For example, Time—Auto Correlation function compares a time shifted version of a signal or waveform with itself. The comparison is by means of correlation.

Auto Covariance: Method of comparing a signal or waveform with itself once the average value of the signal/or waveform is removed. For example, a time auto covariance function compares a signal or waveform with a time shifted version of said signal or waveform.

Bandwidth: Frequency span over which a substantial portion of a signal is restricted or distributed according to some desired performance metric. Often a 3 dB power metric is allocated for the upper and lower band (span) edge to facilitate the definition. However, sometimes a differing frequency span vs. power metric, or frequency span vs. phase metric, or frequency span vs. time metric, is allocated/specified. Frequency span may also be referred to on occasion as band, or bandwidth depending on context.

Baseband: Range of frequencies near to zero Hz, and including zero Hz.

Bin: A subset of values or span of values within some range or domain.

Bit: Unit of information measure (binary digit) calculated using numbers with a base 2.

Blended Controls: A set of dynamic distributed control signals generated as part of the FLUTTER™ algorithm, used to program, configure, and dynamically manipulate the information encoding and modulation facilities of a communications apparatus.

Blended Control Function: Set of dynamic and configurable controls which are distributed to an apparatus according to an optimization algorithm which accounts for H(x), the input information entropy, the waveform standard, significant hardware variables and operational parameters. Blended control functions are represented by $\tilde{\mathfrak{S}}\{H(x)_{v,i}\}$ where v+i is the total number of degrees of freedom for the apparatus which is being controlled. BLENDED CONTROL BY PARKERVISION™ is a registered trademark of ParkerVision, Inc. Jacksonville, Fla.

Branch: A path within a circuit or algorithm or architecture.

Bus: One or more than one interconnecting structure such as wires or signal lines which may interface between circuits or modules and transport digital or analog information or both.

C: An abbreviation for coulomb, which is a quantity of charge.

Calculate: Solve; probe the meaning of; to obtain the general idea about something; to determine by a process. Solve a mathematical problem or equation.

Capacity: The maximum possible rate for information transfer through a communications channel, while maintaining a specified quality metric. Capacity may also be designated (abbreviated) as C, or C with possibly a subscript, depending on context. It should not be confused with Coulomb, a quantity of charge. On occasion capacity is qualified by some restrictive characteristics of the channel.

Cascading: Transferring or representing a quantity or multiple quantities sequentially. Transferring a quantity or multiple quantities sequentially.

Cascoding: Using a power source connection configuration to increase potential energy.

Causal: A causal system means that a system's output response (as a function of time) cannot precede its input stimulus.

CDF or cdf: Cumulative Distribution Function in probability theory and statistics, the cumulative distribution function (CDF), describes the probability that a real-valued random variable X with a given probability distribution will be found at a value less than or equal to x. Cumulative distribution functions are also used to specify the distribution of multivariate random variables. A cdf may be obtained through an integration or accumulation over a relevant pdf domain.

Characterization: Describing the qualities or attributes of something. The process of determining the qualities or attributes of an object, or system.

Channel Frequency: The center frequency for a channel. The center frequency for a range or span of frequencies allocated to a channel.

Charge: Fundamental unit in coulombs associated with an electron or proton, $\sim \pm 1.602 \times 10^{-19}$ C., or an integral multiplicity thereof.

Code: A combination of symbols which collectively possess an information entropy.

Communication: Transfer of information through space and time.

Communications Channel: Any path possessing a material and/or spatial quality that facilitates the transport of a signal.

Communications Sink: Targeted load for a communications signal or an apparatus that utilizes a communication signal. Load in this circumstance refers to a termination which consumes the application signal and dissipates energy.

Complex Correlation: The variables which are compared are represented by complex numbers. The resulting metric may have a complex number result.

Complex Number: A number which has two components; a real part and an imaginary part. The imaginary part is usually associated with a multiplicative symbol i) or j) which has a value $\sqrt{-1}$. The numbers are used to represent values on two different number lines and operations or calculations with these numbers require the use of complex arithmetic. Complex arithmetic and the associated numbers are used often in the study signals, mathematical spaces, physics and many branches of science and engineering.

Complex Signal Envelope: A mathematical description of a signal, x(t), suitable for RF as well as other applications. The various quantities and relationships that follow may be derived from one another using vector analysis and trigonometry as well as complex arithmetic.

$$x(t) = a(t)e^{j(\omega_c t + \phi(t))}$$

$$x(t) = a_I(t)\cos(\omega_c t + \phi(t)) - a_Q(t)\sin(\omega_c t + \phi(t))$$

$\omega_c \equiv$ Carrier Frequency
$\phi(t) \equiv$ Phase Information vs. Time
$a(t) \equiv$ Amplitude Information vs. Time $$|a(t)| = \sqrt{a_I^2(t) + a_Q^2(t)}$$

$$\phi(t) = \arctan\left[\frac{a_Q(t)}{a_I(t)}\right][\text{sign}]$$

[sign]≡A function which accounts for the quadrant of φ(t) in the complex signal/waveform plane. Sometimes referred to as complex envelope or simply envelope.

Compositing: The mapping of one or more constituent signals or portions of one or more constituent signals to domains and their subordinate functions and arguments according to a FLUTTER™ algorithm. Blended controls developed in the FLUTTER™ algorithm, regulate the distribution of information to each constituent signal. The composite statistic of the blended controls is determined by an information source with source entropy of H (x), the number of the available degrees of freedom for the apparatus, the efficiency of each degree of freedom, and the corresponding potential to distribute a specific signal rate, as well as information, in each degree of freedom.

Consideration: Use as a factor in making a determination.

Constellation: Set of coordinates in some coordinate system with an associated pattern.

Constellation Point: A single coordinate from a constellation.

Constituent Signal: A signal which is part of a parallel processing path in FLUTTER™ and used to form more complex signals through compositing or other operations.

Coordinate: A value which qualifies and/or quantifies position within a mathematical space. Also may possess the meaning; to manage a process.

Correlation: The measure by which the similarity of two or more variables may be compared. A measure of 1 implies they are equivalent and a measure of 0 implies the variables are completely dissimilar. A measure of (−1) implies the variables are opposite or inverse. Values between (−1) and (+1) other than zero also provide a relative similarity metric.

Covariance: This is a correlation operation between two different random variables for which the random variables have their expected values or average values extracted prior to performing correlation.

Create: To make or produce or cause to exist; to being about; to bring into existence. Synthesize, generate.

Cross-Correlations: Correlation between two different variables.

Cross-Covariance: Covariance between two different random variables.

Current: The flow of charge per unit time through a circuit.

d2p™: Direct to Power (Direct2Power™) a registered trademark of ParkerVision Inc., corresponding to a proprietary RF modulator and transmitter architecture and modulator device.

D/A: Digital to Analog conversion.

Data Rates: A rate of information flow per unit time.

D.C.: Direct Current referring to the average transfer of charge per unit time in a specific path through a circuit. This is juxtaposed to an AC current which may alternate directions along the circuit path over time. Generally a specific direction is assigned as being a positive direct current and the opposite direction of current flow through the circuit is negative.

D.C. Coupled: A circuit or system/module is D.C. coupled at its interface to another circuit or system/module if D.C. current or a constant waveform value may pass through the interface.

DCPS: Digitally Controlled Power or Energy Source

Decoding: Process of extracting information from an encoded signal.

Decoding Time: The time interval to accomplish a portion or all of decoding.

Degrees of Freedom: A subset of some space (for instance phase space) into which energy and/or information can individually or jointly be imparted and extracted according to qualified rules which may determine codependences. Such a space may be multi-dimensional and sponsor multiple degrees of freedom. A single dimension may also support multiple degrees of freedom. Degrees of freedom may possess any dependent relation to one another but are considered to be at least partially independent if they are partially or completely uncorrelated. Degrees of freedom also possess a corresponding realization in the information encoding and modulation functions of a communications apparatus. Different mechanisms for encoding information in the apparatus may be considered as degrees of freedom.

Delta Function: In mathematics, the Dirac delta function, or δ function, is a generalized function, or distribution, on the real number line that is zero everywhere except at the specified argument of the function, with an integral equal to the value one when integrated over the entire real line. A weighted delta function is a delta function multiplied by a constant or variable.

Density of States for Phase Space: Function of a set of relevant coordinates of some mathematical, geometrical space such as phase space which may be assigned a unique time and/or probability, and/or probability density. The probability densities may statistically characterize meaningful physical quantities that can be further represented by scalars, vectors and tensors.

Derived: Originating from a source in a manner which may be confirmed by measure, analysis, or inference.

Desired Degree of Freedom: A degree of freedom that is efficiently encoded with information. These degrees of freedom enhance information conservation and are energetically conservative to the greatest practical extent. They are also known as information bearing degrees of freedom. These degrees of freedom may be deliberately controlled or manipulated to affect the causal response of a system through, and application of, algorithm or function such as a blended control function enabled by a FLUTTER™ algorithm.

Dimension: A metric of a mathematical space. A single space may have one or more than one dimension. Often, dimensions are orthogonal. Ordinary space has 3-dimensions; length, width and depth. However, dimensions may include time metrics, code metrics, frequency metrics, phase metrics, space metrics and abstract metrics as well, in any suitable quantity or combination.

Domain: A range of values or functions of values relevant to mathematical or logical operations or calculations. Domains may encompass processes associated with one or more degrees of freedom and one or more dimensions and therefore bound hyper-geometric quantities. Domains may include real and imaginary numbers, and/or any set of logical and mathematical functions and their arguments.

Encoding: Process of imprinting information onto a waveform to create an information bearing function of time.

Encoding Time: Time interval to accomplish, a portion or all, encoding.

Energy: Capacity to accomplish work where work is defined as the amount of energy required to move an object or associated physical field (material or virtual) through space and time. Energy may be measured in units of Joules.

Energy Function: Any function that may be evaluated over its arguments to calculate the capacity to accomplish work, based on the function arguments. For instance, energy may be a function of time, frequency, phase, samples, etc. When energy is a function of time it may be referred to as instantaneous power or averaged power depending on the context and distribution of energy vs. some reference time interval. One may interchange the use of the term power and energy given implied or explicit knowledge of some reference interval of time over which the energy is distributed. Energy may be quantified in units of Joules.

Energy Partition: A function of a distinguishable gradient field, with the capacity to accomplish work. Partitions may be specified in terms of functions of energy, functions of power, functions of current, functions of voltage, or some combination of this list.

Energy partitions are distinguished by distinct ranges of variables which define them. For instance, out of i possible energy domains the $k^{th}$ energy domain may associate with a specific voltage range or current range or energy range or momentum range . . . etc.

Energy Source or Sources: A device or devices which supplies or supply energy from one or more access nodes of the source or sources to one or more apparatuses. One or more energy sources may supply a single apparatus. One or more energy sources may supply more than one apparatus.

Entropy: Entropy is an uncertainty metric proportional to the logarithm of the number of possible states in which a system may be found according to the probability weight of each state.

{For example: Information entropy is the uncertainty of an information source based on all the possible symbols from the source and their respective probabilities.}

{For example: Physical entropy is the uncertainty of the states for a physical system with a number of degrees of freedom. Each degree of freedom may have some probability of energetic excitation.}

Equilibrium: Equilibrium is a state for a system in which entropy is stable, i.e., no longer changing.

Ergodic: Stochastic processes for which statistics derived from time samples of process variables correspond to the statistics of independent ensembles selected from the process. For ergodic ensemble, the average of a function of the random variables over the ensemble is equal with probability unity to the average over one or more possible time translations of a particular member function of the ensemble, except for a subset of representations of measure zero. Although processes may not be perfectly ergodic they may be suitably approximated as so under a variety of practical circumstances.

Ether: Electromagnetic transmission medium, usually ideal free space unless otherwise implied. It may be considered as an example of a physical channel.

EVM: Error Vector Magnitude applies to a sampled signal that is described in vector space. The ratio of power in the unwanted variance (or approximated variance) of the signal at the sample time to the root mean squared power expected for a proper signal.

Excited: A stimulated state or evidence of a stimulated state relative to some norm.

Feedback: The direction of signal flow from output to input of a circuit or module or apparatus. Present output values of such architectures or topologies are returned or "fed back" to portions of the circuit or module in a manner to influence future outputs using control loops. Sometimes this may be referred to as closed loop feed forward (CLFF) to indicate the presence of a control loop in the architecture.

Feed forward: The direction of signal flow from input to output of a circuit or module or apparatus. Present output values of such architectures or topologies are not returned or "fed back" to portions of the circuit or module in a manner to influence future outputs using control loops. Sometimes this may be referred to as open loop feed forward (OLFF) to indicate the absence of a control loop in the architecture.

FLUTTER™: Algorithm which manages one or more of the degrees of freedom of a system to efficiently distribute energy via blended control functions to functions/modules within a communications apparatus. FLUTTER™ is a registered trademark of ParkerVision, Inc. Jacksonville, Fla.

Frequency: (a) Number of regularly occurring particular distinguishable events per unit time, usually normalized to a per second basis. Number of cycles or completed alternations per unit time of a wave or oscillation, also given in Hertz (Hz) or radians per second (in this case cycles or alternations are considered events). The events may also be samples per unit time, pulses per unit time, etc. An average rate of events per unit time.

(b) In statistics and probability theory the term frequency relates to how often or how likely the occurrence of an event is relative to some total number of possible occurrences. The number of occurrences of a particular value or quality may be counted and compared to some total number to obtain a frequency.

Frequency Span: Range of frequency values. Band of frequency values. Channel.

Function of: $\Im\{\ \}$ or $\tilde{\Im}\{\ \}$ are used to indicate a "function of" the quantity or expression (also known as argument) in the bracket $\{\ \}$. The function may be a combination of mathematical and/or logical operation.

Harmonic: Possessing a repetitive or rhythmic quality, rhythm or frequency which may be assigned units of Hertz (Hz) or radians per second (rad/s) or integral multiples thereof. For instance a signal with a frequency of $f_c$ possesses a first harmonic of $1f_c$ Hz, a second harmonic of $2f_c$ Hz, a third harmonic of $3f_c$ Hz, so on and so forth. The frequency $1f_c$ Hz or simply $f_c$. Hz is known as the fundamental frequency.

Hyper-Geometric Manifold: Mathematical surface described in a space with 4 or more dimensions. Each dimension may also consist of complex quantities.

Impedance: A measure to the opposition of time varying current flow in a circuit. The impedance is represented by a complex number with a real part or component also called resistance and an imaginary part or component also called a reactance. The unit of measure is ohms.

Imprint: The process of replicating information, signals, patterns, or set of objects. A replication of information, signals, patterns, or set of objects.

Information: A message (sequence of symbols) contains a quantity of information determined by the accumulation of the following; the logarithm of a symbol probability multiplied by the negative of the symbol probability, for one or more symbols of the message. In this case symbol refers to some character or representation from a source alphabet which is individually distinguishable and occurs with some probability in the context of the message. Information is therefore a measure of uncertainty in data, a message or the symbols composing the message. The calculation described above is an information entropy measure. The greater the entropy the greater the information content. Information can be assigned the units of bits or nats depending on the base of the logarithm.

In addition, for purpose of disclosure information will be associated with physical systems and processes, as an uncertainty of events from some known set of possibilities, which can affect the state of a dynamic system capable of interpreting the events. An event is a physical action or reaction which is instructed or controlled by the symbols from a message.

Information Bearing: Able to support the encoding of information. For example, information bearing degrees of freedom are degrees of freedom which may be encoded with information.

Information Bearing Function: Any set of information samples which may be indexed.

Information Bearing Function of Time: Any waveform, that has been encoded with information and therefore becomes a signal. Related indexed values may be assigned in terms of some variable encoded with information vs. time.

Information Entropy: H(p(x)) is also given the abbreviated notation H(x) and refers to the entropy of a source alphabet with probability density p(x), or the uncertainty associated with the occurrence of symbols (x) from a source alphabet. The metric H(x) may have units of bits or bits/per second depending on context but is defined by $$H = (x)\sum_i -p(x_i)\log_b(p(x_i))$$

in the case where $p(x)_i$ is a discrete random variable. If $p(x)$ is a continuous random variable then;

$$H(x) = -\int p(x)\log_b \frac{p(x)dx}{m(x)}$$

Using mixed probability densities, mixed random variables, both discrete and continuous entropy functions may apply with a normalized probability space of measure 1. Whenever b=2 the information is measured in bits. If b=e then the information is given in nats. H(x) may often be used to quantify an information source. (On occasion H(x), $H_x$ or its other representations may be referred to as "information", "information uncertainty" or "uncertainty". It is understood that a quantity of information, its entropy or uncertainty is inherent in such a shorthand reference.

Information Stream: A sequence of symbols or samples possessing an information metric. For instance, a code is an example of an information stream. A message is an example of an information stream.

Input Sample: An acquired quantity or value of a signal, waveform or data stream at the input to a function, module, apparatus, or system.

Instantaneous: Done, occurring, or acting without any perceptible duration of time; Accomplished without any delay being purposely introduced; occurring or present at a particular instant.

Instantaneous Efficiency: This is a time variant efficiency obtained from the ratio of the instantaneous output power divided by the instantaneous input power of an apparatus, accounting for statistical correlations between input and output. The ratio of output to input powers may be averaged.

Integrate: This term can mean to perform the mathematical operation of integration or to put together some number of constituents or parts to form a whole.

Interface: A place or area where different objects or modules or circuits, meet and communicate or interact with each other or values or attributes or quantities are exchanged.

Intermodulation Distortion: Distortion arising from non-linearities of a system. These distortions may corrupt a particular desired signal as it is processed through the system.

Iterative: Involving repetition. Involving repetition while incrementing values, or changing attributes.

$k_B$: (See Boltzmann's Constant)

Line: A geometrical object which exists in two or more dimensions of a referenced coordinate system. A line possesses a continuous specific sequence of coordinates within the reference coordinate system and also possesses a finite derivative at every coordinate (point) along its length. A line may be partially described by its arc length and radius of curvature. The radius of curvature is greater than zero at all points along its length. A curved line may also be described by the tip of a position vector which accesses each point along the line for a prescribed continuous phase function and prescribed continuous magnitude function describing the vector in a desired coordinate system.

Line Segment: A portion of a line with a starting coordinate and an ending coordinate.

Linear: Pertaining to a quality of a system to convey inputs of a system to the output of the system. A linear system obeys the principle of superposition.

Linear Operation: Any operation of a module system or apparatus which obeys the principle of superposition.

LO: Local Oscillator

Logic: A particular mode of reasoning viewed as valid or faulty, a system of rules which are predictable and consistent.

Logic Function: A circuit, module, system or processor which applies some rules of logic to produce an output from one or more inputs.

Macroscopic Degrees of Freedom: The unique portions of application phase space possessing separable probability densities that may be manipulated by unique physical controls derivable from the function $\tilde{\mathfrak{S}}\{H(x)_{v_j}\}$ and/or $\tilde{\mathfrak{S}}\{H(x)_{v,i}\}$ sometimes referred to as blended controls or blended control signals. This function takes into consideration, or accounts for, desired degrees of freedom and undesired degrees of freedom for the system. These degrees of freedom (undesired and desired) can be a function of system variables and may be characterized by prior knowledge of the apparatus a priori information.

Magnitude: A numerical quantitative measurement or value proportional to the square root of a squared vector amplitude.

Manifold: A surface in 3 or more dimensions which may be closed.

Manipulate: To move or control; to process using a processing device or algorithm:

Mathematical Description: Set of equations, functions and rules based on principles of mathematics characterizing the object being described.

Message: A sequence of symbols which possess a desired meaning or quantity and quality of information.

Metrics: A standard of measurement; a quantitative standard or representation; a basis for comparing two or more quantities. For example, a quantity or value may be compared to some reference quantity or value.

Microscopic Degrees of Freedom: Microscopic degrees of freedom are spontaneously excited due to undesirable modes within the degrees of freedom. These may include, for example, unwanted Joule heating, microphonics, photon emission, electromagnetic (EM) field emission and a variety of correlated and uncorrelated signal degradations.

MIMO: Multiple input multiple output system architecture.

MISO: Multiple input single output operator.

Mixture: A combination of two or more elements; a portion formed by two or more components or constituents in varying proportions. The mixture may cause the components or constituents to retain their individual properties or change the individual properties of the components or constituents.

Mixed Partition: Partition consisting of scalars, vectors tensors with real or imaginary number representation in any combination.

MMSE: Minimum Mean Square Error. Minimizing the quantity $\langle (\tilde{X}-X)^2 \rangle$ where $\tilde{X}$ is the estimate of X, a random variable. $\tilde{X}$ is usually an observable from measurement or may be derived from an observable measurement, or implied by the assumption of one or more statistics.

Modes: The manner in which energy distributes into degrees of freedom. For instance, kinetic energy may be found in vibrational, rotational and translation forms or modes. Within each of these modes may exist one or more than one degree of freedom. In the case of signals for example, the mode may be frequency, or phase or amplitude, etc., Within each of these signal manifestations or modes may exist one or more than one degree of freedom.

Modify: To change some or all of the parts of something.

Modulation: A change in a waveform, encoded according to information, transforming the waveform to a signal.

Modulation Architecture: A system topology consisting of modules and/or functions which enable modulation.

Modulated Carrier Signal: A sine wave waveform of some physical quantity (such as current or voltage) with changing phase and/or changing amplitude and/or changing frequency where the change in phase and amplitude are in proportion to some information encoded onto the phase and amplitude. In addition, the frequency may also be encoded with information and therefore change as a consequence of modulation.

Module: A processing related entity, either hardware, software, or a combination of hardware and software, or software in execution. For example, a module may be, but is not limited to being, a process running on a processor or microprocessor, an object, an executable, a thread of execution, a program, and/or a computer. One or more modules may reside within a process and/or thread of execution and a module may be localized on one chip or processor and/or distributed between two or more chips or processors. The term "module" also means software code, machine language or assembly language, an electronic medium that may store an algorithm or algorithms or a processing unit that is adapted to execute program code or other stored instructions. A module may also consist of analog, or digital and/or software functions in some combination or separately. For example an operational amplifier may be considered as an analog module.

Multiplicity: The quality or state of being plural or various.

Nat: Unit of information measure calculated using numbers with a natural logarithm base.

Node: A point of analysis, calculation, measure, reference, input or output, related to procedure, algorithm, schematic, block diagram or other hierarchical object. Objects, functions, circuits or modules attached to a node of a schematic or block diagram access the same signal and/or function of signal common to that that node.

Non Central: As pertains to signals or statistical quantities; the signals or statistical quantities are characterized by nonzero mean random processes or random variables.

Non-Excited: The antithesis of excited. (see unexcited)

Non-Linear: Not obeying the principle of super position. A system or function which does not obey the superposition principle.

Non-Linear Operation: Function of an apparatus, module, or system which does not obey superposition principles for inputs conveyed through the system to the output.

Nyquist Rate: A rate which is 2 times the maximum frequency of a signal to be reproduced by sampling.

Nyquist—Shannon Criteria: Also called the Nyquist-Shannon sampling criteria; requires that the sample rate for reconstructing a signal or acquiring/sampling a signal be at least twice the bandwidth of the signal (usually associated as an implication of Shannon's work). Under certain conditions the requirement may become more restrictive in that the required sample rate may be defined to be twice the frequency of the greatest frequency of the signal being sampled, acquired or reconstructed (usually attributed to Nyquist). At baseband, both interpretations apply equivalently. At pass band it is theoretically conceivable to use the first interpretation, which affords the lowest sample rate.

Object: Some thing, function, process, description, characterization or operation. An object may be abstract or material, of mathematical nature, an item or a representation depending on the context of use.

Obtain: To gain or acquire.

"on the fly": This term refers to a substantially real time operation which implements an operation or process with minimal delay maintaining a continuous time line for the process or operation. The response to each step of the operation, or procedure organizing the operation, responds in a manner substantially unperceived by an observer compared to some acceptable norm.

Operation: Performance of a practical work or of something involving the practical application of principles or processes or procedure; any of various mathematical or logical processes of deriving one entity from others according to a rule. May be executed by one or more processors or processing modules or facilities functioning in concert or independently.

Operational State: Quantities which define or characterize an algorithm, module, system or processor a specific instant.

Operatively Coupled: Modules or Processors which depend on their mutual interactions.

Optimize: Maximize or Minimize one or more quantities and/or metrics of features subject to a set of constraints.

PAER: Peak to Average Energy Ratio which can be measured in dB if desired. It may also be considered as a statistic or statistical quantity for the purpose of this disclosure. It is obtained by dividing the peak energy for a signal or waveform by its average energy.

PAPR: Peak to Average Power Ratio which can be measured in dB if desired. For instance PAPR is the peak to average power of a signal or waveform determined by dividing the instantaneous peak power excursion for the signal or waveform by its average power value. It may also be considered as a statistic or statistical quantity for the purpose of this disclosure.

Peak to Average Power Ratio which can be measured in dB if desired. For instance $PAPR_{sig}$ is the peak to average power of a signal determined by dividing the instantaneous peak power excursion for the signal by its average power value. It may also be considered as a statistic or statistical quantity for the purpose of this disclosure Parallel Paths: A multiplicity of paths or branches possessing the attribute of a common direction of signal or process flow through a module, circuit, system or algorithm. In a simple case parallel paths may possess a comment source terminal or node and a common ending node or terminus. Each path or branch may implement unique processor or similar processes.

Parameter: A value or specification which defines a characteristic of a system, module, apparatus, process, signal or waveform. Parameters may change.

Parsing: The act of dividing, sub dividing, distributing or partitioning.

Partial: Less than the whole.

Partitions: Boundaries within phase space that enclose points, lines, areas and volumes. They may possess physical or abstract description, and relate to physical or abstract quantities. Partitions may overlap one or more other partitions. Partitions may be described using scalars, vectors, tensors, real or imaginary numbers along with boundary constraints. Partitioning is the act of creating partitions.

Pass band: Range of frequencies with a substantially defined range or channel not possessing DC response or zero Hz frequency content.

Patches: A geometrical structure used as a building block to approximate a surface rendering from one or more patches.

PDF or Probability Distribution: Probability Distribution Function is a mathematical function relating a value from a probability space to another space characterized by random variables.

pdf or Probability Density: Probability Density Function is the probability that a random variable or joint random variables possess versus their argument values. The pdf may be normalized so that the accumulated values of the probability space possesses a measure of the CDF.

Phase Space: A conceptual space that may be composed of real physical dimensions as well as abstract mathematical dimensions, and described by the language and methods of physics, probability theory and geometry. In general, the phase space contemplates the state of matter within the phase space boundary, including the momentum and position for material of the apparatus.

Plane: Two dimensional geometrical object which, is defined by two straight lines.

Point: One dimensional mathematical or geometrical object, a single coordinate of a coordinate system.

Portion: Less than or equal to the whole.

Possess: To have, or to exhibit the traits of what is possessed.

Power Differential: Comparison of a power level to a reference power level by calculating the difference between the two.

Power Function: Energy function per unit time or the partial derivative of an energy function with respect to time. If the function is averaged it is an average power. If the function is not averaged it may be referred to as an instantaneous power. It has units of energy per unit time and so each coordinate of a power function has an associated energy which occurs at an associated time. A power function does not alter or change the units of its time distributed resource (i.e. energy in Joules).

Power Level: A quantity with the metric of Joules per second.

Power Source or Sources: An energy source or sources which is/are described by a power function or power functions. It may possess a single voltage and/or current or multiple voltages and/or currents deliverable to an apparatus or a load. A power source may also be referred to as power supply.

Probability: Frequency of occurrence for some event or events which may be measured or predicted from some inferred statistic.

Processing: The execution of a set of operations to implement a process or procedure.

Processing Paths: Sequential flow of functions, modules, and operations in an apparatus, algorithm, or system to implement a process or procedure.

Provide: Make available, to prepare.

Pseudo-Phase Space: A representation of phase space or application phase space which utilizes variables common to the definition of the apparatus such as voltage, current, signal, complex signal, amplitude, phase, frequency, etc. These variables are used to construct a mathematical space related to the phase space. That is, there is a known correspondence in change for the pseudo-phase space for a change in phase space and vice versa.

Q Components: Quadrature phase of a complex signal also called the complex part of the signal.

Radial Difference: Difference in length along a straight line segment or vector which extends along the radial of a spherical or a cylindrical coordinate system Radio Frequency (RF): Typically a rate of oscillation in the range of about 3 kHz to 300 GHz, which corresponds to the frequency of radio waves, and the alternating currents (AC), which carry radio signals. RF usually refers to electrical rather than mechanical oscillations, although mechanical RF systems do exist.

Random: Not deterministic or predictable.

Random Process: An uncountable, infinite, time ordered continuum of statistically independent random variables. A random process may also be approximated as a maximally dense time ordered continuum of substantially statistically independent random variables.

Random Variable: Variable quantity which is non-deterministic, or at least partially so, but may be statistically characterized. Random variables may be real or complex quantities.

Range: A set of values or coordinates from some mathematical space specified by a minimum and a maximum for the set Rate: Frequency of an event or action.

Real Component: The real portion/component of a complex number sometimes associated with the in-phase or real portion/component of a signal, current or voltage. Sometimes associated with the resistance portion/component of an impedance.

Related: Pertaining to, associated with.

Reconstituted: A desired result formed from one or more than one operation and multiple contributing portions.

Relaxation Time: A time interval for a process to achieve a relatively stable state or a relative equilibrium compared to some reference event or variable state reference process. For instance a mug of coffee heated in a microwave eventually cools down to assume a temperature nearly equal to its surroundings. This cooling time is a relaxation time differentiating the heated state of the coffee and the relatively cool state of the coffee?

Rendered: Synthesized, generated or constructed or the result of a process, procedure, algorithm or function.

Rendered Signal: A signal which has been generated as an intermediate result or a final result depending on context. For instance, a desired final RF modulated output can be referred to as a rendered signal.

Rendering Bandwidth: Bandwidth available for generating a signal or waveform.

Rendering Parameters: Parameters which enable the rendering process or procedure.

Representation: A characterization or description for an object, or entity. This may be for example, a mathematical characterization, graphical representation, model, . . . etc.

Rotational Energy: Kinetic energy associated with circular or spherical motions.

Response: Reaction to an action or stimulus.

Sample: An acquired quantity or value. A generated quantity or value.

Sample Functions: Set of functions which consist of arguments to be measured or analyzed or evaluated. For instance, multiple segments of a waveform or signal could be acquired or generated ("sampled") and the average, power, or correlation to some other waveform, estimated from the sample functions.

Sample Regions: Distinct spans, areas, or volumes of mathematical spaces which can contain, represent and accommodate a coordinate system for locating and quantifying the metrics for samples contained within the region.

Scalar Partition: Any partition consisting of scalar values.

Set: A collection, an aggregate, a class, or a family of any objects.

Signal: An example of an information bearing function of time, also referred to as information bearing energetic function of time and space that enables communication.

Signal Constellation: Set or pattern of signal coordinates in the complex plane with values determined from $a_I(t)$ and $a_Q(t)$ and plotted graphically with $a_I(t)$ versus $a_Q(t)$ or vice versa. It may also apply to a set or pattern of coordinates within a phase space. $a_I(t)$ and $a_Q(t)$ are in phase and quadrature phase signal amplitudes respectively. $a_I(t)$ and $a_Q(t)$ are functions of time obtained from the complex envelope representation for a signal.

Signal Efficiency: Thermodynamic efficiency of a system accounting only for the desired output average signal power divided by the total input power to the system on the average.

Signal Ensemble: Set of signals or set of signal samples or set of signal sample functions.

Signal Envelope Magnitude: This quantity is obtained from $(a_I^2+a_Q^2)^{1/2}$ where $a_I$ is the in phase component of a complex signal and $a_Q$ is the quadrature phase component of a complex signal. $a_I$ and $a_Q$ may be functions of time.

Signal of Interest: Desired signal. Signal which is the targeted result of some operation, function, module or algorithm.

Signal Phase: The angle of a complex signal or phase portion of $a(t)e^{-j\omega_c t+\phi}$ where $\phi$ can be obtained from $$\phi = (\text{sign})\tan^{-1}\frac{a_Q}{a_I}$$

and the sign function is determined from the signs of $a_Q$, $a_I$ to account for the repetition of modulo $\tan a_Q/a_I$.

$a_I(t)$ and $a_Q(t)$ are in phase and quadrature phase signal amplitudes respectively. $a_I(t)$ and $a_Q(t)$ are functions of time obtained from the complex envelope representation for a signal.

Signal Partition: A signal or signals may be allocated to separate domains of a FLUTTER™ processing algorithm. Within a domain a signal may possess one or more partitions. The signal partitions are distinct ranges of amplitude, phase, frequency and/or encoded waveform information. The signal partitions are distinguishable by some number of up to and including v degrees of freedom they associate with where that number is less than or equal to the number of degrees of freedom for a domain or domains to which a signal partition belongs.

Sources: Origination of some quantity such as information, power, energy, voltage or current.

Space: A region characterized by span or volume which may be assigned one or more dimensional attributes. Space may be a physical or mathematical construct or representation. Space possesses a quality of dimension or dimensions with associated number lines or indexing strategies suitable for locating objects assigned to the space their relative positions as well as providing a metric for obtaining characteristics of the assigned objects. Space may be otherwise defined by an extent of continuous or discrete coordinates which may be accessed. Space may be homogeneous or nonhomogeneous. A nonhomogeneous space has continuous and discrete coordinate regions or properties for calculations of metrics within the space which change from some domain or region within the space to another domain or region within the space. A homogeneous space possesses either a continuum of coordinates or a discrete set of coordinates and the rules for calculating metrics do not change as a function of location within the space. Space may possess one or more than one dimension.

Spawn: Create, generate, synthesize.

Spectral Distribution: Statistical characterization of a power spectral density.

Spurious Energy: Energy distributed in unwanted degrees of freedom which may be unstable, unpredictable, etc.

Statistic: A measure calculated from sample functions of a random variable.

Statistical Dependence: The degree to which the values of random variables depend on one another or provide information concerning their respective values.

Statistical Parameter: Quantity which affects or perhaps biases a random variable and therefore its statistic.

Statistical Partition: Any partition with mathematical values or structures, i.e., scalars, vectors, tensors, etc., characterized statistically.

Stimulus: An input for a system or apparatus which elicits a response by the system or apparatus.

Storage Module: A module which may store information, data, or sample values for future use or processing.

Subset: A portion of a set. A portion of a set of objects.

Sub-Surfaces: A portion of a larger surface.

Sub-system: A portion of a system at a lower level of hierarchy compared to a system.

Subordinate: A lower ranking of hierarchy or dependent on a higher priority process, module, function or operation.

Substantially: An amount or quantity which reflects acceptable approximation to some limit.

Suitable: Acceptable, desirable, compliant to some requirement, specification, or standard.

Superposition: A principle which may be given a mathematical and systems formulation. For n given inputs $(x_1, x_2, \ldots x_n)$ to a system the output y of the system may be obtained from either of the following equations if the principle of superposition holds; $\Im\{x_1+x_2+x_n\}=y$ or $\Im\{x_1\}+\Im\{x_2\}+\Im\{x_n\}=y$ That is, the function $\Im\{\ \}$ may be applied to the sum of one or more inputs or to each input separately then summed to obtain an equivalent result in either case. When this condition holds then the operation described by $\Im\{\ \}$, for instance a system description or an equation, is also said to be linear.

Switch or Switched: A discrete change in a values and/or processing path, depending on context. A change of functions may also be accomplished by switching between functions.

Symbol: A segment of a signal (analog or digital), usually associated with some minimum integer information assignment in bits, or nats.

System Response: A causal reaction of a system to a stimulus.

Tensor: A mathematical object formed from vectors and arrays of values. Tensors are geometric objects that describe linear relations between vectors, scalars, and other tensors. Elementary examples of such relations include the dot product, the cross product and linear maps. Vectors and scalars themselves are also tensors. A tensor can be represented as a multi-dimensional array of numerical values Tensor Partition: Any partition-qualified or characterized by tensors.

Thermal Characteristics: The description or manner in which heat distributes in the various degrees of freedom for an apparatus.

Thermodynamic Efficiency: Usually represented by the symbol $\eta$ or $\bar{\eta}$ and may be accounted for by application of the $1^{st}$ and $2^{nd}$ Laws of Thermodynamics.

$$\eta \equiv \frac{P_{out}}{P_{in}}$$

where $P_{out}$ is the power in a proper signal intended for the communication sink, load or channel. $P_{in}$ is measured as the power supplied to the communications apparatus while performing it's function. Likewise, $E_{out}$ corresponds to the proper energy out of an apparatus intended for communication sink, load or channel, while $E_{in}$ is the energy supplied to the apparatus.

$$\eta \equiv \frac{E_{out}}{E_{in}}$$

Thermodynamic Entropy: A probability measure for the distribution of energy amongst one or more degrees of freedom for a system. The greatest entropy for a system occurs at equilibrium by definition. It is often represented with the symbol S. Equilibrium is determined when $$\frac{dS_{tot}}{dt} \to 0. \text{ "}\to\text{"}$$

in this case means "tends toward the value of".

Thermodynamic Entropy Flux: A concept related to the study of transitory and non-equilibrium thermodynamics. In this theory entropy may evolve according to probabilities associated with random processes or deterministic processes based on certain system gradients. After a long period, usually referred to as the relaxation time, the entropy flux dissipates and the final system entropy becomes the approximate equilibrium entropy of classical thermodynamics, or classical statistical physics.

Thermodynamics: A physical science that accounts for variables of state associated with the interaction of energy and matter. It encompasses a body of knowledge based on 4 fundamental laws that explain the transformation, distribution and transport of energy in a general manner.

Transformation: Changing from one form to another.

Transition: Changing between states or conditions.

Translational Energy: Kinetic energy associated with motion along a path or trajectory.

Uncertainty: Lack of knowledge or a metric represented by H(x), also Shannon's uncertainty.

Undesired Degree of Freedom: A subset of degrees of freedom that give rise to system inefficiencies such as energy loss or the non-conservation of energy and/or information loss and non-conservation of information with respect to a defined system boundary. Loss refers to energy that is unusable for its original targeted purpose.

Unexcited State: A state that is not excited compared to some relative norm defining excited. A state that is unexcited is evidence that the state is not stimulated. An indication that a physical state is unexcited is the lack of a quantity of energy in that state compared to some threshold value.

Utilize: Make use of.

Variable: A representation of a quantity that may change.

Variable Energy Source: An energy source which may change values, with or without the assist of auxiliary functions, in a discrete or continuous or hybrid manner.

Variable Power Supply: A power source which may change values, with or without the assist of auxiliary functions, in a discrete or continuous or hybrid manner.

Variance: In probability theory and statistics, variance measures how far a set of numbers is spread out. A variance of zero indicates that one or more of the values are identical. Variance is always non-negative: a small variance indicates that the data points tend to be very close to the mean (expected value) and hence to each other, while a high variance indicates that the data points are very spread out around the mean and from each other.

The variance of a random variable X is its second central moment, the expected value of the squared deviation from the mean $\mu = E[X]$:

$$Var(X) = E[(X-\mu)^2].$$

This definition encompasses random variables that are discrete, continuous, neither, or mixed. The variance can also be thought of as the covariance of a random variable with itself:

$$Var(X) = Cov(X,X).$$

The variance is also equivalent to the second cumulant of the probability distribution for X. The variance is typically designated as Var(X), $\sigma^2_X$, or simply $\sigma^2$ (pronounced "sigma squared"). The expression for the variance can be expanded:

$$Var(X) = E[(X - E[X])^2]$$
$$= E[X^2 - 2XE[X] + (E[X])^2]$$
$$= E[X^2] - 2E[X]E[X] + (E[X])^2$$
$$= E[X^2] - (E[X])^2$$

A mnemonic for the above expression is "mean of square minus square of mean".

If the random variable X is continuous with probability density function $f(x)$, then the variance is given by;

$$Var(X) = \sigma^2 = \int (x-\mu)^2 f(x)dx = \int x^2 f(x)dx - \mu^2$$

where $\mu$ is the expected value, $$\mu = \int x f(x)dx$$

and where the integrals are definite integrals taken for x ranging over the range of the random variable X.

Vector Partition: Any partition consisting of or characterized by vector values.

Vibrational Energy: Kinetic energy contained in the motions of matter which rhythmically or randomly vary about some reference origin of a coordinate system.

Voltage: Electrical potential difference, electric tension or electric pressure (measured in units of electric potential: volts, or joules per coulomb) is the electric potential difference between two points, or the difference in electric potential energy of a unit charge transported between two points. Voltage is equal to the work done per unit charge against a static electric field to move the charge between two points in space. A voltage may represent either a source of energy (electromotive force), or lost, used, or stored energy (potential drop). Usually a voltage is measured with respect to some reference point or node in a system referred to a system reference voltage or commonly a ground potential. In many systems a ground potential is zero volts though this is not necessarily required.

Voltage Domain: A domain possessing functions of voltage.

Voltage Domain Differential: Differences between voltages within a domain.

Waveform Efficiency: This efficiency is calculated from the average waveform output power of an apparatus divided by its averaged waveform input power.

Work: Energy exchanged between the apparatus and its communications sink, load, or channel as well as its environment, and between functions and modules internal to the apparatus. The energy is exchanged by the motions of charges, molecules, atoms, virtual particles and through electromagnetic fields as well as gradients of temperature. The units of work may be Joules. The evidence of work is measured by a change in energy.

. . . : A symbol (typically 3 dots or more) used occasionally in equations, drawings and text to indicate an extension of a list of items, symbols, functions, objects, values, etc. . . . as required by the context. For example the notation $v_1, v_2 \ldots v_n$ indicates the variable $v_1$, the variable $v_2$, and all variables up to and including $v_n$, where n is a suitable integer appropriate for the context. The sequence of dots may also appear in other orientations such as vertical column or semicircle configuration.

v+i: This is the total of the number of desirable degrees of freedom of a FLUTTER™ based system also known as the blended control Span, composed of some distinct number of degrees of freedom v and some number of energy partitions i, v and i are suitable integer values.

$v_i$: $v_i$ is the $i^{th}$ subset of v degrees of freedom. Each $v_1$, $v_2, \ldots v_i$ of the set may represent a unique number and combination of the v distinct degrees of freedom. The subscript i indicates an association with the $i^{th}$ energy partition. $v_i$ is sometimes utilized as a subscript for FLUTTER™ system variables and/or blended control functions v,i: This represents a joint set of values which may be assigned or incremented as required depending on context. The set values v, i are typically utilized as an index for blended control enumeration. For example $\tilde{\Im}\{H(x)_{v,i}\}$ has the meaning; The $v^{th}$, $i^{th}$ function of system information entropy H(x), or some subset of these functions. $H(x)_{v,1}$ may represent some portion of the system entropy H(x) depending on the values assumed by v, i.

x→y: The arrow (→) between two representative symbols or variables means that the value on the left approaches the value on the right, for instance, x→y means x becomes a value substantially the same as y or the variable x is approximately the same as y. In addition, x and y can be equations or logical relationships.

$\tilde{\Im}\{H(x)_{v,i}\}$: This notation is generally associated with blended controls. It has several related meanings including;
a) A function of the $v^{th}$, $i^{th}$ Information Entropy Function parsed from H(x).
b) A subset of blended controls for which v, i may assume appropriate integer values.
c) An expanded set in matrix form $$\tilde{\Im} \begin{vmatrix} H(x)_{1,1} & H(x)_{1,2} & \ldots & H(x)_{1,i} \\ \vdots & & \ddots & \\ H(x)_{v,1} & H(x)_{v,2} & \ldots & H(x)_{v,i} \end{vmatrix}$$

The meaning of $\tilde{\Im}\{H(x)_{v,i}\}$ from the definitions a), b), c) depends on the context of discussion.

± or +/−: The value or symbol or variable following this ± may assume positive or negative values. For instance, +/−$V_s$ means that $V_s$ may be positive or negative.

∓ or −/+: The value or symbol or variable following this ∓ may assume negative or positive values. For instance, −/+$V_s$ means that $V_s$ may be negative or positive.

$\int_{ll}^{ul} f(x)dx$: Integration is a mathematical operation based on the calculus of Newton and Leibnitz which obtains a value for the area of a curve under the function of variable x, $f(x)$ between the function limits of ll a lower limit value and ul the upper limit value.

$\Sigma_n x_n$: Summation is a mathematical operation which sums together all $x_n = x_1, x_2, \ldots$ of a set of values over the index n which may take on integer values.

⟨ ⟩ : The brackets indicate a time domain average of the quantity enclosed by the bracket.

Embodiments of the present invention are directed to modulation (including RF modulation) as well as information encoding architectures and include allocating resources of the architecture to optimize various forms of power efficiency including thermodynamic efficiency while optimizing the conservation of information transfer through (FLUTTER™). This architecture can be described as FLUTTER™ (FLUTTER™ is a registered trademark of ParkerVision Inc., Jacksonville, Fla.) which is a term applied to an algorithm which controls fluctuation of one or more energy partitions and any number of signal parameters and/or partitions within a transmitter or modulator device to render an information bearing function of time in an optimally efficient manner based on available apparatus resources. For instance, a variable power supply is an example of an agile energy partition. One such class of power supplies may be a switching power supply, which converts variable charge increments per unit time to a specified voltage by using an impedance and an appropriate filter. Such a supply may also distribute charge to a load where variable potentials may be generated.

FLUTTER™ is a distributed modulation algorithm that enables the synthesis of communications signals at specified output powers and frequencies with optimized efficiency. The input interface can be any collection of information samples or suitable continuous information streams. The input information possesses entropy H(x) which may be measured in bits or bits/second. Both discrete and continuous information entropy metrics H(x) may be accommodated. The apparatus may encode information onto the transmitted signal so as to possess multiple degrees of freedom that are excited by parallel domains of information $\tilde{\Im}\{H(x)_{v,i}\}$ which are constructed from the source entropy H(x). v is a number of degrees of freedom usually associated with a modulator or encoder and i (also degrees of freedom) is a number of partitions usually associated with one or more power sources for the modulator or encoder. $H(x)_{v,i}$ may also be represented as $$H_{x_{v,i}}, H_{x_{v_i}},$$

or $H(x)_{v_i}$ depending on the context and organization of distributed blended controls. These shorthand notations are related to one another through the counting indices of suitable integer values, v, i. The random variable x is an argument from a probability density function used to characterize the stochastic nature of the samples from the information process. $\tilde{\Im}\{H(x)_{v,i}\}$ is a function with input H(x) and multiple outputs generated from the function of $H(x)_{v,i}$. FIG. 1 illustrates a high level operational flow 100 of the FLUTTER™ algorithm (module) 130 along with the analog and compositing segment (module) 131 of the transmitter.

The set $\tilde{\Im}\{H(x)_{v,i}\}$ may partially share domains which are dependent through statistical correlations determined from H(x) 101 and the characteristics of the compositing and/or Multiple Input Single Output (MISO) and/or $\mathcal{O}$ operator 131 segment (module). Therefore, the relative prominence or weighting of the $\tilde{\Im}\{H(x)_{v,i}\}$ blended controls are dynamically variable according to the FLUTTER™ algorithm. The blended controls $\tilde{\Im}\{H(x)_{v,i}\}$ may be realized as sampled functions and/or continuous signals generated and distributed by the (VSE) vector synthesis engine (module) 130. Furthermore, the sampled rate of any member of the set of blended controls may be less than the minimum Nyquist sampling rate associated with a final output signal, 120, providing certain signal processing advantages without sacrificing signal quality or losing information in the modulation process. The bandwidths and power spectral densities associated with each of the blended controls 102 may be unique.

The compositing and/or MISO and/or $\mathcal{O}$ operator (module) 131 operations integrate and statistically adjust parallel processing paths, which may be nonlinear. The nonlinearity, when present, extends through the FLUTTER™ algorithm and blended controls, analog compositing and/or MISO operations. FLUTTER™ refers to the statistical parsing of information to each blended control from the set $\tilde{\mathfrak{S}}\{H(x)_{v,i}\}$ in a manner which excites the multiple degrees of freedom in the apparatus to form the final desired signal in the most efficient manner to conserve power, conserve information and reduce thermal footprint.

The nature of the algorithm 100 is feed forward and does not require feedback. Circuits forming the analog paths are not required to be linear although the final output 120 represents a desired signal with minimal ACPR, harmonics, noise and other artifacts usually associated with nonlinear operations on signals.

Accordingly, it is an embodiment of the present invention to utilize one or more novel power source(s), which may be described as a digitally controlled power source (DCPS), which may be, for example, unipolar, or bipolar. These novel power source(s) may be described in terms of a digitally controlled switching power supply that is adjustable over a range of values from, for example, approximately 0 volts to $V_s$ volts, or $-V_s$ to $+V_s$ volts, accommodating maximum and minimum charge transfer at a voltage (for any corresponding load) which may have a relatively low source impedance $Z_s$ for the frequency range of interest. Low impedance in this case means, $R_s$, the real portion of $Z_s$, is low compared to the load that is attached to the DCPS. The lowest possible "real" portion of the source impedance $Z_s$ is usually desired. The novel power sources, according to one or more embodiments of the present invention, provides an alternative, providing efficient "on the fly" signal envelope reconstruction, for RF modulators. As data rates and peak to average power ratios (PAPR) increase for signaling standards, the switching power supply becomes more difficult to design if it is used to track the envelope for a waveform during the modulation process. This issue is due, in part, to the rate of change of charge transfer allocated to follow the signal envelope with a specified precision under significant load. The envelope reconstruction in a modern standards based application must be nearly exact.

Switching power supplies generate significant distortion over portions of the output dynamic range and also sacrifice some efficiency. Therefore, it is difficult for envelope restoration or envelope tracking based modulators to effectively reconstruct signal envelopes using switching supplies over the full dynamic range without utilizing feedback loops. Embodiments of the present invention are directed to architectures and algorithms that can be open loop feed forward schemes (OLFF). Thus, embodiments of the present invention offer a solution to a Legacy challenge in the DCPS switching art.

For example, FLUTTER™ may be used to facilitate practical DCPS design, diverting resources to other degrees of freedom to reconstruct the information bearing function of time, which may be, for example, a waveform, or signal. Manipulation of the energy partition over a specified dynamic range in concert with additional modulator degrees of freedom enhances efficiency and preserves waveform quality. The techniques described in relation to the DCPS may also be used with other suitable switching power supply and energy source technologies as well. FLUTTER™ algorithms control the DCPS by assigning optimal transition states and voltage or current amplitudes at specifically designed instants of time given a fixed number of power source levels and the desired signal statistic. Optimization is determined as a maximization of thermodynamic Efficiency vs. Signal/Waveform quality.

A modulation device suitable for use with FLUTTER™, may be, for example, an RF power modulation apparatus capable of implementing standards based communications, yet possessing appropriate degrees of freedom whenever the tradeoff between information capacity and power efficiency and signal quality is a driving concern. It is usually desirable for the modulator to possess more degrees of freedom than legacy modulator architectures reflecting current state of the art.

Figure 2:
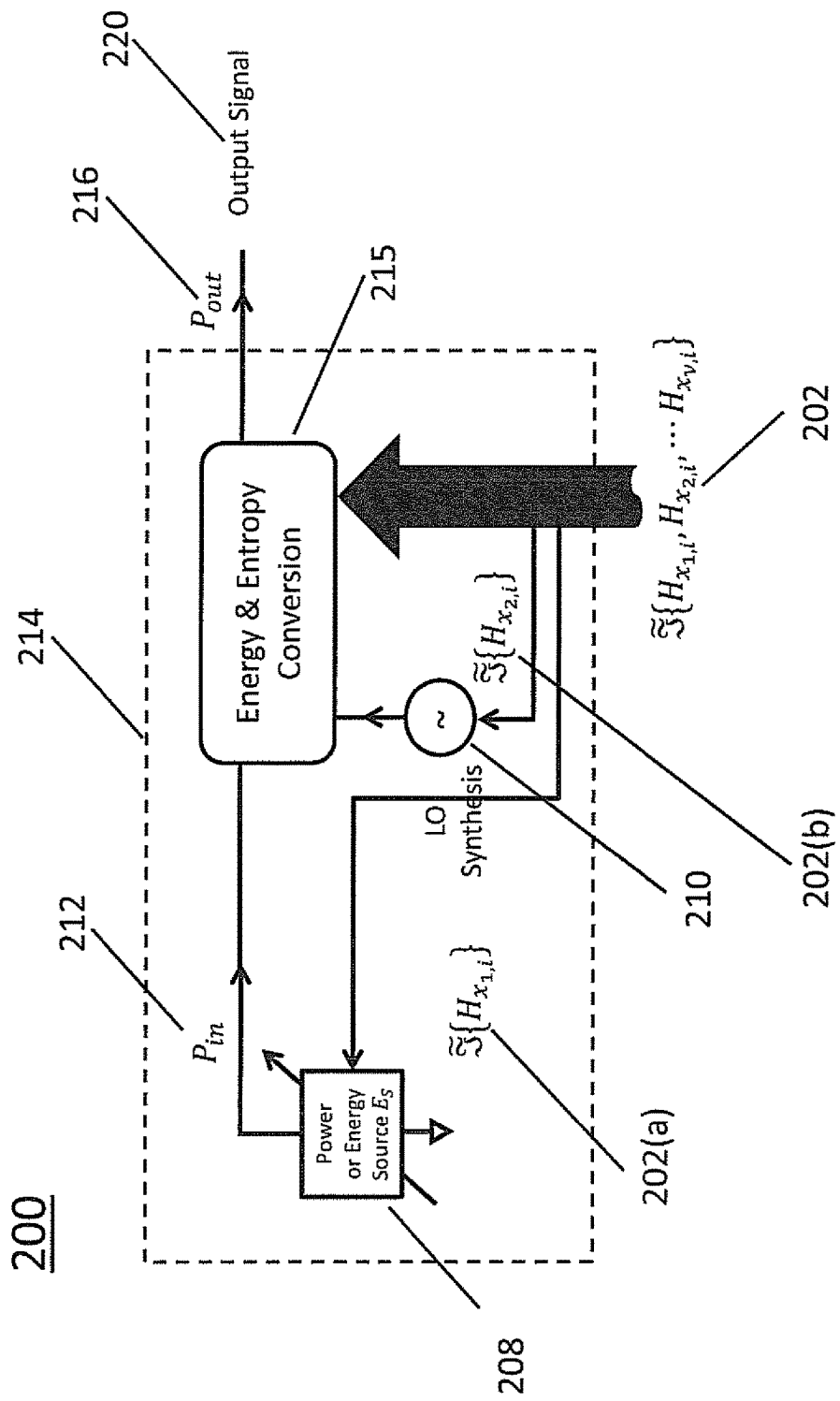
FIG. 2 shows a block diagram of a modulator apparatus with blended controls.

FIG. 2 shows a block diagram 200 that illustrates a modulator, such as, for example a d2p™ apparatus, 214, power source, or energy source 208 and local oscillator 210.

FIG. 2 illustrates a set of controls 202 referred to herein as a blended control function, $\tilde{\mathfrak{S}}\{H(x)_{1,i}, H(x)_{2,i}, \ldots H(x)_{v,i}\}$. $\tilde{\mathfrak{S}}\{H(x)_{1,i}\}$, and $\tilde{\mathfrak{S}}\{H(x)_{2,i}\}$, shown as 202(a) and 202(b), respectively, are two of the set of controls 202 that manipulate degrees of freedom for the energy and entropy conversion functions 215, power source 208 and local oscillator (LO) 210, respectively. Degrees of freedom may include, for example, undesired degrees of freedom and desired degrees of freedom. The undesired degrees of freedom, scavenge power from the system 200. The scavenged power is wasted and therefore is not available to support the intended apparatus function and dissipates as unwanted heat. Undesired degrees of freedom include degrees of freedom that are not deliberately designed into the system 200. The desired degrees of freedom are information bearing and include degrees of freedom that are deliberately designed as part of the system 200. Typically, the desired degrees of freedom are excited or stimulated and the response or reaction of the undesired degrees of freedom is minimized by the FLUTTER™ algorithms, with respect to the degrees of freedom, $v_{(tot)}$:

$v_{(tot)}$=total number of degrees of freedom. $v_{(tot)}$ includes desired degrees of freedom as well as undesired degrees of freedom. i=subset of desired degrees of freedom and may also be referred to as a number of energy partitions. Domains are distinguished by, for example, one or more deliberate groupings from the joint set or subsets of v, i where v, i are suitable integers with a span of v+i. The indices v, i enable mathematical accounting associated with operations and functions of the domains.

It is an embodiment of the present invention to minimize the reaction of the undesired degrees of freedom to an excitation or stimulation of the desired degrees of freedom. The response to the excitation of the desired degrees of freedom is a known quantity, since the apparatus, or system is programmed for a desired response based on inputs. The apparatus or system may be characterized to obtain parameters, constants and variables associated with the system which become collectively prior knowledge and from a random processes perspective apriori information or knowledge. An embodiment of the present invention, for example the system 200 minimizes the probability of exciting undesired degrees of freedom by maximizing the information rate subject to minimized averaged power and constraining quality metric for the output signal 220 through resource allocation to the desired degrees of freedom. Embodiments of the present invention also monitor/analyze the response of the desired degrees of freedom and the undesired degrees of freedom. The optimization technique allocates resources to desired degrees of freedom to minimize influence of the undesired degrees of freedom, given the goals of efficiency and signal quality.

The overall purpose for blended controls $\tilde{\Im}\{H(x)_{1,i}, H(x)_{2,i}, \ldots H(x)_{v,i}\}$ 202 is to manipulate degrees of freedom for the modulator apparatus 214 in such a manner to maximize η the thermodynamic efficiency of the modulator apparatus 214 while minimizing unwanted degrees of freedom and constraining the modulator apparatus 214 according to a function of a specified information metric H(x), (see FIG. 3 element 309) known as Shannon's Information Entropy. Minimizing the unwanted, or undesired, degrees of freedom controls the probability that the undesired degrees of freedom will be excited when energy is applied to the system, in accordance with information encoding and modulation.

Proper thermodynamic efficiency is defined consistent with the 1$^{st}$ Law of Thermodynamics and given by;

$$\langle \eta \rangle = \frac{\langle \overline{P}_{out} \rangle}{\langle P_{in} \rangle} = \frac{\langle E_{out} \rangle}{\langle E_{s_{in}} \rangle}$$

$\langle \overline{P}_{out} \rangle \triangleq$ Time Averaged power of output contained by the signal of interest only, this excludes noise, ACPR, harmonics, spurious, etc. according to a standard's-based metric.

$\langle P_{in} \rangle \triangleq$ Time Averaged power of input provided by one or more power sources such as a battery, for example.

$\langle E_{out} \rangle \triangleq$ Time Averaged output energy for the signal of interest.

$\langle E_{s_{in}} \rangle \triangleq$ Time Averaged input energy from sources, also labeled as $E_s$.

While FIG. 2 illustrates the LO (local oscillator) 210 and power source, $E_s$, 208 separate from the modulator apparatus 214, which may be, for example, a d2p™ modulator apparatus, this is only one embodiment. Architectures, which include the LO synthesizer 210 and an agile $E_s$, 208 as well as partitions that completely exclude their control are also embodiments of the present invention and may be considered as part of the algorithm options and technology. Also shown in FIG. 2 is $P_{in}$ 212, $P_{out}$ 216 and output signal 220. Energy and entropy conversion unit 215 receives input with power $P_{in}$, 212 from $E_s$ 208 and input from LO synthesizer 210. The power or energy source 208 may be any A.C. or D.C current or voltage source or combination thereof. The associated characterization pdf for the source may possess stochastic and deterministic attributes. The energy and entropy conversion unit 215 generates output signal 220, according to a portion of the blended control input 202. Each of the blended controls (202) from subsets of combinations and permutations of v.i indices, may be realized by multiple signals per control path. For instance $\tilde{\Im}\{H(x)_{2,i}\}$ may be instantiated using multiple signals. The signals may be digital, analog, serial, parallel or multiplexed with one or more than one connecting structure such as a wire or bus and a suitable number of connecting nodes.

In one embodiment of the present invention, architectures which contemplate "on the fly" control of the system energy source, $E_s$, 208 as one of several degrees of freedom are described. Control of $E_s$ 208 over some portion of the dynamic range of signal envelope along with any number of other signal parameters, is one embodiment of FLUTTER™.

Figure 3:
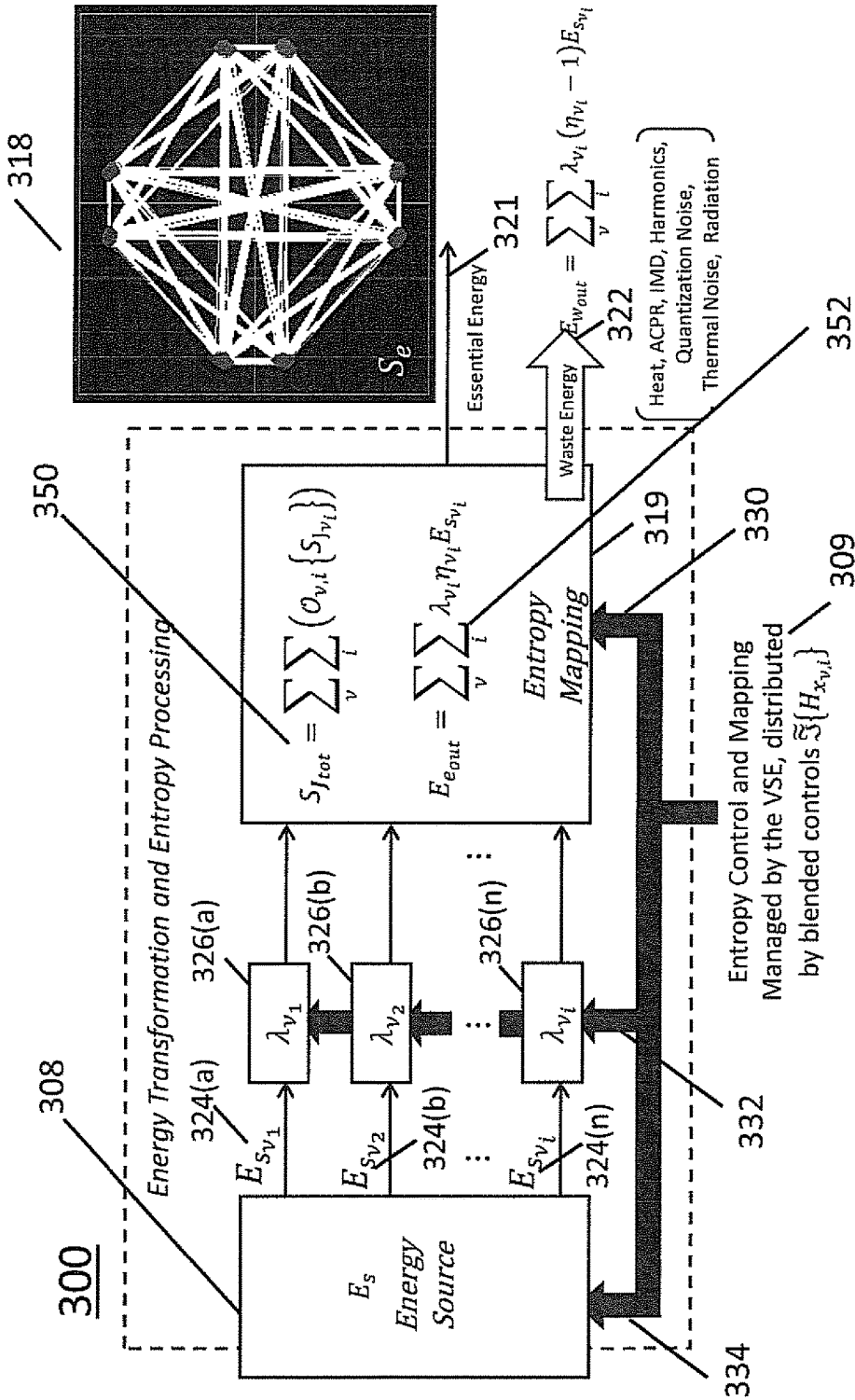
FIG. 3 shows a diagram of energy transformation and entropy processing with blended controls.

FIG. 3 shows an architecture 300 that illustrates an example using optimization parameters. FIG. 3 shows one example of a model that may be adapted to multiple applications that are appropriate for analyzing communication's systems to determine thermodynamic quantities.

As shown in FIG. 3, energy partitions 324(a) . . . (n) (where "n" is any suitable number) from the source $E_s$ 308 are weighted and transformed according to the associated $\lambda_{v_i}$ 326(a) . . . (n) (where "n" is any suitable number) and $\mathcal{O}$ operators to produce a result, as shown in block 319. In this circumstance the subscript $v_i$ pertains to the i$^{th}$ subset from v degrees of freedom. Each $v_i$ forms a domain for degrees of freedom associated with i partitions where v, i are suitable integers which may vary. v may vary for each i. Also sets of degrees of freedom up to and including v degrees of freedom may associate with each value of i. "$\mathcal{O}$" operators are a class of mathematical and logical operations which optimize the compositing step in a FLUTTER™ algorithm according to a blended control. The blended controls 330, 332 and 334 are derived from $\tilde{\Im}\{H(x)_{v,i}\}$ 309. The thermodynamic entropy flux, $S_J$, 350 as well as $E_{e_{out}}$ 352, gives rise to signals and signal energy, which are referred to as essential signals and essential energy. Energy 321, shown as essential energy, as well as unwanted phenomena 322 such as heat, ACPR, inter modulation distortion (IMD) Harmonics, quantization noise, thermal noise, radiation, and/or other waste energy, is also partially stimulated as a function of $\tilde{\Im}\{H(x)_{v,i}\}$ 309. FIG. 3 does not explicitly illustrate the specific entropy flow; however, it is implied since the input includes Shannon's metric for information entropy. Information entropy and apriori system knowledge is used as a prescription or instruction for developing blended control which motivate or stimulate or excite the various physical degrees of freedom within the apparatus, in turn generating a corresponding causal rise to thermodynamic entropy flux $S_J$ 350 which is manifest as a perturbation of the variables within the system phase space. This process is coupled to a modulator apparatus that generates the output signal constellation 318. FIG. 3 is useful to follow the optimization theory, and the description below provides expressions for Energy and Entropy flux. Energy and Entropy flux are functions of time coordinates in addition to the indices v, i. The expanded equations illustrate the dependency on time with the time sample $t_k$ where k=0, 1, 2, 3 . . . .

$$E_{e_{out}}(t_k) = \sum_v \sum_i [\lambda_{v_i} \eta_{v_i} E_{S_{v_i}}]_{(t_k)}$$

$$E_{w_{out}}(t_k) = \sum_v \sum_i [\lambda_{v_i}(\eta_{v_i} - 1) E_{S_{v_i}}]_{(t_k)}$$

$$S_{J_{tot}}(t_k) = \sum_v \sum_i [O_{v,i}\{E_{S_{v_i}}\}]_{(t_k)}$$

Additional variable definitions generally apply to the model and will be employed herein.

$$\eta(t_k) = \left( \frac{E_{e_{out}}}{E_{e_{out}} + E_{w_{out}}} \right)_{(t_k)}$$

$E_{s_{in}} = E_{e_{out}} + E_{w_{out}}$ $E_{s_{in}} \triangleq$ System Input Energy
$E_{e_{out}} \triangleq$ Effective System Output Energy
$E_{w_{out}} \triangleq$ Waste System Output Energy
$\eta_{t_k} \triangleq$ Efficiency as a Function of the Time at Sample k v pertains to the macroscopic partition of the information source domains $\tilde{\Im}\{H_{v_1}, H_{v_2}, \ldots H_{v_i}\}$. (i) accounts for the macroscopic energy partitions which are also dependent on H(x) as a function $\tilde{\Im}\{H_{x_{v,i}}\}$ (shown in FIG. 3 as element 309). The assignment of energy partitions to information domains is flexible and depends on particular design considerations.

H(x) or alternatively, H(p(x)) is known as Shannon's information entropy, uncertainty or measure of information or information metric. These may be referred to herein by the shorthand notations H(x) and $H_x$. Also the information metric may be enumerated according to $H(x)_{v,i}$ or $$H_{x_{v_i}} \text{ or } H_{x_{v,i}}$$

or $H_{v_i}$ where v and i are integers corresponding to degrees of freedom and partitions. Subsets of index values (v, i) can be used to define domains. Each of the i energy partitions may possess any number of degrees of freedom up to and including v. Any subset from the v degrees of freedom is permissible. H(x) is given in the discrete and continuous forms;

The metric H(x) may have units of bits or bits/per second depending on context but is defined by $$H(x) = -\sum_l p_l \ln(p(x)_l)$$

in the case where $p(x)_l$ is the pdf of a discrete random variable where the index l accounts for the $l^{th}$ probability in the pdf.

If p(x) is a continuous random variable then;

$$H(x) = -\int_{-\infty}^{+\infty} p(x) \ln \frac{p(x)}{m(x)} dx$$

With mixed probability densities, composed of mixed random variables, both discrete and continuous entropy functions may apply with a normalized probability space of measure 1. Whenever the logarithm b=2, the information is measured in bits. If b the base=e, then the information is given in nats.

p(x) is the probability density functions (pdf) of symbols emitted from the information source.

m(x) normalizes Shannon's continuous entropy formulation to avoid conditions of negative entropy.

The functions of interest are obtained from;

The physical restrictions imposed by the apparatus and its environment.

a) Mapping of H(x) to the available degrees of freedom of the apparatus subject to the optimization considerations;

$$\max\{\eta\}$$

$$\min\{H(x)-H(y)\}$$

$$\max\{S_{J_e}-S_{J_w}\}$$

H(x)$\underline{\Delta}$ Information Entropy of the Source
H(y)$\underline{\Delta}$ Information Entropy referenced to the Modulated Signal
$S_{J_e}\underline{\Delta}$ Effective Thermodynamic Entropy Flux
$S_{J_w}\underline{\Delta}$ Waste Thermodynamic Entropy Flux The total thermodynamic entropy flux of the system is given by;

$$S_{J_{tot}} = S_{J_e} + S_{J_w}$$

$$S_{J_e} \propto \tilde{\Im}\{H(x)\}_{t_k}$$

The flux $S_{J_e}$ is part of the total entropy flux $S_{J_{tot}}$ and not in full relaxation with the environment in a thermal sense until some period after entropy production ceases. In cases of full relaxation and long observation time constants, $t_{eq}$, the following entropy relationship applies in a specified irreversible direction, consistent with the $2^{nd}$ Law of Thermodynamics.

$$\tilde{\Im}\{H(x)\} \rightarrow S_e + S_w: t_{eq} \rightarrow \infty$$

$$S_e + S_w \leq S_{tot}$$

The arrow $\rightarrow$ can be interpreted as "tends toward".

A message duration in time is given by $\tau$. Thus, the total decoding time, which is the time interval to extract information from an encoded signal, is greater than or equal to message length, which can become arbitrarily large depending on the required channel capacity. In this specific case, channel refers to the modulator apparatus and portions of surrounding support circuitry. When the observation time exceeds the decoding time by a very significant amount in the prior equation, the implication is that the communication has reached a quasi-static state and information transfer is terminated during the remainder of $t_0-\tau$, where $t_0$ is the total observation time.

The entropies $S_e$ and $S_w$ are equilibrium entropies since they approach a maximum, and $$\frac{dS_{tot}}{dt} \rightarrow 0.$$

The implication is that consumption of H(x) through signal generation and transport increases environmental entropy, which can be measured for finite messages if the system is closed. In a perfect system $S_w \rightarrow 0$ and there would be no heat generated by the apparatus. The only heat would appear due to $S_e$ in the test load (communication sink), via the test channel, once the system reaches equilibrium.

This acknowledges that $S_{J_e}$, the essential entropy flux, does ultimately dissipate whenever the communication process is suspended, and that energetic modes associated with transporting H(x) eventually degrade to a maximum entropy state, thus preserving the $2^{nd}$ Law of Thermodynamics.

In this treatment, spontaneous reconstitution of the information associated with H(x) from $S_{tot}$ cannot be obtained even if fluctuations in the thermalized environmental entropy occur, after full dissipation of information. Information is annihilated or channel capacity diminished as $S_{J_w}$ (waste thermodynamic entropy flux) increases and $S_{J_e}$ (essential thermodynamic entropy flux) decreases. In this case, reference is made to the term "annihilation" as transfer of information entropy into non information bearing degrees of freedom that are no longer accessible to the information bearing degrees of freedom of the system and therefore "lost" in a practical sense even if an imprint is transferred to the environment through a corresponding increase in thermodynamic entropy. Also, the term channel may be any medium used to transport some portion of information entropy H(x) even if the channel (medium) is bound to some portion of an apparatus. Noise processes and thermal conduction arising from energy dissipation are contemplated along with causal perturbations determined by the apparatus response to a function of H(x) (shown in FIG. 3 as element 309). Hence, both driving forces and spontaneous actions coexist.

Typically, practical applications demand some consideration of open systems, which can complicate the definitions for waste and effective entropies. In order to explain embodiments of the present invention, waste entropy may be defined as the logarithm of the number of significant accessible states associated with the portions of the phase space containing undesirable degrees of freedom and their cascaded energetic modes for the apparatus, multiplied by Boltzmann's constant for consistency with general thermodynamic treatments. The application density of states within the phase space consists of functions of particle and charge motion, dq/dt, their electromagnetic fields, as well as undesired molecular thermal agitation, translation, rotation, and/or vibration (molecular kinetic energy), and other kinetic anomalies which may be described as undesired degrees of freedom.

Likewise, the effective entropy is derived from the number of accessible states attributed to the portion of phase space encompassing the desirable energetic modes encompassing or enabling desired degrees of freedom. These definitions capture the spirit of a statistical mechanics description without demanding conditions of thermal equilibrium. However, it should also be noted that both forms of entropy (waste and effective) may assume intermediate flux expressions, which ultimately will seek a maximum entropy state when fully absorbed by the environment. This dissipation is eventually realized as heat, or other waste energy. Nonetheless, system thermal relaxation times may be significant when compared to intermediate modes of entropic transfer. This fact promotes efficient transport of energy within the multiple degrees of freedom for the apparatus to physically encode information in a form compliant for consumption by an information sink once the component entropies are reintegrated, or composited.

This reintegration or compositing enables functions of the information domains (subsets of $H(x)_{v,i}$) to be used with appropriate statistical weight, substantially simultaneously (or concurrently or in parallel) to render a representation of an information bearing function of time, such as a signal, waveform, electronic representation of an information bearing function of time or a facsimile of an information bearing function of time. Statistical parsing associated with a compositing procedure may also occur sequentially according to a FLUTTER™ algorithm. This compositing may form the representation of the information bearing function of time and/or reconstruct an information bearing function of time and/or render the information bearing function of time, or a facsimile thereof.

Compositing involves combining, mixing and/or unifying/integrating/re-integrating, a collection of signals, into an information bearing function of time.

Another embodiment of the present invention is directed to a method for assigning $\tilde{\Im}\{H(x)_{v,i}\}$ (generally shown in FIG. 3 as element 309) the weighting of $\lambda_{v_1}, \lambda_{v_2}, \ldots \lambda_{v_i}$, (generally 326) the partitions of $E_s$, (308) (generally 324) and the optimization process in a modulation system that utilizes FLUTTER™. This approach maximizes efficiency, minimizes waste entropy production and conserves information transfer. Embodiments of the present invention contemplate exploiting an advantageous hardware architecture given practical technology restrictions, while applying the optimization criteria of the FLUTTER™ algorithm.

The description herein uses {v, i} subscripts to account for v distinct degrees of freedom and i energy partitions. The i energy partitions also represent particular degrees of freedom. Macroscopic degrees of freedom may be defined as the unique portions of application phase space whose separable probability densities may be manipulated by unique physical controls derivable from the function or set of functions $\tilde{\Im}\{H(x)_{v,i}\}$. This function takes into consideration, or is influenced by, desired degrees of freedom and undesired degrees of freedom for the system. These degrees of freedom (undesired and desired) can be a function of system variables, such as temperature, and may be characterized by prior knowledge of the apparatus/system. The two indices v, i may include any number of operations, manipulations or processes that can be described mathematically or with logic or both mathematically and with logic. Thus, an overall density of states for the application phase space is dependent on applicable subsets of v, i probability distributions. These domain distributions will have varying degrees of statistical co-dependence.

As described herein, it is possible to use a less rigorous definition between the available physical controls and the distributions of the resources they affect to expedite a particular example. Typically, at a fundamental level, the degree of freedom will possess two attributes: 1) be associated with some portion of the density of states within the phase space; which in turn relate to physical encoding mechanisms/facility of the apparatus and 2) permit articulation of energetic functions which are encoded with information, distributed according to $\tilde{\Im}\{H(x)_{v,i}\}$, where $\tilde{\Im}\{H(x)_{v,i}\}$ controls the encoding mechanism/facilities of the apparatus.

These two attributes possess correspondence to the random variables describing quantities within the phase space. Thus, these attributes may be considered when the term "degrees of freedom" is used herein.

Figure 4:
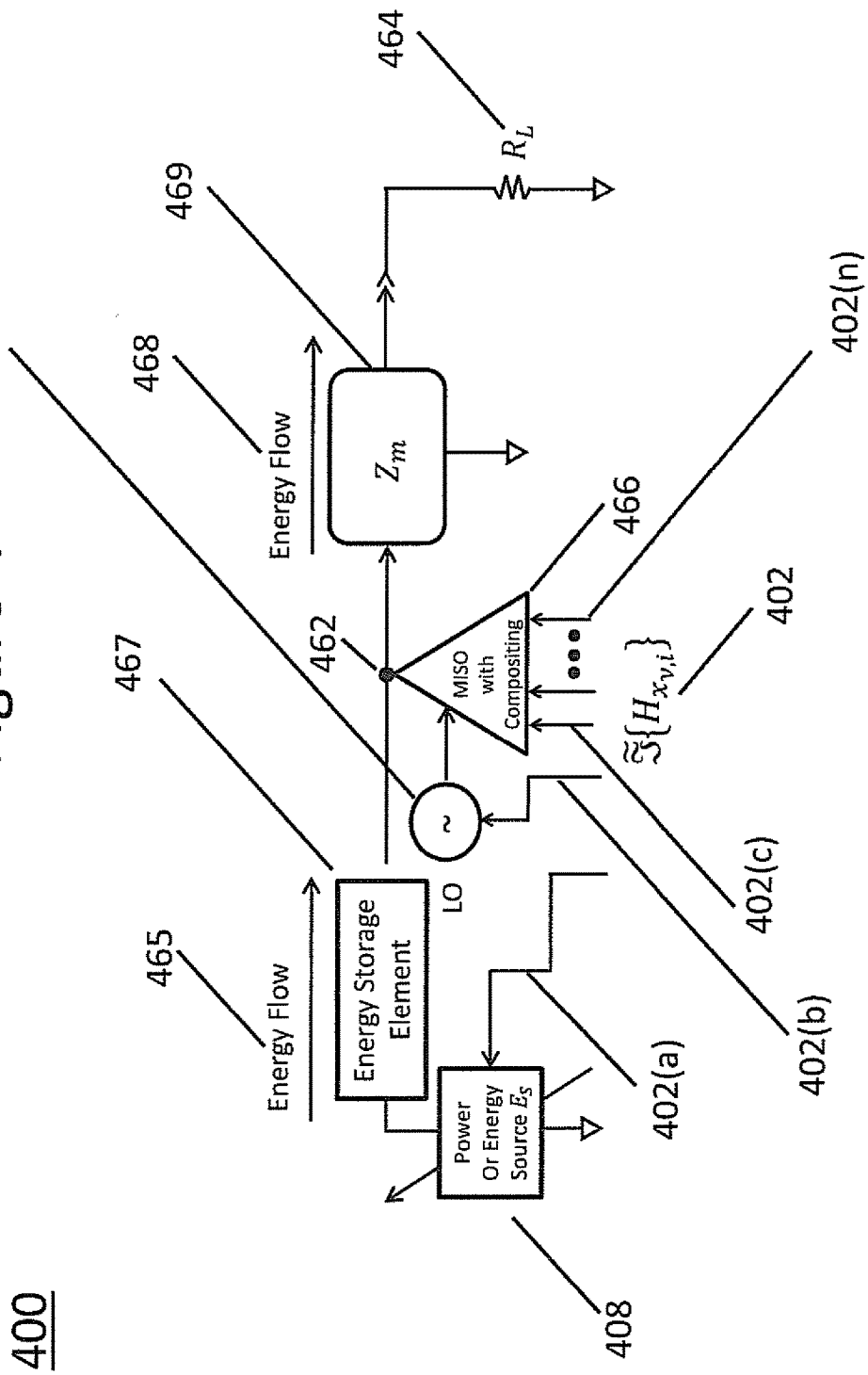
FIG. 4 shows a block diagram that illustrates parsing information metric $H(x)_{v,i}$ v=1, 2, 3 ... n (where "n" is any suitable number), i=1, 2, 3 ... l (where "l" is any suitable number).

FIG. 4 shows an alternate block diagram 400 illustrating the parsing of H(x) through a control $\tilde{\Im}\{H(x)_{v,i}\}$ 402. FIG. 4 is a particular example of a portion of the embodiment of FIG. 3 and shows some examples of additional electronic functions.

FIG. 4 shows that the energy source E, 408 is manipulated by some function of a subset $\tilde{\Im}\{H(x)_{v,i}\}$ of 402(a), derived from the information metric H(x). In addition $\tilde{\Im}\{H(x)_{v,i}\}$ 402 is related to the control of magnitude and phase functions of the carrier wave, where such carrier wave of radian frequency $\omega_c$ is obtained from one or more local oscillators (a single local oscillator (LO) 410 is shown). It is also an embodiment of the present invention that there may be any suitable number of local oscillators 410. The embodiments contemplated herein may utilize multiple LOs, such that the number of LOs is based on design considerations. $\omega_c$ may be greater than or equal to zero radians per second.

Additionally, there may be a plurality of carrier waves.

H(x) 402 is translated to the load encoded in the form of a signal while minimizing distortions at specified power and maximum efficiency through a large dynamic range for a number of operational variables. Potential energy from $E_s$ 408 is converted to a desired form, via the trans-impedance of the multiple input single output module (MISO) 466, as shown by trans-impedance node 462, and transferred directly from the power source 408 to the output load $R_L$ 464 through energy storage elements 467 and complex impedance $Z_m$ 469, in charge increments, dq/dt. The algorithm for distribution of $\tilde{\Im}\{H(x)_{v,i}\}$ (402) is open loop, yet based on prior knowledge concerning the physical principles and characterized parameters of the apparatus 400.

The multiple input single output operator module MISO 466 is implemented by hardware and algorithms, which in aggregate may be associated with the operators $\lambda_{v_i}$, $\mathcal{O}$, referenced in FIG. 3. Degrees of freedom implemented via MISO module 466 are assigned in a manner that permits separate and joint manipulation of composite and other subordinate phase spaces.

The energy flow path 465 through energy storage element 467, which may be, for example, an inductive element and energy flow path 468 through element 469, which is shown as an impedance element, are also shown. The energy paths 465 and 468 are used to illustrate that the energy is displaced from one point in time and space to a second point in time and space. The energy storage element and related circuits use space and time as required to transport charge. Alternately the energy storage element may be any combination of reactive elements, for instance capacitors and inductors as well as transmission lines, or resonators arranged in any suitable circuit topology. The power or energy source 408 may be any A.C., D.C. current or voltage source or combination thereof. The associated characterizing pdf for the source may possess Stochastic and deterministic quantities.

Each of the blended controls 402 from subsets of combinations and permutations of v, indices may be accomplished by distribution of multiple signals per control path. For instance path 402(a) may be digital, analog, serial, parallel or multiplexed with one or more than one connecting structure such as a wire or bus and suitable number of connecting nodes.

The use of phase space herein is expanded from that of Statistical Mechanics. The phase space, as described herein, accommodates the consideration of both apparatus macroscopic and microscopic degrees of freedom. The expanded definition recognizes joint evolution of these domains over variable relaxation times. This definition is consistent with maximal entropy non-equilibrium statistical characterizations as well as non-equilibrium thermodynamics.

Traditionally, heat energy is the motivator for classical thermodynamics. In addition, multiple forms of energy can coexist. Notably, dynamic charge and its electromagnetic field and thermal agitation play roles in electronics though heat is usually not desired for most modern forms of communication and therefore is generally regarded as the degradation of energy to a form possessing maximum entropy. The majority of $(1-\eta)E_s$ may consist of Joule heat, though not exclusively. Intermediate energetic expressions such as noise, harmonics, intermodulation distortion, unwanted oscillations, crosstalk, interference, rotational, vibrational, translational and spurious waveforms, represent examples of scavenging phenomena, which decrease $\eta$ at the point of delivery. Of course, these other forms eventually also degrade to the most primitive form, heat, after causing errors such as distortions and defects in signals.

According to embodiments of the present invention, practical scenarios will possess a relatively few degrees of freedom (compared to $v_{tot}$) within the portion of the device that articulates charge transfer. This is due to considerations for signal management complexity and the associated $2^{nd}$ Law of Thermodynamics consequences. Though large quantities of charge can be transported with some undesired variation, there is typically a dominant bulk statistic on a sample-to-sample basis. Sample in this circumstance may include the numerical quantization of signals. This quantization is typically subject to the Nyquist-Shannon sampling criteria and sampling theorems. Relevant units are in terms of charge per unit information per sample per unit time. The charge transport may be interpreted in terms of currents, energies, as well as magnitude and phase functions of currents in the case of complex signal spaces. Charge transport may also be given in terms of voltage functions given knowledge of system impedances.

According to an embodiment of the present invention, as described herein, an apparatus phase space contemplates one or more degrees of freedom, which may include macroscopic and microscopic degrees of freedom. Furthermore, the phase space will typically possess transitory properties. Both circumstances can include a nonhomogeneous phase space. Statistical properties of constituent phase space domains can be exploited in concert with the diversity of phenomena relaxation time constants to decouple otherwise intractable dependencies. Semiconductors, conductors, inductors, and capacitors transport charge, and energy characterized by microscopic and/or macroscopic statistics. However, these infra structures are also composed of matter that is subject to thermal agitation at the microscopic level. When describing efficiency and information transport, to be complete, both regimes should be addressed, explicitly or implicitly. These extended concepts of application phase space may be referred to herein as simply "phase space".

Figure 5:
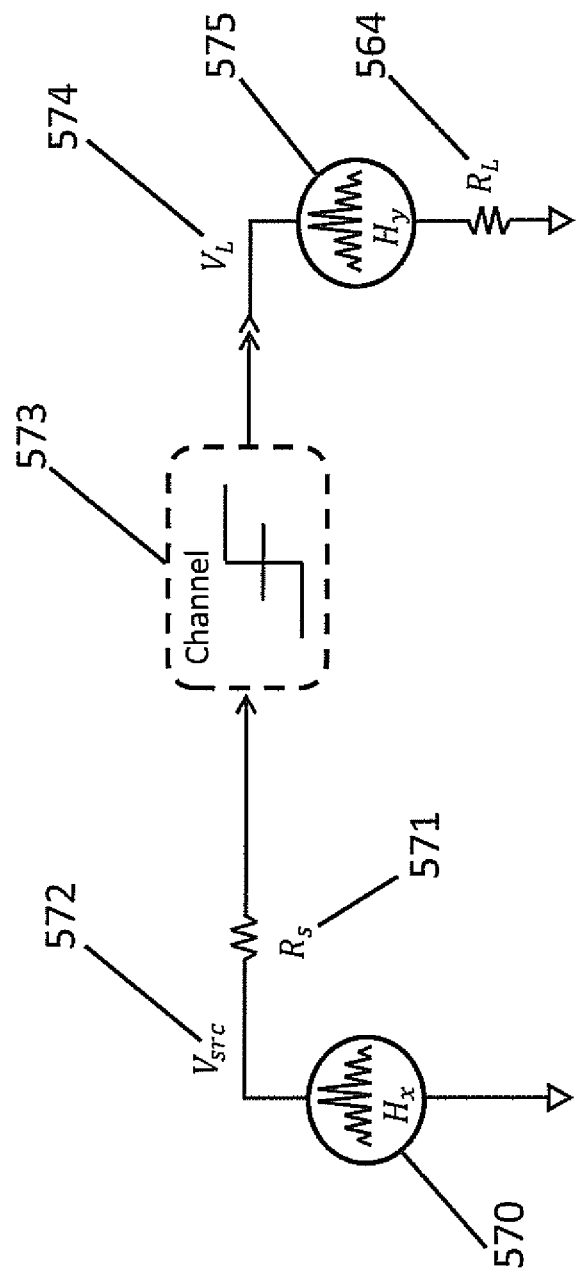
FIG. 5 shows a block diagram illustrating modification of H (x) by a channel.

FIG. 5 show a circuit representation treated as a channel 500. This circuit representation 500 includes a signal source 570 which possesses a describing a pdf p(x) possessing information entropy $H_x$. The variable x is mapped into voltage $V_{src}$ 572. The signal source 570 has a source impedance with real part $R_s$ 571. The signal $V_{src}$ 572 traverses a channel 573. The output of the channel 573 is a load voltage $V_L$. 574. The information entropy associated with the load voltage is $H_y$ 575 and the signal $V_L$. 574 is dissipated by the real part of a load impedance $R_L$ 564. Collectively 500 can conceptually represent some portion of an apparatus of system which transports or processes a signal, at a high level of abstraction. The input signal voltage $V_{src}$ 572 may be different than $V_L$ 574 the output signal voltage because the channel 573 may modify the input $V_{src}$ 572 by some non-linear distortion and/or addition of noise interference. Likewise, the original mapping of information and its associate entropy $H_x$ (see 570) can be modified by the channel with the loss of information. In this representation 500 the channel and its distortions represents apparatus imperfections which may be included in the definition of or description of phase space or application phase space or pseudo-phase. The probability densities (pdf's) used to describe charge, voltage, information and related functions of those quantities also may be distorted by the channel 573.

The pdf (probability density function) describes the distribution of a parameter, or quantity, such as voltage or charge of functions thereof, which may be utilized. This is useful since such parameters can be related to properties of the phase space. Also, their distributions play a significant role in allocating $\Im\{H(x)_{v,i}\}$. V·(dq) represents energy where dq plays the extensive role. V can be a complex quantity and therefore provides a minimum of two degrees of freedom in signal space or pseudo-phase space. The pseudo-phase space may be, for example, an abstract representation or approximation of a portion of phase space or application phase space. Distortions that impact the phase space and pseudo-phase space may sometimes be corrected, or avoided, by exploiting additional degrees of freedom. Distortions affect the manner in which information is mapped into voltage and current within the apparatus. Undesirable mappings can annihilate information and decrease efficiency. By parsing H(x) 570 into multiple constituents $H(x)_{v,i}$ and mapping functions of the constituents along certain trajectories of phase space or pseudo-phase space a composite output derived from said trajectories may conserve information and maximize efficiency. As discussed in the Background section, this is fundamentally different than pre-distortion technology, which counters the nonlinearity with an inverse transfer characteristic, which modifies the phase or pseudo-phase space in a certain way without consideration of the most efficient phase space or pseudo-phase space trajectories for transitions between system states. Hereafter, it is understood that the term phase space may be used to encompass the meanings of pseudo-phase space or application phase space depending on context.

It is useful to consider some rudimentary aspects of relevant pdfs for subsequent reference (probability density functions). Consider the simple one-dimensional case of a pdf (probability density function) for $V_{src}$ to be approximately Gaussian as illustrated in FIG. 6.

Figure 6:
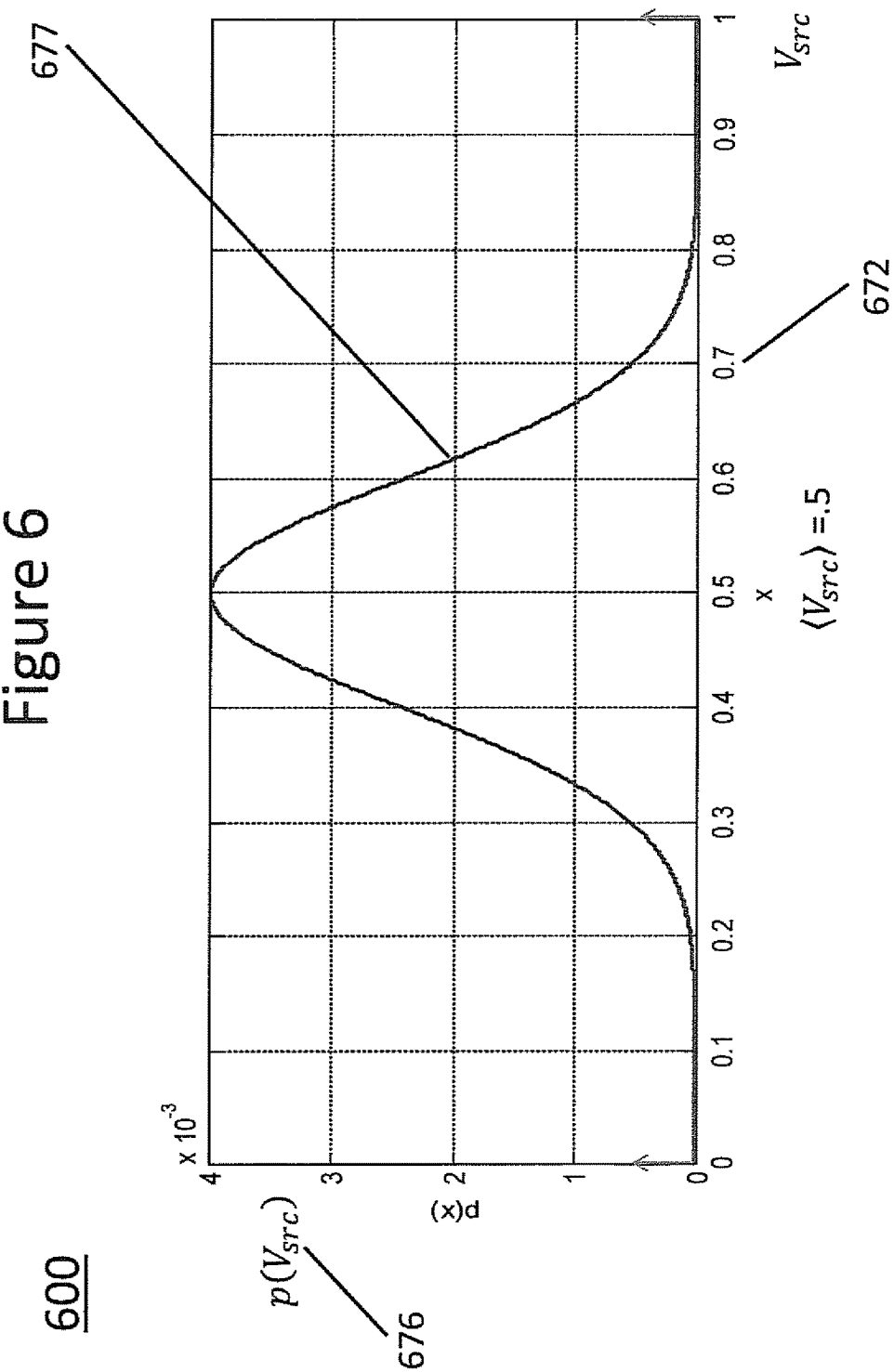
FIG. 6 shows a graphical representation of an approximate Gaussian Probability Density Function (pdt) with 0.5 mean.

Specifically, FIG. 6 shows a graphical representation 600 of an approximate Gaussian PDF with 0.5 mean. As shown in FIG. 6, $V_{src}$ is plotted on the X-axis (horizontal) 672 and the probability for a specific value of $V_{src}$, $p(V_{src})$, is plotted on the Y-axis (vertical) 676. Curve or plot 677 implies a linear channel.

Another embodiment of the present invention is that, for example, suppose an asymmetric nonlinear function is applied to a channel with a Gaussian signal which limits values of $V_{src}$ above $V_\varepsilon$. The Gaussian signal may have the pdf for $V_{src}$ depicted in FIG. 6 applied to the channel nonlinearity of FIG. 5.

Figure 7:
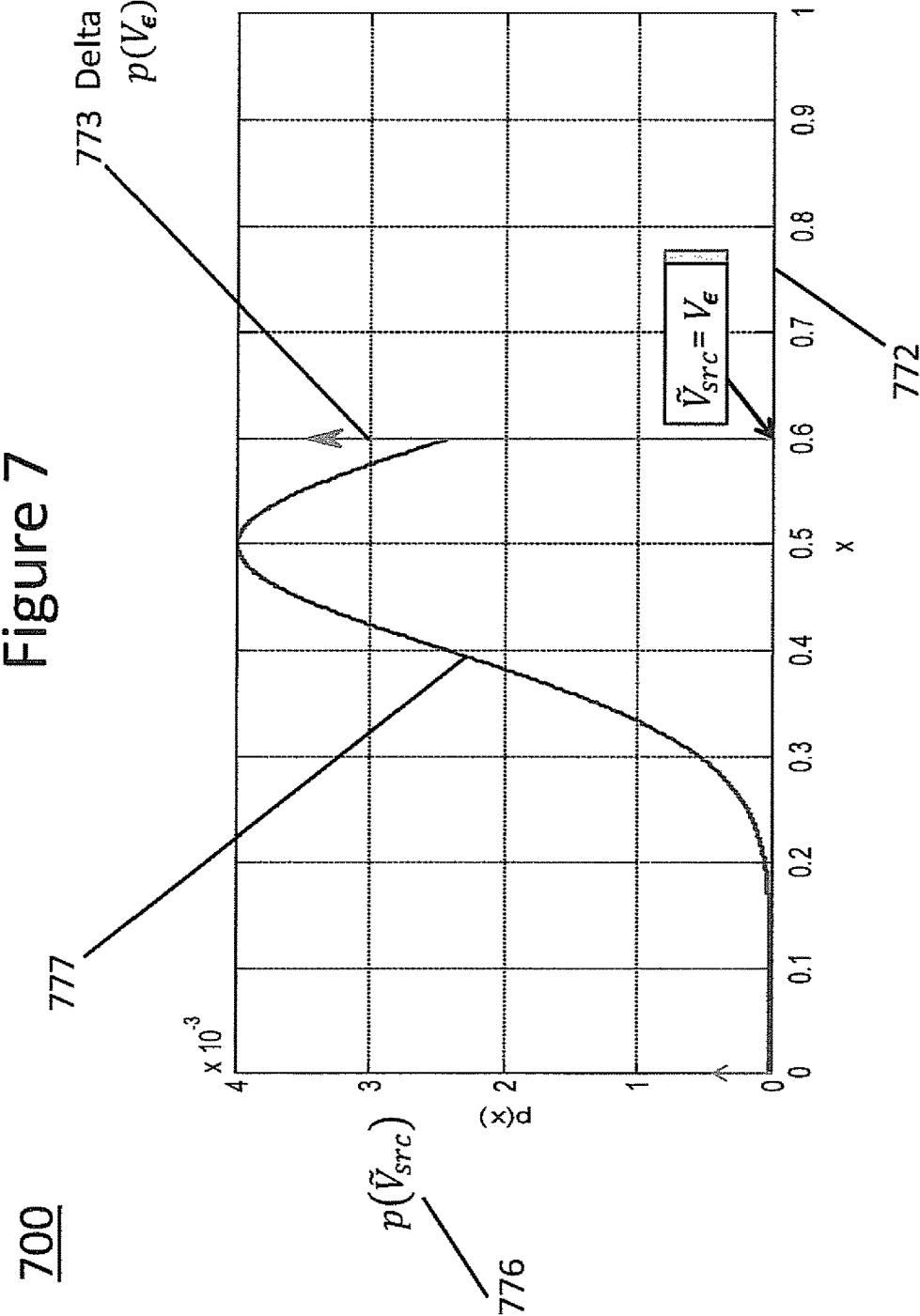
FIG. 7 shows a graphical representation of an approximate truncated Gaussian Probability Density Function (pdf).

A pdf (probability density function) is shown in FIG. 7. FIG. 7 shows a graphical representation 700, which shows $V_{src}$ is plotted on the X-axis (horizontal) 772 and $p(\tilde{V}_{src})$ is plotted on the Y-Axis (vertical) 776. Curve or plot 777 is shown. At point 0.6, as shown by 773 a vertical delta function, the curve 777 is truncated.

$\tilde{V}_{src}$ which has a new maximum at the value $V_\varepsilon$=0.6 773 is the new signal derived from $V_{src}$ after clipping (application of nonlinearity of FIG. 5). The asymmetry of $p(\tilde{V}_{src})$ and the inclusion of an appended delta function account-for the displaced probability mass of the original $p(V_{src})$. With the appended delta function, the total probability measure is, $$\int_{-\infty}^{\infty} p(\tilde{V}_{src}) d\tilde{V}_{src} = 1$$

As shown in FIG. 7, the uncertainty for the signal has been removed for $\tilde{V}_{src} > V_\varepsilon$. Likewise, the uncertainty metric H(y) is also affected because the correspondence between the mapping of H(x) and its component density function $p(\tilde{V}_{src})$ plotted on Y-axes has been significantly altered. Using Shannon's notation the capacity will also be modified.

$$H(x) + H_x(y) = H(y) + H_y(x)$$

$$H(x) - H_y(x) = H(y) - H_x(y)$$

$$R \triangleq H(x) - H_y(x)$$

$$\max\{R\} \triangleq C$$

H(x): Uncertainty metric or information entropy of the source in bits (or bits/sec).
$H_x(y)$: Uncertainty of the channel output given precise knowledge of the channel input.
H(y): Uncertainty metric for the channel output in bits (bits/s).
$H_y(x)$: Uncertainty of the input given knowledge of the output observable (this quantity is also called equivocation).
R: Rate of the signal moving through the channel in bits/sec.
C: Capacity given H(x), H(y), $H_y(x)$, $H_x(y)$ Examination of $p(\tilde{V}_{src})$ indicates that $V_{src}$ is ambiguous once $V_\varepsilon$ is exceeded on the input to the channel where $V_\varepsilon$ is the voltage at which $V_{src}$ clips. That is, $H_y(x)$ is increased for this case. Hence $$H_{y \to \tilde{V}_{src}}(x) > H_{y \to V_{src}}(x)$$

Therefore;

$$\max\{H(x) - H_{y \to V_{src}}(x)\} > \max\{H(x) - H_{y \to \tilde{V}_{src}}(x)\}$$

$$C_{V_{src}} > C_{\tilde{V}_{src}}$$

This proof is consistent with Shannon's theorems. The proof supports the information loss proposition. It is ascertained that for certain value ranges of $V_\varepsilon$ that the link can be broken (through information loss) beyond an acceptable limit. A quality metric for assessing the degradation is given by;

$$\frac{C_{\tilde{V}_{src}}}{C_{V_{src}}} = 1 - C_{deg}$$

where $C_{deg}$ represents the percentage channel capacity degradation. $C_{deg}$ may be a useful metric for assessing the information impact of algorithm nonlinearities.

Manipulation of the pdf (probability density function) conserves charge and associated fields related to the physical processes but the uncertainty of the charge functional may be reduced and therefore Shannon's information uncertainty metric may be reduced, resulting in information loss. Under certain conditions, partial information can be preserved and operation of the apparatus efficiency significantly enhanced. This consequence will be addressed in greater detail herein.

There is a one-to-one correspondence between the information entropy H(x) emitted from the source per unit time and the values of the signal $V_{src}$. The uncertainty of the source is given by;

$$H(x_{V_{src}}) = -\int p(x_{V_{src}}) \log p \frac{(x_{V_{src}})}{m(x_{V_{src}})} d(x_{V_{src}})$$

In this case $$p(x_{V_{src}}) = \frac{1}{\sqrt{2\pi \langle P \rangle}} e^{-\left(\frac{x_{V_{src}}^2}{2\langle P \rangle}\right)}$$

and $$m(x_{x_{V_{src}}})$$

is a suitable normalization function for Shannon's differential entropy, where $\langle P \rangle$ is the average power of $V_{src}$, proportional to the second moment of the signal of interest through efficiency. That is, $$\langle P \{ \sim \langle V_{src}^2 \rangle \sim \} \eta \overline{V}_{src}^2 \rangle$$

where $\langle V_{src}^2 \rangle$ is the normalized power delivered to the apparatus.

Whenever the conditional uncertainties $H_y(x)=H_x(y)=0$ then information is conveyed and R is maximized, $H(x)=H(y)$.

There is a correspondence between H(x) and the values of $V_{src}$, and dynamic charges due to currents resulting from $V_{src}$ and associated circuit impedances, through the association of symbols from an alphabet with voltages as a function of time, $V_{src}(t)$. The quantities of interest in phase space have an association with the degrees of freedom available through probability densities of $V_{src}(t)$, $(p_{v_{src}})$ a density of states for the physical system is also implicit in the representation of uncertainty indicated by $$H(x) \propto -\int_{-\infty}^{\infty} p_{v_{src}} \ln[p_{v_{src}}] dv_{src}.$$

The physical degrees of freedom associated with $S_{J_e}$ and $S_{J_w}$ are dynamic quantities, defined by the disciplines of irreversible non-equilibrium based thermodynamics or extended irreversible thermodynamics, using the concept of entropy flux whenever the system is not in equilibrium. These flux variables are causally related to functions of H(x), $H_x(y)$, H(y), $H_y(X)$.

Expressions of physical entropies in flux may be recognized as more familiar concepts such as uncertainty in changes of phase and magnitudes of signals along with their corresponding time dependent fluctuating cross-correlation functions. This includes the related signals of interest as well as spurious waveforms, harmonics, amplitude and phase noise, and intermodulation distortions. Heat may be measured separately, though in some cases the list above demonstrates some thermal dependencies. The correspondence of these quantities and the functional descriptions that link them to various physical and information forms of entropy is an embodiment of the present invention, which is an advancement in the art. Likewise, the association of information useful in communications application with the time dependent configuration of matter and energy at fundamental scales is also an embodiment of the present invention and is also an advancement in the state of the art.

RF modulation is the process of imparting information from the information source possessing H(x) to the complex envelope of the RF carrier. In other words, the uncertainty metric quantified by H(x) possesses a physical counterpart mimicking the component symbol probabilities in units of charge transfer per unit time. The resulting signal takes the form $$x(t)=a_I(t)\cos(\omega_c t)+a_Q(t)\sin(\omega_c t)$$

$a_I(t) \underline{\Delta}$ Time variant In Phase component of the Carrier Envelope also called the in-phase amplitude (component) or real amplitude (component).

$a_Q(t) \underline{\Delta}$ Time variant Quadrature Phase component of the Carrier Envelope also called the quadrature amplitude (component) or imaginary amplitude(component).

$\omega_c \underline{\Delta}$ Carrier Frequency $\geq 0$ radians/second

Any point in the complex signaling plane can be traversed by using the appropriate mapping of $a_I(t)$ and $a_Q(t)$. Alternatively, it is possible to use a description based on the magnitude and phase of the complex carrier envelope. Battery operated mobile communications platforms typically possess unipolar energy sources. In such cases, the random variables defining $a_I(t)$ and $a_Q(t)$ are characterized by non-central statistical parameters. A case of interest arises whenever $a_I(t)$ and $a_Q(t)$ are non-zero mean quasi-Gaussian.

It is possible to refer to this case as a complex non-zero mean Gaussian pdf or Gaussian with 2 macroscopic statistical degrees of freedom, not to be confused with the v of the apparatus. Analysis of the RF modulator and unipolar amplifier ought to consider the offset because of the associated energy impacts. This can adversely affect the efficiency of a transmitter. A subsequent analysis provides a general treatment for an apparatus that transfers power to a load given a unipolar energy source and a signal that is approximately Gaussian. The signal plus offset may be DC coupled or AC coupled to a load. In general, AC coupled circumstances are more efficient. The analysis can be extended to the complex Gaussian case by deploying an apparatus for an in phase signal and one for a quadrature phase signal. The signal modulations defining $a_I(t)$ and $a_Q(t)$ thus correspond to a 2-dimensional signaling space that can approach Shannon's capacity limit. This represents a classical case suitable for bounding performance of efficiency for signals that possess large PAPRs.

Figure 13:
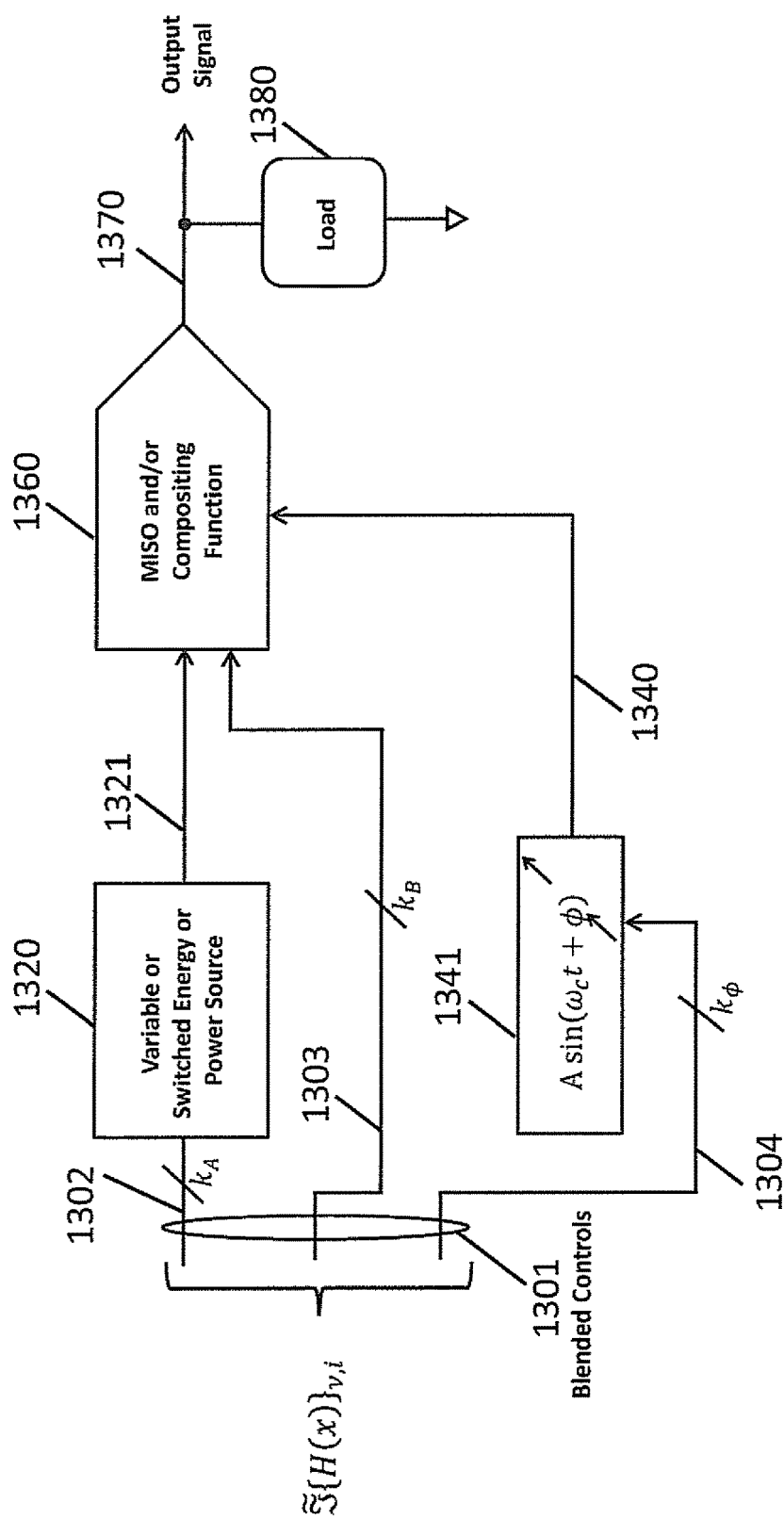
FIG. 13 illustrates a method, using a block diagram, for generating an information bearing function of time using blended controls and compositing.
Figure 14:
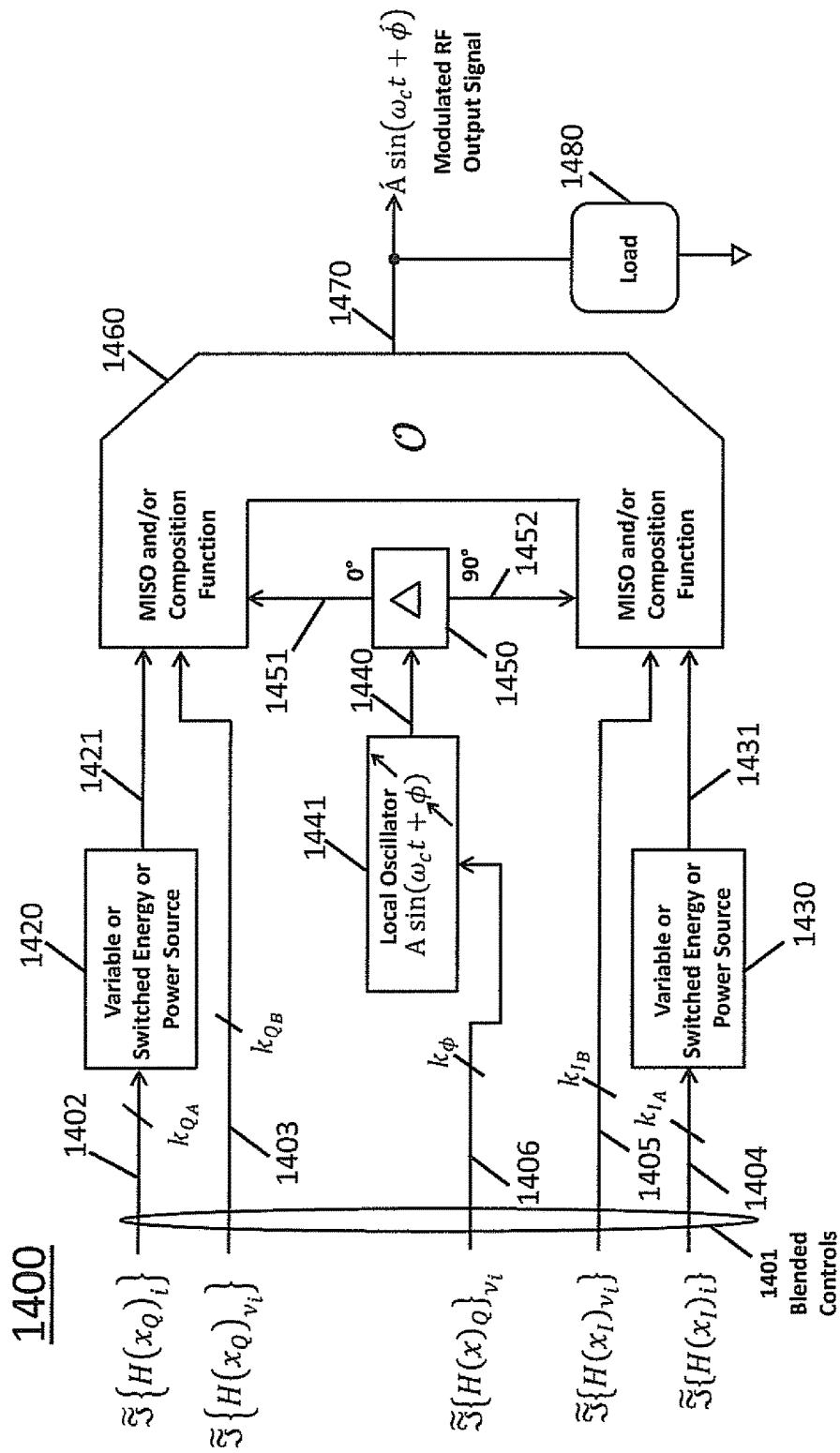
FIG. 14 illustrates a method, using a block diagram, of generating an information bearing function of time using blended controls and compositing.

Circuits designed as embodiments of the present invention to accomplish these modulations can fit many topologies and architectures. However, for linear modulations with unipolar offset, they reduce to two general classes for the amplitude envelope modulator, namely; series and shunt impedance control. The following discussion progresses around these models in terms of efficiency performance for series and shunt configurations as examples suitable for advancing concepts. The treatment for efficiency enhancement illustrated for the following simple models also enjoys common principles which apply to other classes of more advanced modulators. FIGS. 13 and 14 represent higher level architectures which absorb modulator functions such as the ones to be subsequently discussed.

FIG. 8 shows a schematic 800 of a summing node with two input signals and/or waveforms 878, 879 and one output signal 881. This summing node 880 is a linear processing operator enabling the superposition of its inputs. For example x(t) 878 may be a complex signal of interest and n(t) 879 may be a complex noise or interference process.

FIGS. 9A, 9B and 10A, 10B show examples of differential and single ended versions of the series modulator and shunt modulator topology, respectively. Two of these models may be used to create a complex signal. These models represent examples for implementing some portion of the degrees of freedom for an apparatus which may be associated with modulation derived from FLUTTER™ algorithm, for instance portions of FIGS. 13 and 14. Examination of these models provide insight into the nature of efficiency enhancement.

Figure 9A:
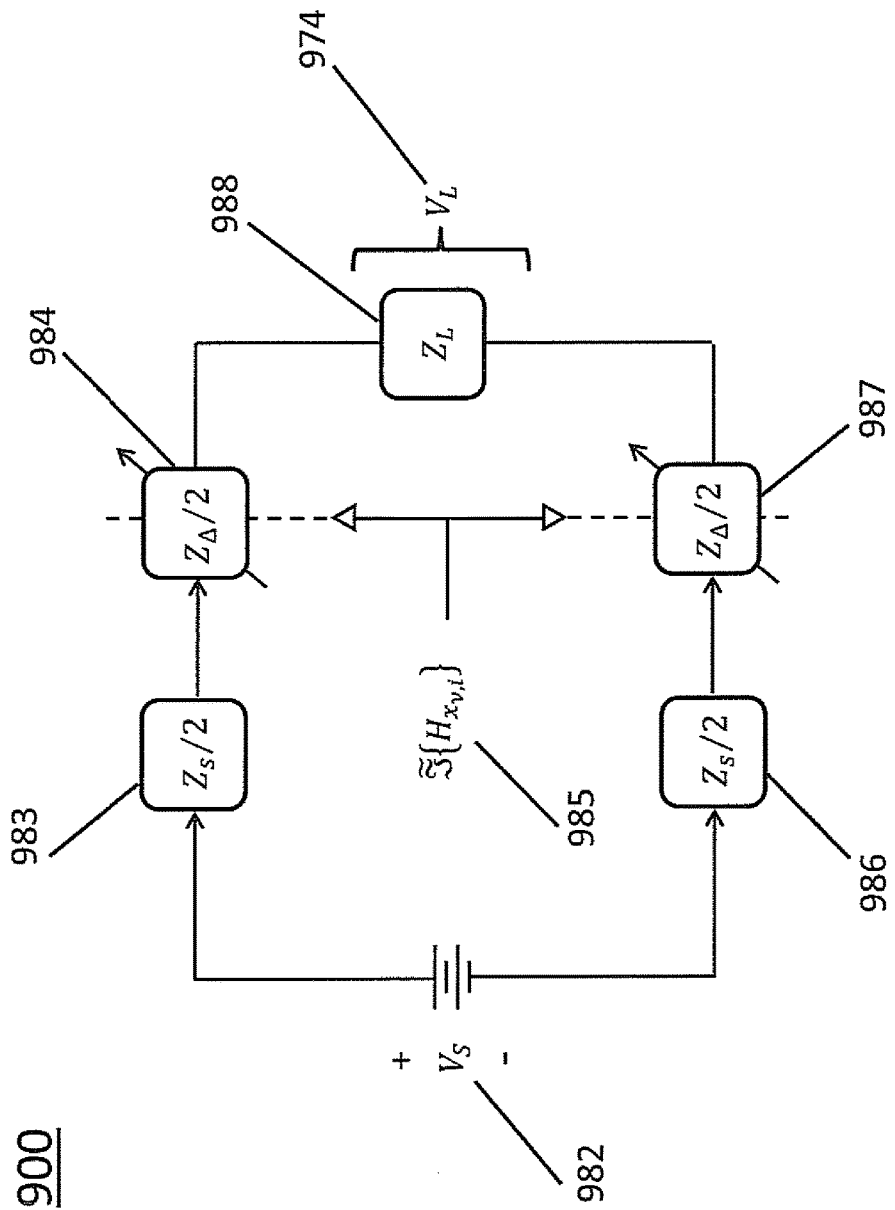
FIGS. 9A and 9B show representations of a differential and single ended Type I series modulator, respectively, that may be used with embodiments of the present invention.
Figure 9B:
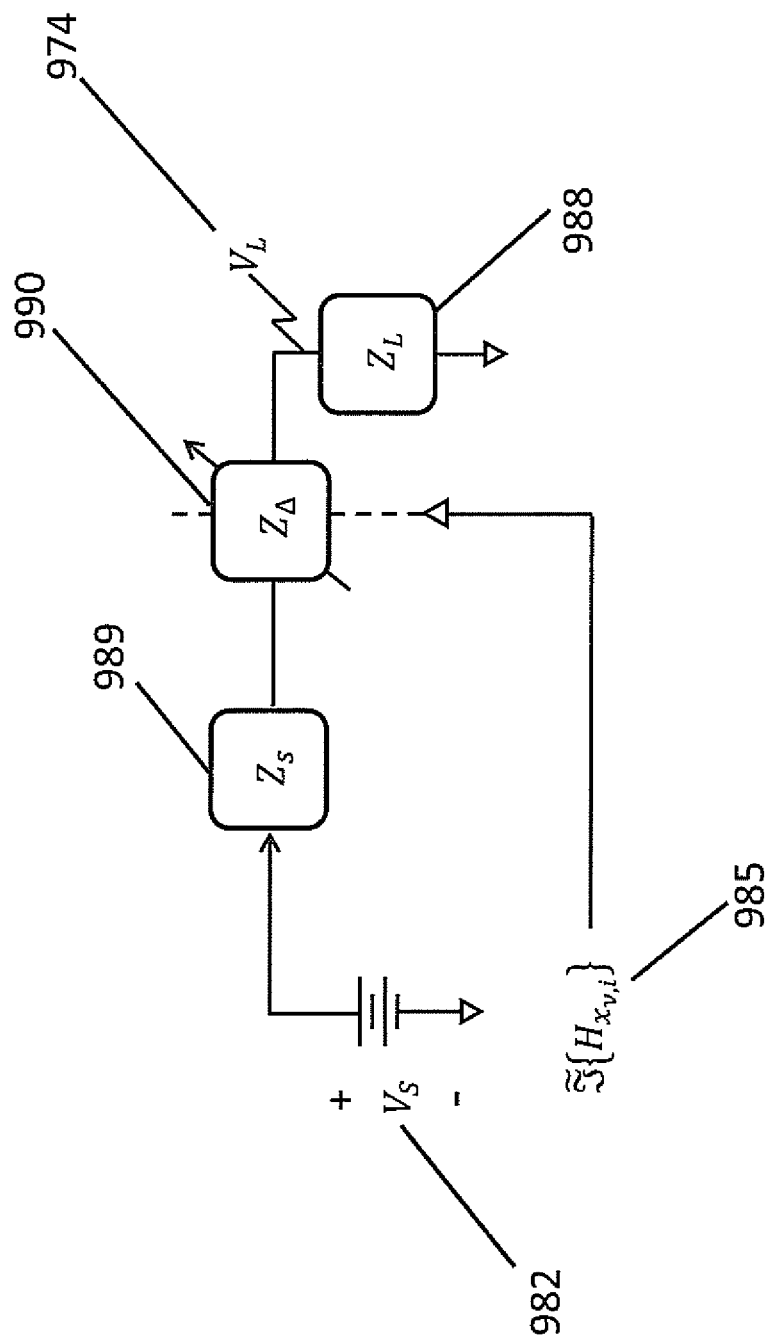

In FIGS. 9A, and 9B, the impedance $Z_\Delta$ is variable from $(0+0_j)\Omega$ to $(\infty+\infty_j)\Omega$. In these extreme states of the models, the power transfer is a maximum only when the series impedance is zero or when the shunt impedance is infinite. Although these models may represent general classes of linear devices, depending on the selection of the complex impedances, the models may be nonlinear as well. It is helpful to focus on those devices first that possess at least some non-zero real components for $Z_s$, $Z_L$, and $Z_\Delta$. These models are hereafter referred to as Type I models. They are useful for reference analysis and do not represent specific implementation. For example, FIG. 9A shows a differential Type I series modulator 900. This modulator 900 includes $V_s$ 982, $Z_s/2$ 983, 986, $Z\Delta/2$ 984, 987 blended control function $\Im\{H(x)_{v,i}\}$ 985, $Z_L$ 988, and $V_L$ 974 blended control function $\Im\{H(x)_{v,i}\}$ 985. FIG. 9B shows a single ended Type I series modulator 910 embodiment that includes $V_s$ 982, $Z_s$ 989 $Z_\Delta$ 990, $V_L$ 974 and $Z_L$ 988. Blended control function $\tilde{\Im}\{H(x)_{v,i}\}$ 985 provides input to $Z_\Delta$ 990, changing its impedance in some proportion to a desired modulation amplitude with an appropriate statistic.

Figure 10A:
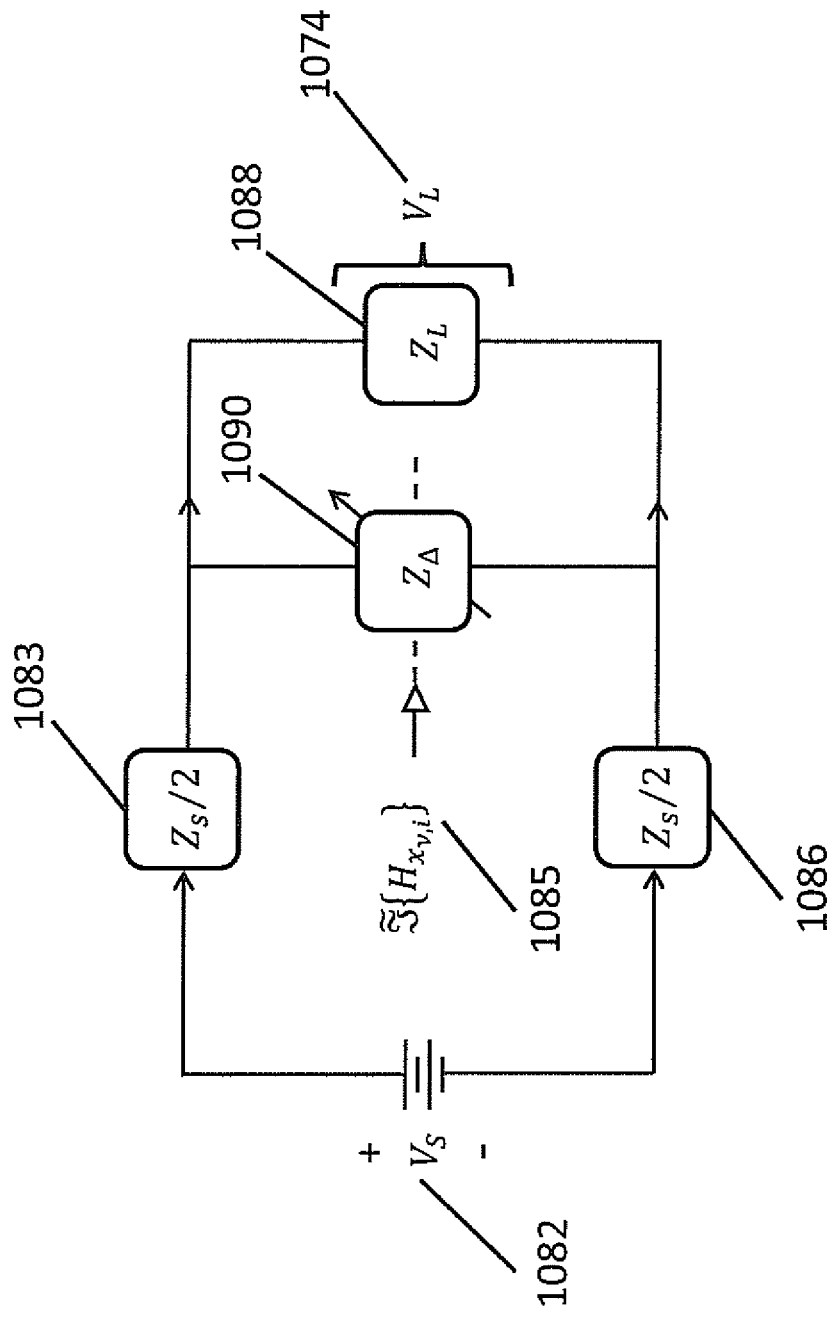
FIGS. 10A and 10B show representations of a differential and single ended Type I shunt modulator, respectively, that may be used with embodiments of the present invention.
Figure 10B:
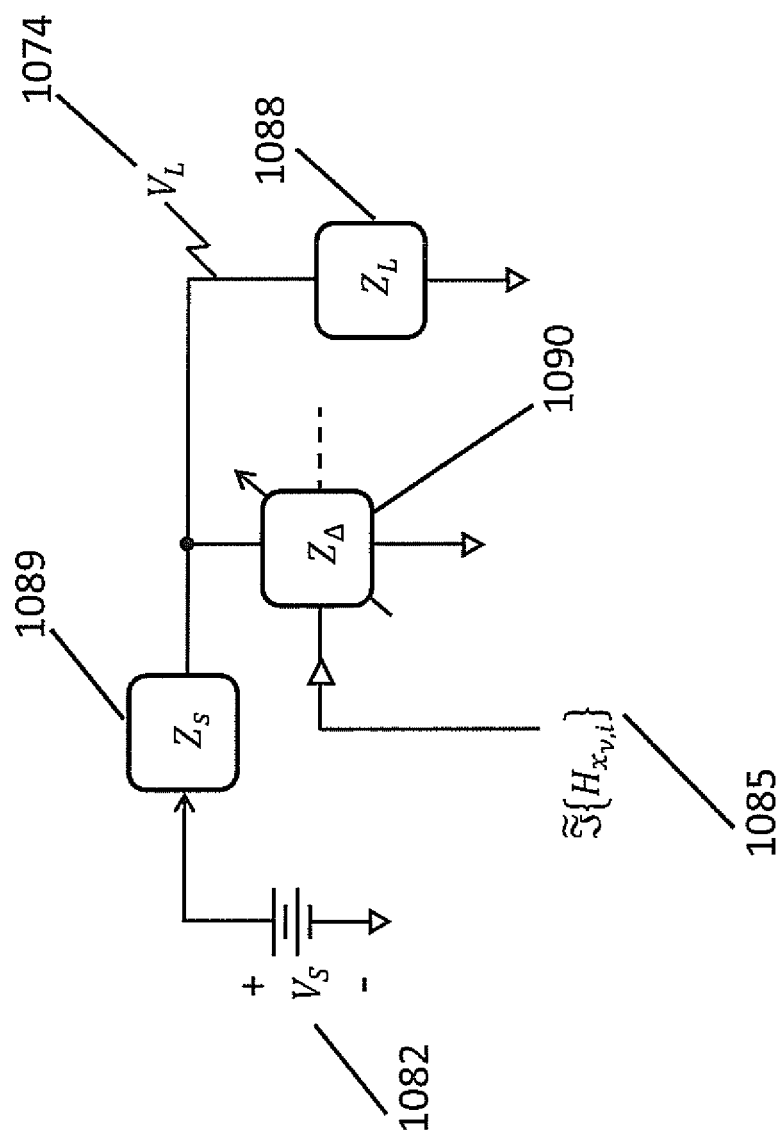

FIGS. 10A, 10B show a differential and single ended Type I shunt modulator, respectively. The differential Type I shunt modulator 1000 of FIG. 10A includes $V_S$ 1082, $Z_S/2$ 1083, $Z_\Delta$ 1090, $Z_L$ 1088, $V_L$ 1074, $Z_S/2$ 1086. Blended control function $\tilde{\Im}\{H(x)_{v,i}\}$ 1085 provides input to $Z_\Delta$ 1090.

The single ended Type I shunt modulator 1010 of FIG. 10B includes $V_S$ 1082, $Z_S$ 1089, $V_S$ 1090, $V_L$ 1074, $Z_L$ 1088, blended control function $\tilde{\Im}\{H(x)_{v,i}\}$ 1085. This shunt modulator includes a differential voltage source, $V_S$ 1082, differential source impedances $Z_S$ 1089, differential shunt impedance $Z_\Delta$ 1090, and load impedance $Z_L$ 1088. Blended control 1085 in both 1000 and 1010 (configurations 1000,1010) provide a signal to $Z_\Delta$ 1090 in both configurations, changing its impedance in some proportion to a desired modulation amplitude, with an appropriate statistic for output voltages.

As shown in FIGS. 9B and 10B, $V_S$ (982, 1082, respectively) provides a voltage source. The control statistic for $\tilde{\Im}\{H(x)_{v,i}\}$ (985, 1085, respectively,) can be fairly intricate depending on the impedances $Z_S$, $Z_\Delta$ and $Z_L$ (i.e., 989, 1089, 990, 1090 and 988, 1088, respectively). $Z_\Delta+Z_S$ must not equal zero in this (shunt) topology for practical application. The dynamics of $\tilde{\Im}\{H(x)_{v,i}\}$ (shown in FIGS. 9B and 10B as elements 985, 1085, respectively) are governed by a desired complex signal and the suitable transforms (linear or non-linear) to create the necessary statistic in $V_L$ (shown in FIGS. 9B and 10B as element 974 and 1074, respectively). The voltage $V_L$ 974, 1074, which changes as a function of $Z_\Delta$ 990, 1090, controlled by $\tilde{\Im}\{H(x)_{v,i}\}$ 985, 1085 may therefore be represented by the function of a complex phasor, where the subscripts I, Q refer to in-phase and quadrature phase components of the signal, respectively.

$$V_\Delta = \tilde{\Im}\{a(t)e^{-i\omega t + \theta(t)}\}$$

$$|a(t)| = \sqrt{a_I(t)^2 + a_Q(t)^2}$$

$$\theta(t) = \left(\arctan\left[\frac{a_Q(t)}{a_I(t)}\right]\right)(\text{sign})$$

$a(t) \equiv$ Complex Waveform Amplitude

The sign operator keeps track of the complex signal quadrant and further defines $\theta(t)$, which represents the phase angle. The phase angle describes the angle of a vector representation of a complex signal.

FIGS. 13 and 14 illustrate two architectural methods of implementing modulators based on FLUTTER™ and blended control-centric algorithms which can be used to render information bearing functions of time. These architectural methods can apply to the ongoing discussions concerning efficiency optimization. That is, the Type I modulator structures as well as virtually any suitable modulator or encoding method may be absorbed by FIGS. 13 and 14 for baseband or RF application. Architectural figures, such as, FIGS. 1, 2, 3, 4, 9A, 9B, 10A, 10B, 15, 18, 20, 21, 22, 27, 28, 29, 30, 31, and 32 are relevant instantiations related to aspects of discussions for FIGS. 13 and 14. Hence, the various functions, structures and modules illustrated in these, FIGS. 1, 2, 3, 9A, 9B, 10A, 10B, 15, 18, 20, 21, 22, 27, 28, 29, 30, 31, and 32 as well as their respective descriptions, are considered as possible structures and/or algorithms or modules which may be distributed as some subset of the FIGS. 13 and 14 architectures and modules.

FIG. 13 illustrates an example of a general architecture 1300 suitable for implementing the portion of the FLUTTER™ algorithm which encodes or modulates information onto a waveform. The FLUTTER™ encoding or modulation segment 1300 is capable of producing baseband signals as well as RF signals at the output (1370). Load 1380 may be driven by output 1370. A baseband signal may be produced by suitable choice of $\omega_c$ and $\phi$ in function/module 1341. Function/module 1341 can also become a local oscillator (LO) by suitable selection of $\omega_c$ the carrier frequency and $\phi$ the phase of the carrier frequency. In the baseband mode $\omega_c$ and $\phi$ are selected along with amplitude (A) to render 1340 as a suitable constant. When the output signal 1370 is a carrier then $\omega_c$ selects the operational frequency and $\phi$ sets the operational phase of 1340 the LO waveform. Blended controls 1301 manipulate multiple degrees of freedom by adjusting the power source 1320 with output signals 1321 and MISO and/or compositing function 1360. The blended controls are functions of system input entropy $H(x)$, represented by $\tilde{\Im}\{H(x)\}_{v,i}$ where v, i are indices suitable for managing the controls. The blended controls are generated in a vector synthesis engine (VSE) according to the FLUTTER™ algorithm. $k_A$ bits from the blended control are allocated 1302 to control the variable or switched energy or power source 1320, to a desired resolution, maximizing efficiency for a minimum number $k_A \cdot k_B$ bits of control 1303 from the blended control 1301 are allocated as additional degrees of freedom to generate an information bearing function of time via a MISO and/or compositing function 1360. $k_\phi$ bits of the control 1304 from the blended control 1301 are allocated to select $\omega_c$ and/or $\phi$ to a desired value and resolution. In addition, both $\omega_c$ and/or $\phi$ may be functions of time. $k_A$, $k_B$, $k_\phi$ are allocated based on the number of available degrees of freedom for the apparatus, 1300, the efficiency for each degree of freedom, and the corresponding potential to distribute a specific signal rate in each degree of freedom.

FIG. 14 illustrates an example of a general architecture 1400 suitable for implementing a portion of the FLUTTER™ algorithm which encodes or modulates complex information onto a waveform. The FLUTTER™ based modulator segment 1400 produces RF signals with corresponding output 1470 that can accomplish universal modulation of a carrier. A local oscillator 1441 can be selected or adjusted for a carrier frequency, $\omega_c$, and phase $\phi$, where one or both may be functions of time and an input information source. The local oscillator (LO) waveform 1440 is distributed in quadrature at a relative phase of 0° 1451 and 90° 1452 with respect to waveform 1440 using a quadrature generating function 1450. The MISO and/or compositing function module 1460 utilizes inputs 1451 and 1452 as quadrature carrier inputs which may be frequency and phase agile functions of time (They may be modulated, and encoded with information). The output of module 1460 is an RF modulated signal 1470. The blended control 1401 are functions of system input information entropy and generated by a vector synthesis engine (VSE). Controls 1402 and 1404 select or adjust the variable or switched energy or power sources, 1420 and 1430 respectively, for in-phase and quadrature branches of the MISO and/or compositing function 1460. The resolutions, in bits, for selecting power in these branches are $k_{Q_A}$ and $k_{I_A}$, associated with waveforms 1421 and 1431. $k_{Q_B}$ and $k_{I_B}$, are the number of bits from the blended controls 1403 and 1405 respectively, providing additional degrees of freedom for the compositing function 1460. $k_\phi$ is the number of bits of resolution allocated for signal or waveform 1406 which selects or determines $\omega_c$ and φ in the LO function 1441 associated with signals or waveform 1440. $k_{Q_A}$, $k_{Q_B}$, $k_{I_A}$, $k_{I_B}$, and $k_\phi$ are allocated based on the number of degrees of freedom for the apparatus 1400 the efficiency for each degree of freedom, and corresponding, potential to distribute a specific signal rate as well as information in each degree of freedom. The output signal 1470 can be provided to load 1480.

As efficiency increases, PAPR for the output signal typically decreases. It can be shown from fundamental principles that a lossless Type I modulator possesses a thermodynamic efficiency of $$\eta \approx \frac{1}{2PAPR}$$

(i.e. when $Z_S$=0). A maximum efficiency results when the output signal PAPR=1 but this is not consistent with amplitude modulation, of $a_I$ and $a_Q$. Thus to encode amplitude information PAPR>1 for the modulator. However, it is possible to increase the total effective bandwidth as one possible option for expansion of phase space to maintain capacity while reducing PAPR, or provide multiple parallel channel branches for transport of information. This can be represented topologically as shown in FIG. 15, which shows a parallel channel configuration to reduce PAPR per branch.

Figure 15:
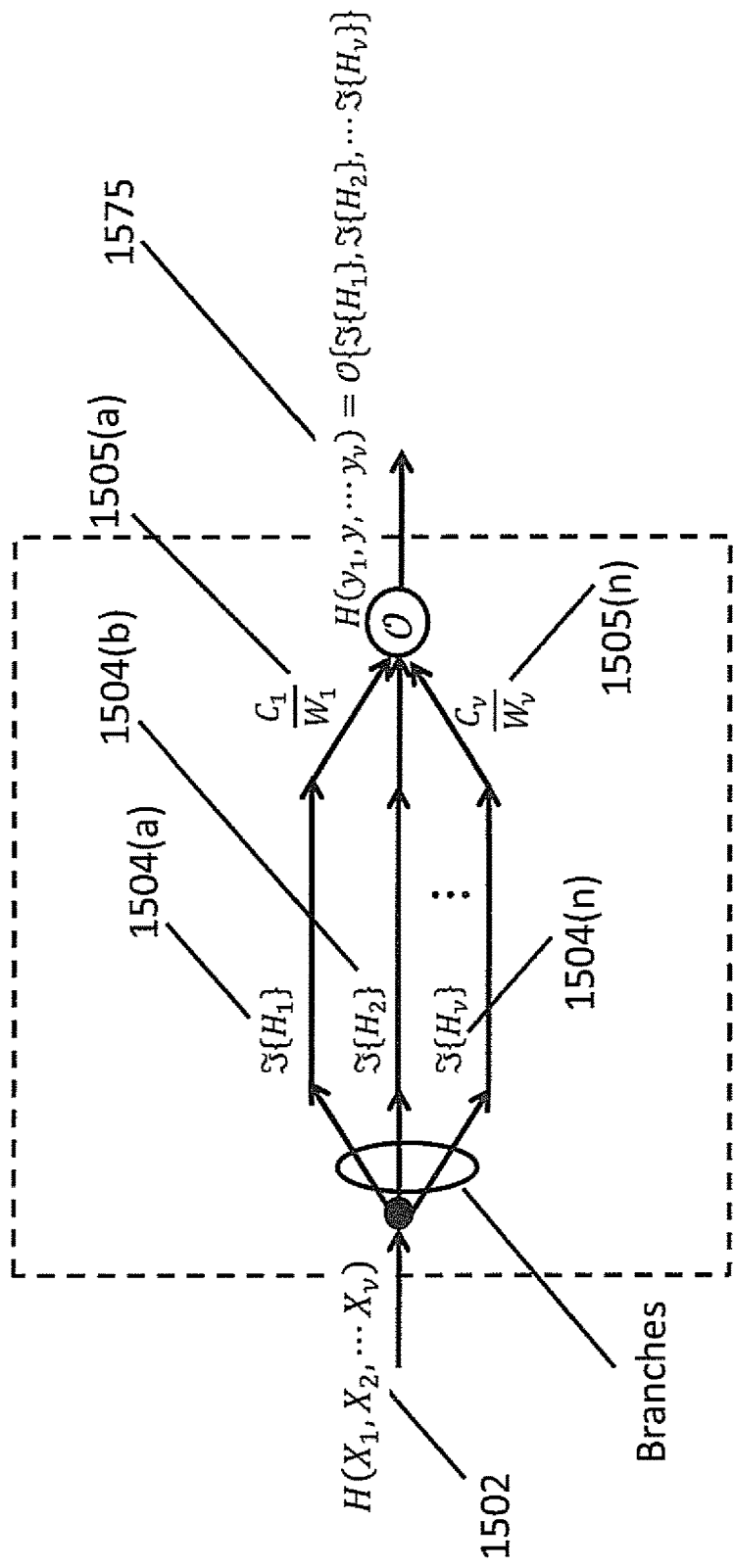
FIG. 15 shows an example of a parallel channel configuration to reduce Peak Average Power Ratio (PAPR) per branch.

FIG. 15 shows a representation 1500 of a parallel "branched" channel configuration to reduce PAPR per branch according to an embodiment of the present invention. As shown in FIG. 15, $H(X_1, X_2 \ldots X_v)$ 1502 is split, or fractured or distributed into component elements $\tilde{\Im}\{H_1\}$ 1504(*a*), $\tilde{\Im}\{H_2\}$, 1504(*b*) and $\tilde{\Im}\{H_v\}$ 1504(*n*) (where "n" is any suitable number). These component elements (generally 1504) have an associated metrics represented as $$\frac{C_1}{W_1} 1505(a) \ldots \frac{C_v}{W_v} 1505(n)$$

(where "n" is any suitable number). The branches of 15 are joined, or merged, or composited to obtain $H(y_1, y_2 \ldots y_v)$ 1575. This composite entropy function 1575, is associated with a rendering, or representation of a desired information bearing function of time. It may be an information bearing function of time, waveform, signal, RF modulated carrier signal, or electronic data that can be converted, downloaded or reproduced as a rendered information bearing function of time. It may also be some intermediate signal to be further processed.

A v branch channel may replace a single branch channel where each branch possesses a lower PAPR. This is achieved by controlling the normalized channel capacity $C_v/W_v$ (generally 1505) per branch such that;

$$C=C_1+C_2 \ldots C_v$$

Each ratio $C_v/W_v$ (generally 1505) may be set as desired. The derivations have assumed certain aspects of the waveform statistic in the given bounds. Each separate branch of the composited channel can possess a smaller PAPR and therefore a correspondingly greater η. However, the topological information flow indicated in FIG. 15, which illustrates a distribution, or dispersal, of information in the form $\tilde{\Im}\{H_1\}\tilde{\Im}\{H_2\}, \ldots \tilde{\Im}\{H_v\}$, (generally 1504) does not specify how the information is parsed to each path 1504(*a*) . . . (*n*) (where "n" is any suitable number) nor re-assimilated at an output node of composite entropy function 1575, from a physical model perspective. In general this can be accomplished by weighting the use of each path to maximize efficiency whilst preserving C to the greates practical extent.

Whenever the output node of composite entropy function 1575 of the conceptual topology is constrained by a continuous time linear electronic circuit model, it may be verified that summation of linear signals in a physical sense also may use a v-way power combiner that redistributes the energy of each separate branch 1504 whenever the v signals are statistically independent.

FLUTTER™ permits the trade between efficiency and capacity by manipulating smaller portions of phase space volume 1504(*a*) . . . (*n*) that collectively reconstitute 1575 statistically while regulating domain interactions. This can be a time-variant nonlinear operation. The time variant nonlinear operations may be distributed to each branch 1504, absorbed by the $\mathcal{O}$ operator or some combination thereof. The domain interactions may be managed in a way that moderates the effects of multi-branch loading phenomena described above through the proper design of $\mathcal{O}$.

Figure 16:
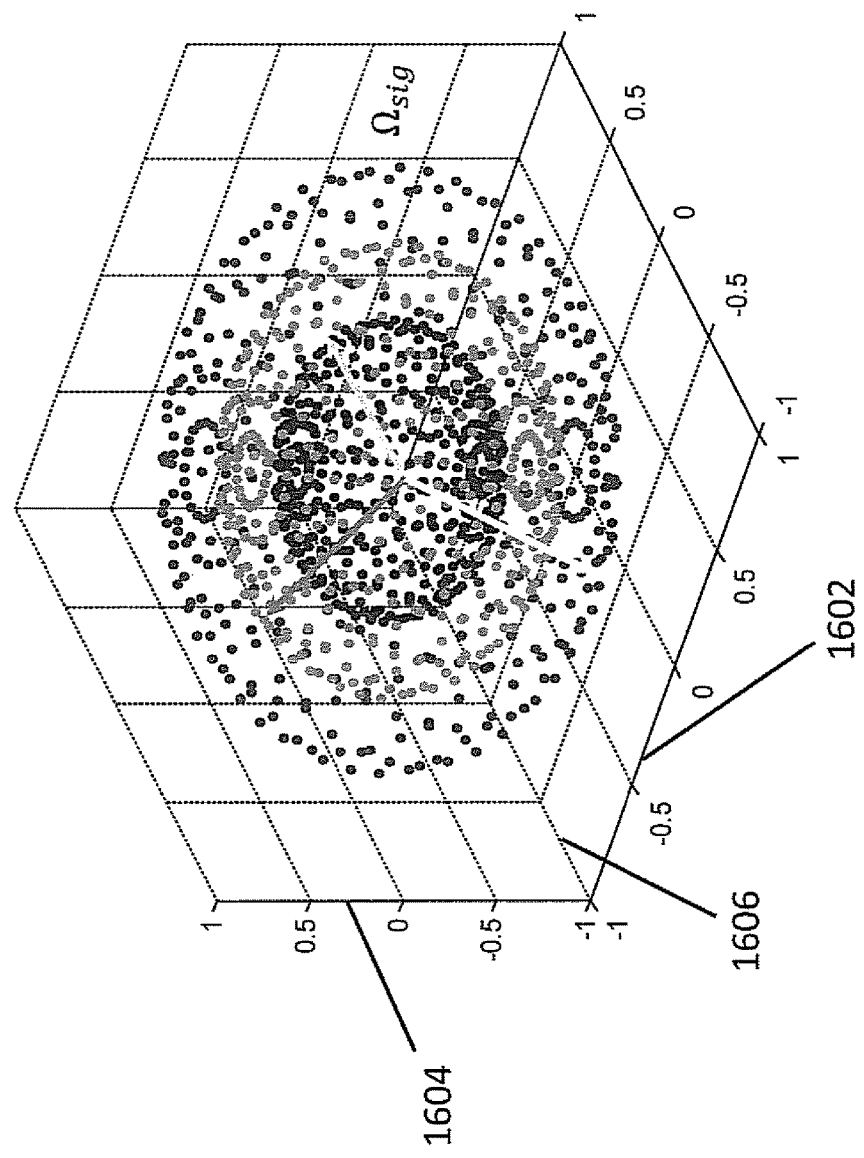
FIG. 16 shows an example of pseudo-phase space samples with three possible energy partitions.

Consider the following volume of phase space which in general could be hyper-geometric but is represented in FIG. 16 with a 3-dimensional geometry. FIG. 16 illustrates an example 1600 of a conceptual phase space or pseudo-phase space, which has been arranged in three tiers corresponding to regions of differing energy levels, or energy partitions. Coordinates within the phase space are randomly highlighted to illustrate the arbitrary samples within partition ranges. The max radii of the concentric scatter volumes roughly mark the energy boundaries. Each unique point in the space represents a member from a signal ensemble. FIG. 16 shows phase space 1600 with three axes. X-axis 1602, Y-axis 1604 and Z-axis 1606.

It is not necessary to maintain symmetry of the volume and it may assume many shapes depending on the corresponding apparatus constraints. However, it is instructive to maintain the total volume substantially constant for purposes of this disclosure, though the shape could morph. By doing so, it is useful to conserve the total uncertainty for accessibility to each coordinate within the space and therefore the information capacity of the space.

Let $p(\check{\eta})$ be the probability density for the instantaneous waveform efficiency associated with FIG. 9B. $p(\check{\eta})$ can be used for both the series and the shunt cases and will be obtained to facilitate an example.

Let $p(V_L)$ be given approximately by;

$$p(V_L) = \frac{1}{\sqrt{2\pi}\,\sigma_{V_L}} e^{-\frac{(V_L - \langle V_L \rangle)^2}{2\sigma_{V_L}^2}}$$

The quantity $(V_L - \langle V_L \rangle)$ is also equal to $\nabla_L$, the AC signal. FIG. 11 depicts this pdf (probability density function), which is a quasi-Gaussian pdf (probability density function) for Output Voltage, $V_L$, with $V_S$=2, $\langle V_L \rangle$=$V_S$/4 (0.5V), and $\sigma_{V_L}$=0.15. FIG. 11 shows graph 1100 that has X-axis (horizontal) 1102 showing $V_L$ and Y-axis (vertical), 1104 showing $p(V_L)$. Curve 1106 is a plot of the Gaussian pdf (probability density function).

The average of the instantaneous efficiency, $\check{\eta}$, is obtained from;

$$\bar{\eta} = \left\langle \text{Re}\left\{\frac{V_L^2}{(V_L V_s) - Z_r(V_L^2)}\right\}\right\rangle = \left\langle \frac{P_{out}}{P_{in}}\right\rangle$$

Also note the supplemental relationships;

$$Z_L = Z_S^*$$

$$Z_r = \frac{Z_s}{Z_L}$$

$$V_{L_{max}} = \frac{V_s}{2}$$

$$\langle V_L \rangle = \frac{V_s}{4}$$

$$V_L = \frac{\check{\eta} V_s}{(1+\check{\eta})}$$

The transformation, $$p_{\check{\eta}} = p(V_L)\frac{d(V_L)}{d(\eta_i)},$$

enables the result;

$$p(\check{\eta}) = \frac{V_s}{(1+\check{\eta})^2}\frac{1}{\sqrt{2\pi\sigma_{V_L}^2}}e^{-\frac{\left(\check{\eta}\frac{V_s}{(1+\check{\eta})} - \frac{V_s}{4}\right)^2}{2\sigma_{V_L}^2}}$$

$\check{\eta}$ is an instantaneous waveform efficiency. It is not the proper thermodynamic efficiency. However, optimization of $\check{\eta}$ can be shown to optimize proper thermodynamic efficiency under certain conditions contemplated by the FLUTTER™ algorithm. Sometimes this alternate efficiency metric ($\check{\eta}$) is a desirable object of optimization.

Figure 12:
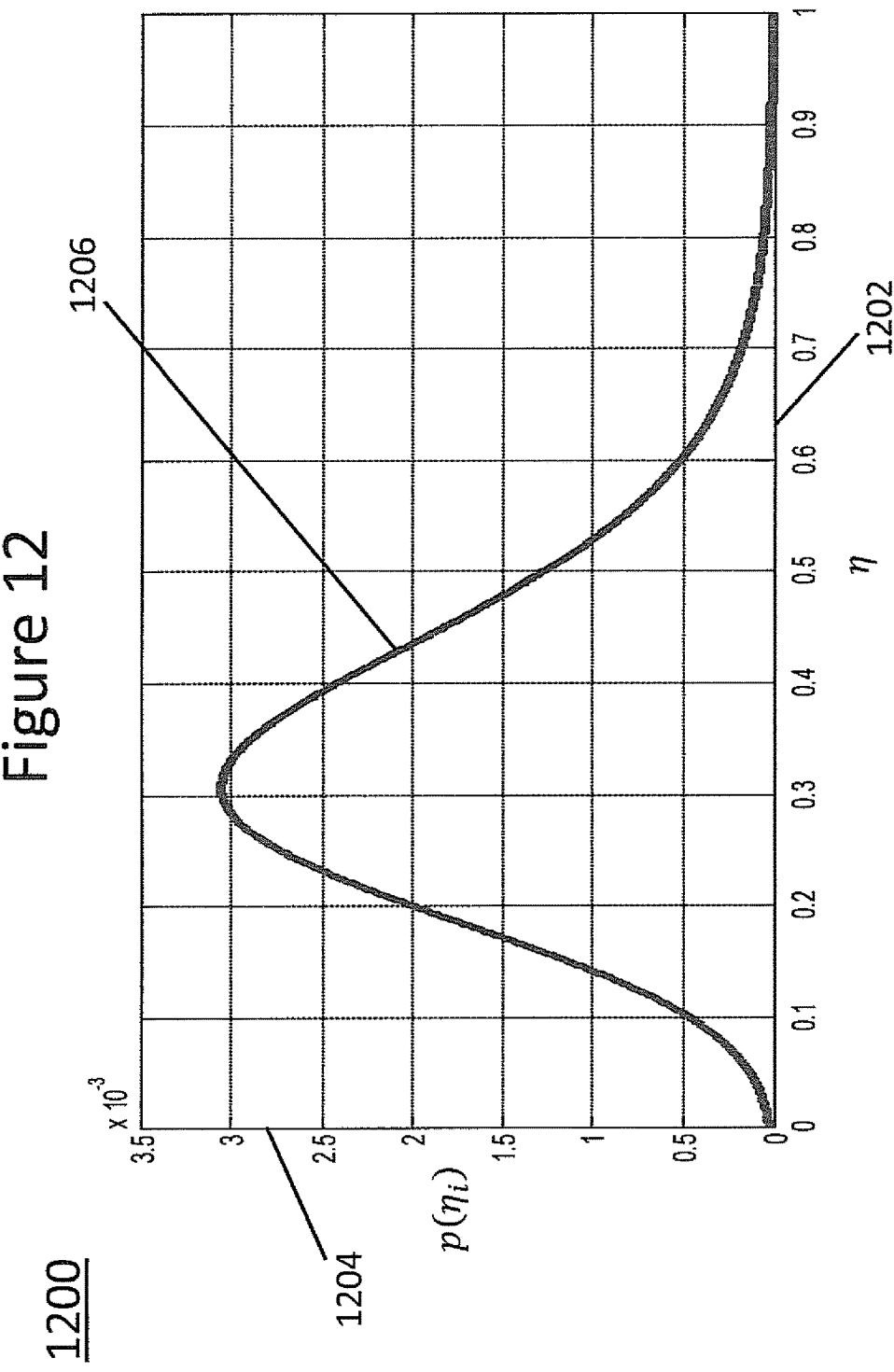
FIG. 12 shows a graphical representation of a Probability Density Function (pdf) for the instantaneous efficiency of a particular Type I modulator.

A plot of this pdf (probability density function) is shown in FIG. 12 as graph 1200. X-axis (horizontal) 1202 and Y-axis (vertical) 1204 are used to plot a pdf (probability density function) 1206 for $\check{\eta}$ given Gaussian pdf for Output Voltage. $V_L$, with $V_S=2$, $\langle V_L \rangle = V_s/4(0.5V)$, and $\sigma_{V_L}=0.15$, $\langle \check{\eta} \rangle \cong 0.34$.

The efficiency associated with FIG. 12 possesses an $\langle \check{\eta} \rangle$ of approximately 034. FIGS. 11 and 12 represent a starting reference point for enhanced efficiency example, given the assumption of the simplified amplitude/envelope modulator models. The signal PAPR for this example is approximately 11.11.

Figure 17:
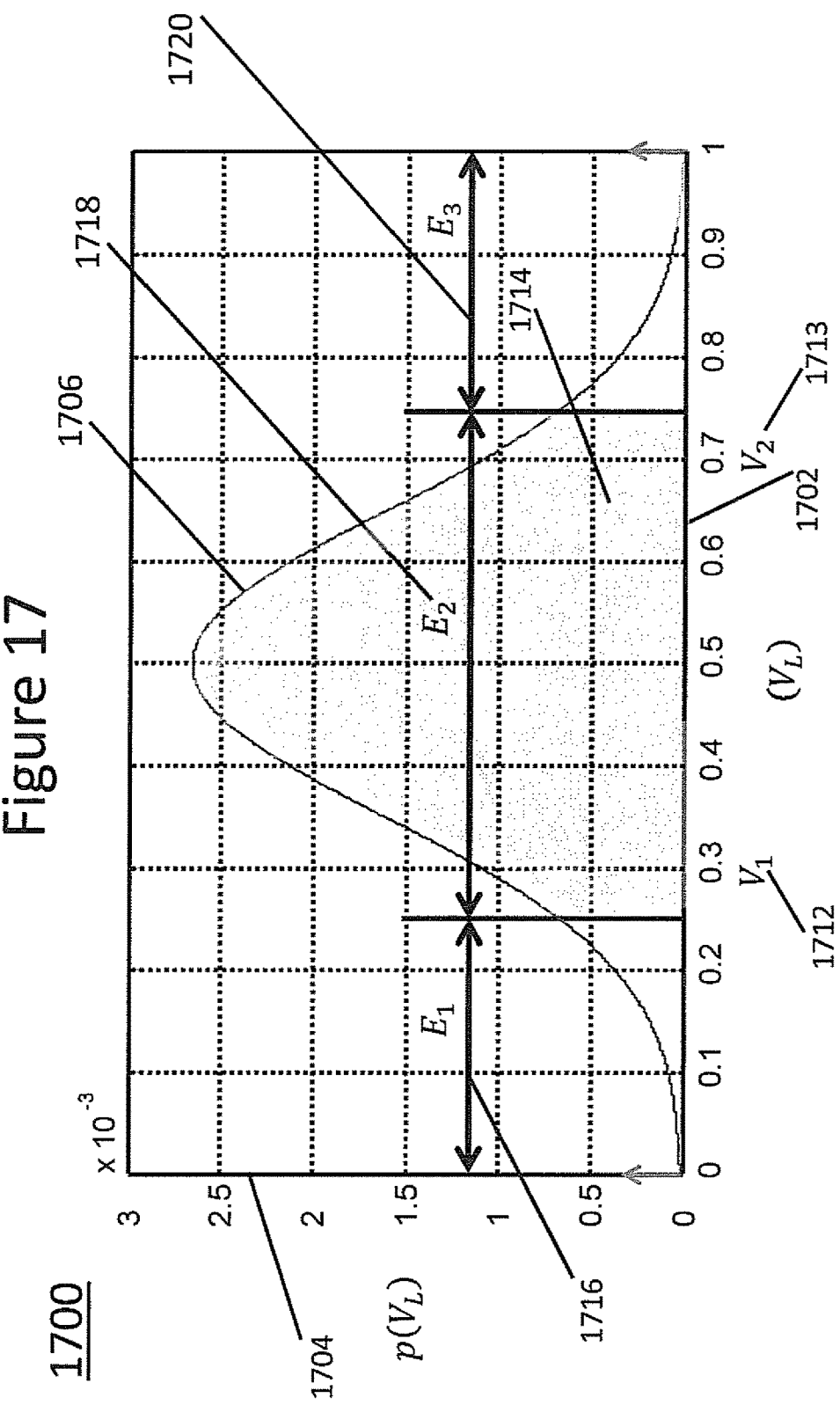
FIG. 17 shows a graphical representation of an approximate Gaussian Probability Density Function (pdf) for output voltage at certain parameters, illustrating an example associated with three energy partitions.

One explanative example describes a method for using a portion of a FLUTTER™ algorithm to select energy partitions of the variable $V_L$. The phase space from FIG. 16 corresponds to the partitions for the random variable $V_L$, as shown in FIG. 17, which shows an example plot 1700. The X-axis 1702 shows $V_L$ and the Y-axis shows $p(V_L)$ 1704. Curve 1706 is shown as having three distinct portions. Portion 1716 shows $E_1$, portion 1718 shows $E_2$ and portion 1720 shows $E_3$. An area under curve 1706 is shown as 1714. Specifically, the plot 1700 of FIG. 17 shows an approximate Gaussian pdf (probability density function) for Output Voltage, $V_L$, with $V_S=2$, $\langle V_L \rangle = V_s/4(0.5V)$, and $\sigma_{V_L}=0.15$ three Separate Energy Partitions, $E_1$, $E_2$, $E_3$. Note, the energies are actually the squared values for $V_L$ over the indicated ranges.

In this example, the apparatus, as described herein, can be considered as possessing three separate energy sources that are multiplexed at the interface between the potential boundaries, $V_1$, $V_2$, (shown as elements 1712 and 1713, respectively) as the amplitude statistic dictates. Voltages $V_1$ (1712) and $V_2$ (1713) may assume values from 0 to 1 volt as required for an application associated with the statistic of FIG. 17. It is possible to define the domain association rule as;

$E_1$ if; $V_L < V_1$ $E_2$ if; $V_1 \leq V_L \leq V_2$ $E_3$ if; $V_L < V_2$

Notice the distinction between the partitioned pdf (probability density function) of FIG. 17 and the pdf (probability density function) of FIG. 7. In FIG. 17 information is preserved across the energy domain boundaries while in FIG. 7 information is lost, or annihilated and environmental entropy is correspondingly increased. The situation of FIG. 7 has been avoided for this example.

In the following discussion $\eta$ can be a thermodynamic efficiency or an instantaneous waveform efficiency depending on the suitable choice of the definition for ($\eta$) or pdf ($\check{\eta}$) a derived quantity based on the signal statistic and circuit parameters and topology. In the case of a thermodynamic efficiency, the kernels of the integrals are constant functions which are calculated from the ratios of pre averaged quantities, $\langle \sigma_L^2 \rangle_i / \langle P_{in} \rangle_i$. $\langle \sigma_L^2 \rangle_i$ is the output signal variance (output signal power) of the $i^{th}$ partition. $\langle P_{in} \rangle_i$ is the input power for the circuit in the $i^{th}$ partition.

The calculations of $\langle \eta \rangle_{1,2,3}$ may also be obtained from (where $\zeta$ is associated with a threshold index);

$$\langle \eta \rangle_i = k_{i\_norm} \int_{\eta_{\zeta-1}}^{\eta_\zeta} \eta p(\eta) d(\eta); \; i=1,2,3$$

i provides the domain (in this case the domain corresponds to partition) increment control for the calculations and $k_{i\_norm}$ provides a normalization of each domain such that each separate domain possesses a cdf (cumulative distribution function) equal to a maximum measure of 1 at the upper boundary. In some of the subsequent treatments $k_{i\_norm}$, or suitable equivalents, will be included in the factors $\lambda_i$ also known as weighting factors. In some discussions these factors shall remain separate.

The following equations for averaged instantaneous efficiency and thermodynamic efficiency (respectively) apply to a Type I series dissipative modulator with a power source resistance equal to the load resistance.

$$\check{\eta} \Delta \left( \frac{V_L^2}{V_L V_s - V_L^2} \right)$$

$$\eta \Delta \frac{\langle \check{V}_L^2 \rangle}{\langle V_L V_s - V_L^2 \rangle} = \frac{\sigma^2}{\langle P_{in} \rangle}$$

Suppose we recursively apply this efficiency calculation to separate partitions with the first boundary @ $V_1=0.25$ volts and the second boundary @ $V_2=0.75$ volts. These thresholds correspond to a 2 bit resolution over a 1 volt dynamic range. In this circumstance the averaged normalized efficiencies for the 3 regions are associated with a probability weighting for each region;

| Instantaneous Efficiency | Weighting Factor |
| --- | --- |
| $\langle \check{\eta}_1 \rangle \cong .674$ | $\lambda_1 \cong .035$ |
| $\langle \check{\eta}_2 \rangle \cong .5174$ | $\lambda_2 \cong .928$ |
| $\langle \check{\eta}_3 \rangle \cong .672$ | $\lambda_3 \cong .035$ |

The final weighted average is;

$$\langle \check{\eta}_{tot} \rangle = \eta_{sx}(\lambda_1 \langle \check{\eta}_1 \rangle + \lambda_2 \langle \check{\eta}_2 \rangle + \lambda_3 \langle \check{\eta}_3 \rangle) \cong 0.517$$

The final weighted average is;

$$\langle \check{\eta}_{tot} \rangle = \eta_{sx}(\lambda_1 \langle \check{\eta}_1 \rangle + \lambda_2 \langle \check{\eta}_2 \rangle + \lambda_3 \langle \check{\eta}_3 \rangle) \cong 0.517$$

In this case, the switch efficiency $\eta_{sx}$ is set to the value of 1.

Figure 18:
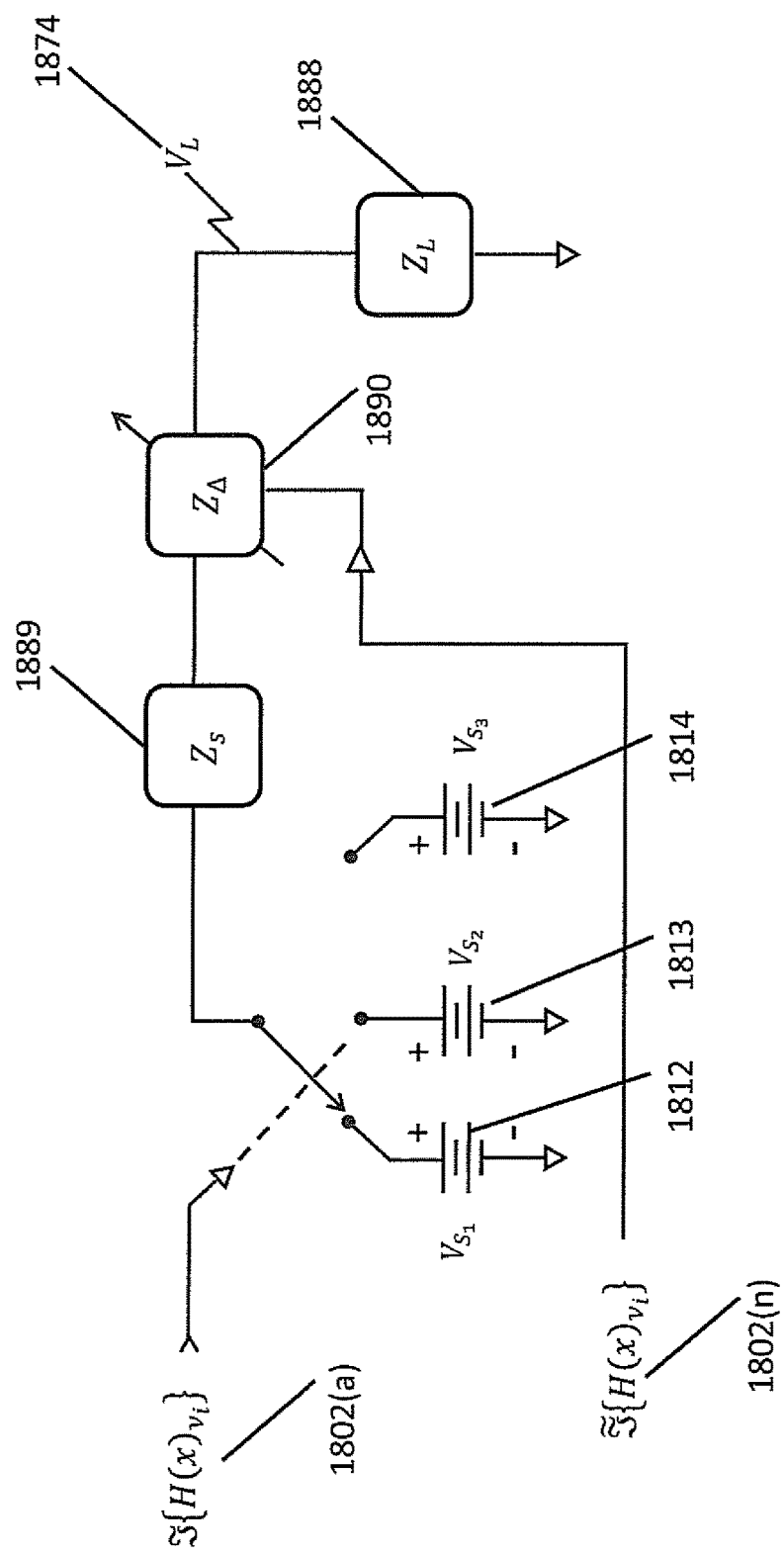
FIG. 18 shows a block diagram of a circuit that transitions as a statistically influenced boundary is traversed.

The corresponding block diagram for an architecture associated with this calculation is shown as FIG. 18.

FIG. 18 shows a power switching module and series type 1 modulator 1800. This switching module and series modulator 1800 includes $\tilde{\Im}\{H(x)_{v_1}, H(X)_{v_2}, \ldots H(x)_{v_i}\}$ 1802,(a) . . . (n) (blended controls where "n" is any suitable number). $V_{S_1}$ 1812, $V_{S_2}$ 1813 and $V_{S_3}$ 1814. Blocks 1888, 1889 and 1890, which are impedances associated with a shunt modulator, are also shown. $V_L$ 1874 is developed by an output current flowing through $Z_L$ 1888. As shown in FIG. 18, the apparatus 1800 transitions as each statistical boundary is traversed, selecting a new energy partition according to $\tilde{\Im}\{H(X)_{v_1}, H(X)_{v_2}, \ldots H(x)_{v_i}\}$ (generally 1802).

The final weighted average of this solution for this particular FLUTTER™ example has not yet been optimized. As will be discussed herein, a FLUTTER™ energy partitioning optimization algorithm can improve on the results of this example.

From the prior example, it is possible to obtain an optimization of the form $$\max\{\langle \check{\eta}_{tot} \rangle\} = \max\{\lambda_1 \langle \check{\eta}_1 \rangle + \lambda_2 \langle \check{\eta}_2 \rangle + \lambda_3 \langle \check{\eta}_3 \rangle\}$$

$$\sum \lambda_i = 1$$

$$\min\{H(x) - H(y)\}$$

It is also noted that $$\langle \check{\eta}_1 \rangle = \tilde{\Im}\{V_{S_1}\}, \langle \check{\eta}_2 \rangle = \tilde{\Im}\{V_{S_1}, V_{S_2}\}, \langle \check{\eta}_3 \rangle = \tilde{\Im}\{V_{S_2}, V_{S_3}\}$$

The overall goal is to solve for the optimum energy partitions $E_1$, $E_2$, $E_3$ (see FIG. 17, elements 1716, 1718 and 1720, respectively,) by selecting the most efficient voltages $V_{S_1} = 2V_1$, $V_{S_2} = 2V_2$, $V_{S_3} = 2V_3 - V_{S_3}$ is selected as the maximum available supply by definition and was set to 2V for the prior example. The minimum available voltage is set to $V_{S_0} = 0$. Therefore only $V_{S_1}$ and $V_{S_2}$ are calculated for the optimization that simultaneously (or concurrently or in parallel) determines $\lambda_1$, $\lambda_2$ and $\lambda_3$ for this particular scenario.

For the present, assume that $H(x)-H(y)$ can be minimized so that the desired signal is faithfully composited. This is accomplished by manipulating i degrees of freedom as well as other degrees of freedom in the modulator, for example the degrees of freedom associated with $Z_A$ 1890, of FIG. 18. Then application of the maximization algorithm $\max\{\langle \check{\eta}_{tot} \rangle\}$ may be solved using the calculus of variations to obtain solution for $V_{S_1}$ and $V_{S_2}$.

The improved solution for this 3 partition example becomes $V_{S1} = 2V_1 \cong 0.97$, $V_{S2} = 2V_2 \cong 1.3V$. The comparative domain efficiencies and weightings are given by;

| Instantaneous Efficiency | Weighting Factor |
|---|---|
| $\langle \check{\eta}_1 \rangle \cong .667$ | $\lambda_1 \cong .466$ |
| $\langle \check{\eta}_2 \rangle \cong .396$ | $\lambda_2 \cong .399$ |
| $\langle \check{\eta}_3 \rangle \cong .566$ | $\lambda_3 \cong .141$ | and the final total average is $\langle \check{\eta}_{tot} \rangle \cong 0.692$.

Thus, the FLUTTER™ energy partition optimization solution provides a noticeable improvement over an arbitrary 2 bit assignment for thresholds. Moreover, the improvement over a single power source partition is approximately a factor of 2 or 100% improvement of the instantaneous waveform efficiency metric.

The FLUTTER™ algorithm demonstrates that application of optimal thresholds is not ad hoc or arbitrary. For instance, ad hoc binary weighting was illustrated to be inferior to a FLUTTER™ optimization. Standard Legacy envelope tracking schemes which have been digitized do not optimize according to a FLUTTER™ algorithm and therefore are different as well as inferior. A significant benefit of FLUTTER™ is evident in the relatively reduced number of partitions required to provide relative efficiency enhancement. In addition, the partition selection rate may be reduced when additional information entropy is distributed in alternate degrees of freedom. Furthermore, the other degrees of freedom v restore information in the signal envelope not accommodated by the sparse number of partitions. These v degrees of freedom also smooth and/or interpolate the envelope to a desired standard. Legacy approaches and technologies do not restore an envelope using a small number of quantization levels for power supply envelope restoration or envelope following.

When it is desired to ascertain an optimal theoretical solution for both number of energy partitions and their potentials for the case where amplitude is exclusively considered as a function of any statistical distribution $p(V_L)$ (shown in FIG. 11 as Y-axis 1104, FIG. 13 as Y-axis 1304 and FIG. 17, Y-axis 1704 as an example). It is reasonable to begin by using PAPR and $\langle \eta \rangle$ definitions.

$$PAPR \triangleq \frac{P_{out\_peak}}{\langle P_{out} \rangle}$$

$$\langle \eta \rangle \triangleq \frac{\langle P_{out} \rangle}{\langle P_{in} \rangle}$$

$$\therefore \langle \eta \rangle = \frac{P_{out\_peak}}{(PAPR)\langle P_{in} \rangle}$$

This defines $\langle \eta \rangle$ for a single energy partition. The following expression may be used for i energy partitions:

$$\langle \eta \rangle = \sum_i \langle \eta_i \lambda_i \rangle = \sum_i \frac{P_{out_i} \lambda_i}{(PAPR)_i \langle P_{in_i} \rangle} = \sum_i \lambda_i \frac{\langle P_{out_i} \rangle}{\langle P_{in_i} \rangle}$$

From the $1^{st}$ and $2^{nd}$ Laws of Thermodynamics, it can be determined that $$\frac{\langle P_{out_i} \rangle}{\langle P_{in_i} \rangle} \leq 1$$

$$\langle \eta_i \rangle \leq 1$$

$\lambda_i$ is the statistical weighting for $\eta_i$ over the $i^{th}$ partition so that $$\sum_i \lambda_i = 1$$

Given these conditions, it is possible to write the following optimization $$\langle\eta\rangle \triangleq \max\left\{\sum_i \eta_i \lambda_i\right\} = \max\left\{\sum_i \lambda_i \frac{\langle P_{out_i}\rangle}{\langle P_{in_i}\rangle}\right\}$$

Thus, each and every $\eta_i \to 1$ for $\langle\eta\rangle$ to become one. That is, it is impossible to achieve an overall efficiency of $\langle\eta\rangle \to 1$ unless each and every partition is also 100% efficient. Hence, $$\max\langle\eta\rangle = \sum_i \lambda_i = 1$$

It has already been shown that the $\lambda_i$ are calculated as the weights for each $i^{th}$ partition such that;

$$\lambda_i = \int_{V_{L(\zeta-1)}}^{V_{L\zeta}} p(V_L) dV_L$$

It follows for the continuous analytical density function $p(V_L)$ that $$\lambda_{tot} = \int_0^{V_{Lmax}} p(V_L) dV_L = 1$$

Analogously, $$\sum_i \lambda_i = \int_0^{V_{Lmax}} p(V_L) dV_L = 1$$

As stated herein, it is possible to generalize the prior optimization procedure to emphasize the calculation of sufficient partitions which can approach an acceptable tradeoff efficiency, $\langle\eta\rangle$, yet minimizes the number of energy partitions according to practical resource constraints.

Turning now to a discussion of the efficiency gains vs. the number (i) when (i) is finite: Efficiency gain, vs. complexity, technology restrictions and perhaps cost would set an upper lower bound on (i).

The generalized $\eta$ optimization procedure (Type I modulator) may be prescribed for setting partition threshold $\alpha_\zeta$. $\zeta$ will be used an index associated with threshold number at the boundary of the partition. The number of thresholds is one less than the number of partitions. The differences between adjacent threshold are considered as differential quantities in this example.

$$\max\{\eta_{tot}\} = \max\left\{\sum_i \lambda_i k_{i_{norm}} \int_{\alpha_{[\zeta-1\zeta]}}^{\alpha_\zeta} \tilde{\alpha}_\zeta p(\tilde{\alpha}_\zeta) d\tilde{\alpha}_\zeta\right\}$$

-continued $$\alpha_\zeta \triangleq \frac{V_{L_\zeta}^2}{V_{L_\zeta} V_{S_\zeta} - Z_r V_{L_\zeta}^2}, \quad \alpha_{[\zeta-1,\zeta]} \triangleq \frac{V_{L_{\zeta-1}}^2}{V_{L_{\zeta-1}} V_{S_\zeta} - Z_r V_{L_{\zeta-1}}^2}$$

$$\tilde{\alpha}_\zeta \triangleq \frac{V_L^2}{V_L V_{S_\zeta} - Z_r V_L^2}$$

$$d\tilde{\alpha}_\zeta = \left(\frac{V_s}{(V_s - Z_r V_L)^2}\right) dV_L, \quad \zeta = 1, 2, 3 \ldots$$

$$\lambda_i = \int_{V_{L_{\zeta-1}}}^{V_{L_\zeta}} p(V_L) dV_L$$

$$\sum_i \lambda_i \triangleq 1$$

$$V_{L_\zeta} \triangleq \frac{V_{S_\zeta}}{2}$$

$$Z_r \triangleq \frac{Z_s}{Z_L}$$

$Z_S$≡Modulator Energy Source Impedance
$Z_L$≡Modulator Load Impedance

Figure 19:
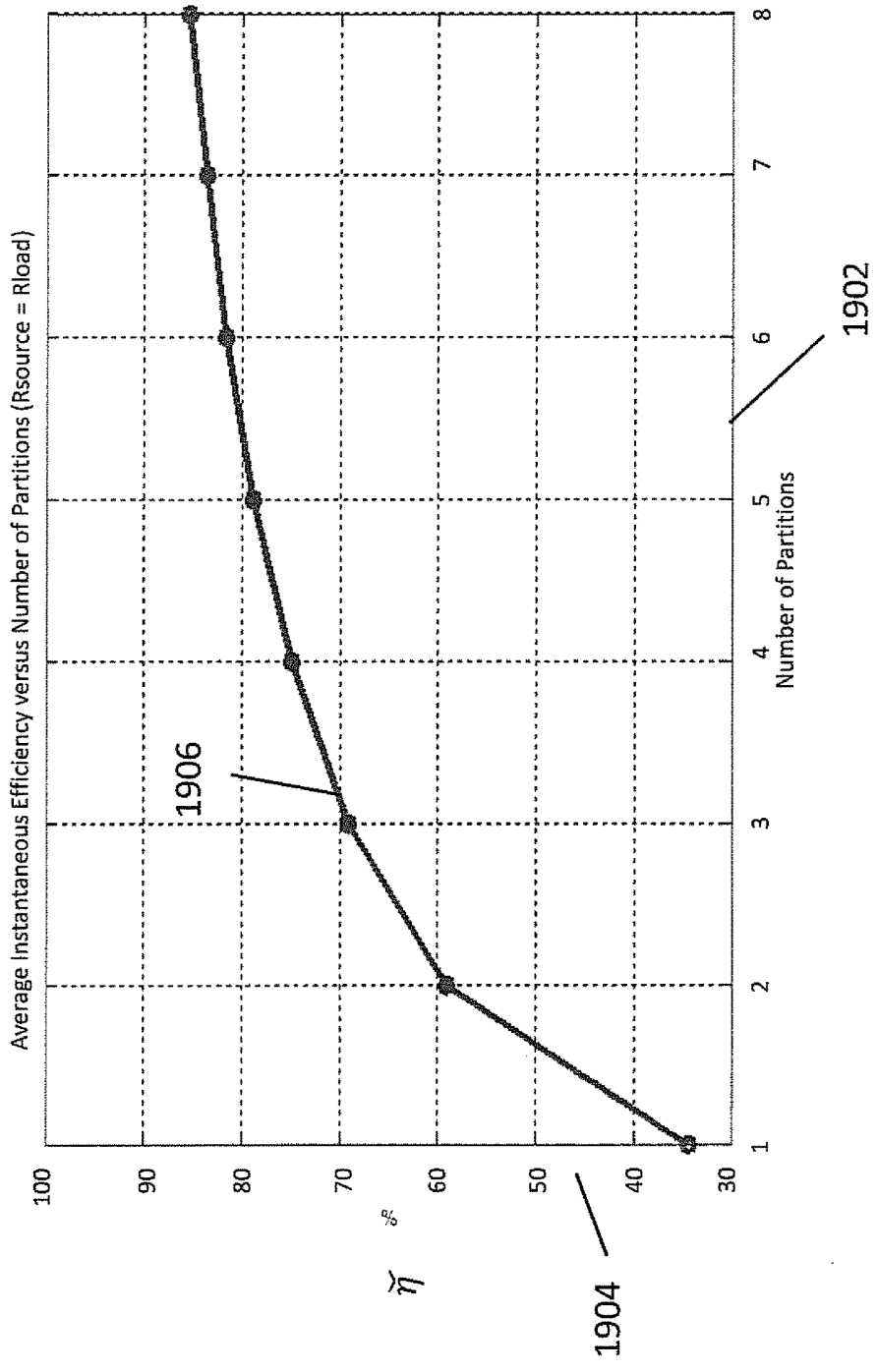
FIG. 19 shows a graphical representation of instantaneous waveform efficiency as a function of energy partition number for a modulator.

FIG. 19 shows a graph 1900 that illustrates the trend of $\check{\eta}$ plotted on Y-axis (vertical) 1904 as a function of the number of partitions, plotted on X-axis (horizontal) 1902, as curve 1906. Specifically, FIG. 19 shows instantaneous waveform efficiency (plotted as curve 1906) as a function of energy partition number for an example of a Type I modulator model processing signal amplitudes characterized by non central Gaussian statistics, for a particular $Z_r$. Notice how the $\check{\eta}$ (instantaneous efficiency) is greatly enhanced for the allocation of only several partitions.

It can be shown that the thermodynamic efficiency $\eta$ and the instantaneous efficiency $\check{\eta}$, for this modulator, are related by (for a single energy partition);

$$\eta \approx \frac{1}{\frac{V_s}{\langle V_L\rangle} PAPR_{sig} + \left(\frac{1}{\check{\eta}} - \frac{V_s}{\langle V_L\rangle}\right)(PAPR_{sig})}$$

$PAPR_{sig}$ is the peak to average power ratio for the signal portion of the waveform.

Thus, increasing $\check{\eta}$ also increases $\eta$ where $0 \leq \check{\eta} \leq \frac{1}{2}$ for a Type I modulator.

Although the particular optimization is in terms of $\check{\eta}$ suitable efficiency choices such as $\eta = \tilde{\Im}\{\check{\eta}\}$ may also be directly optimized. In particular, the thermodynamic efficiency $$\eta = \frac{\langle P_{out}\rangle}{\langle P_{in}\rangle}$$

may also be directly optimized. An additional example will illustrate the results of optimizing thermodynamic efficiency using a direct approach.

Figure 39:
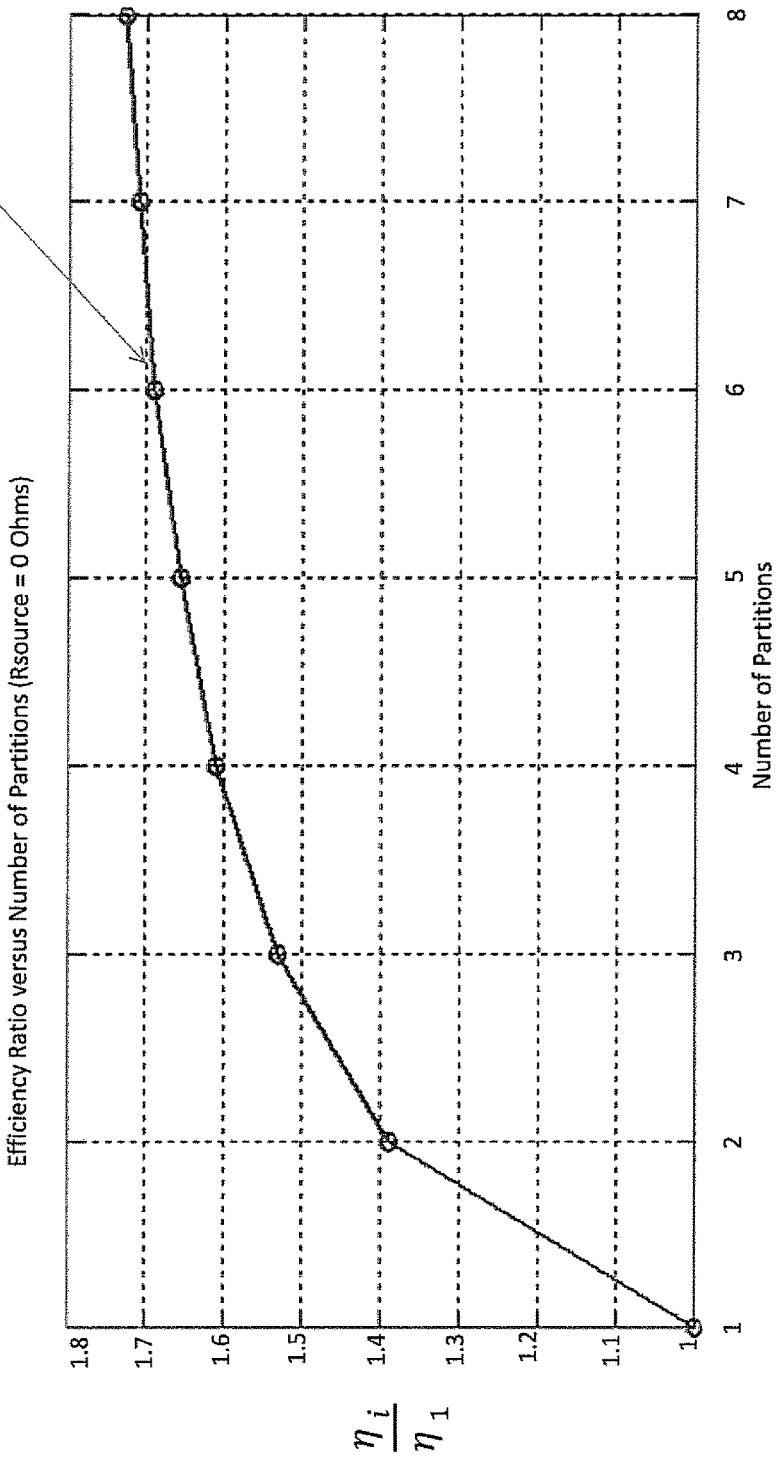
FIG. 39 shows an example of thermodynamic efficiency enhancement performance plot associated with applications of a FLUFF ER™ algorithm to a Type I modulator.

Suppose that the prior example is modified so that a nearly Gaussian signal of ~11.1 PAPR is produced at the output load of a type 1 modulator. Furthermore, suppose that the source resistance is negligible and may be approximated as zero. Now the signal of interest at the output can vary between zero volts and $V_S$=2V. We may apply the same procedures as before to obtain results for the proper thermodynamic efficiency. Furthermore, we calculate the efficiency improvement obtained for the partitioning algorithm compared to a modulator with a single power source. The result is indicated in a graphic plot 3901 in FIG. 39 thermodynamic efficiency improvement $\eta_i/\eta_1$ vs. partition number. Notice that the percentage improvement is 40% for 2 partitions, 54% for 3 partitions and 73.5% for 8 partitions. The ratio is the efficiency for the modulator using i partitions divided by the efficiency for a single power source based modulator. Thus, when Flutter™ is applied and optimal thresholds for partitions employed, only a few power source partitions are required for significant thermodynamic efficiency improvement.

This optimization procedure is in general applicable for all forms of $p(V_L)$ (and therefore different modulator types) even those with discrete Random Variables (RVs), provided care is exercised in defining the partition boundaries and domains for the RV. In this manner very complex Probability Distribution Functions (PDFs) with pdf (probability density functions) subspaces may be processed, though calculation of solutions can prove challenging.

Nevertheless, there are several solution techniques that yield favorable results. Locations of the potentials $V_{L\zeta}$ are not uniformly spaced along the $V_L$ axis. Likewise, $\lambda_i$ are not equally weighted in general. However, as $\zeta$ or consequently i becomes quite large the partitions obtain greater parity. It is an embodiment of the present invention that moderate to low values for $\zeta$ or i, demand optimized partition differentials with threshold boundaries that are not necessarily coincident with quantization differentials or sample thresholds used in envelope restoration or envelope tracking reconstructions. In addition to the prior comments, it should be noted that a change in source impedance of power sources may change efficiency and the threshold optimization of partitions.

In terms of the information quality that has been introduced;

$$\min\{H(x)-H(y)\}$$

This calculation may also be approximated by a more tangible associated metric that is particularly convenient for lab application as most modern signal analyzers may be equipped with cross-correlation or other relevant error metric measurement capabilities. The minimization is often accomplished by one of several means;

Calculation of Error Vector Magnitude (EVM)
Calculation of Minimum Mean Square Error (MMSE)
Calculation of Cross-Correlation and/or Covariance Cross-correlation is addressed since it maintains continuity of the present themes. It is possible to define the cross-correlation between input and output as (x→input variable, y→output variable)

$$R_{xy} = \int_{-\infty}^{\infty}\int_{-\infty}^{\infty} xy p(y,x) dx dy$$

This form is a statistical cross-correlation. The cross-covariance which may be used in certain circumstances is the same operation after extracting the mean values of x, y. It is noted that the y variable is often normalized or scaled to compensate for test system scaling.

Now the example as presented would appear perfectly linear in concept since $V_L$ 1874 should be a faithful reproduction of $\tilde{S}\{H(x)_{v,i}\}$ 1802 by definition. However, in a practical system with a more complicated modulation requirement, $Z_A$ 1890, may be distributed with many controls. Voltages 1812, 1813, 1814, may be nonlinear and each may be determined by multiple controls. In such cases, imprecision, quantization noise and a host of other variables may potentially compromise the desired cross-correlations thereby increasing $S_{J_{xy}}$. Hence, the cross-correlation or cross-covariance or covariance metric or a reasonable similar metric may be employed to assess the particular synthesized architecture. Statistical calculations for the cross-correlation may be used whenever p(x,y) can be obtained or suitably approximated. In cases where this is not convenient, the time cross-correlation may be employed for a conditionally-stationary random process. This form of cross-correlation is given by;

$$R_{xy}(\tau) = \lim_{T_{O_{cc}} \to \infty} \int_{-T_{O_{cc}}}^{T_{O_{cc}}} x(t)y(t+\tau) dt$$

$T_{O_{cc}} \triangleq$ Observation Time Interval for Cross-Correlation

The input and output spectral masks are compared from;

$$\int_{-\infty}^{\infty} R_x(\tau)e^{-j\omega\tau}d\tau - \int_{-\infty}^{\infty} R_y(\tau)e^{-j\omega\tau} = S_e(\omega)$$

where $R_x(\tau)$ and $R_y(\tau)$ are suitable auto correlations.

In this manner compliance can also be assessed in the frequency domain. Other comparison metrics are useful as well, such as covariance, MMSE, phase error versus frequency, phase error versus time, and variations thereof.

E. T. Whittaker published a paper in 1915 concerning the interpolation of functions. Shannon borrowed this theory and that of Nyquist to obtain the cardinal series for sampling, given by $$X(t) = \frac{1}{\pi}\sum_{n=-\infty}^{\infty} X\left(\frac{n}{2W}\right)\frac{\sin[\pi(2Wt-n)]}{2Wt-n}$$

W=Bandwidth
$\eta$=Sample Number
t=Time

A finite information bearing function of time may be reproduced by suitable application of the Cardinal series. Shannon went on to show that the number of samples sufficient for reconstruction of any waveform of finite duration r using the Cardinal series is given by Shannon's number $N_S$.

$$N_S = 2W\tau$$

In the most general case for n→large and samples obtained from X(t), which may be composed of an arbitrary sum of Gaussian random variables, there exists a hyperspace containing the hyper sphere with volume given by;

$$V_n = \frac{\pi^{n/2}}{\Gamma\left(\frac{n}{2}+1\right)}(2\tau W(\langle P \rangle + N))^n$$

$\langle P \rangle$=Average Signal Power
$\langle N \rangle$=Average Gaussian Noise Power This hyper sphere possesses an analog in statistical mechanics related to the states of particles in phase space, where the coordinates in classical phase space are defined by momentum p and position q, respectively. The probability densities for the degrees of freedom and their energy distributions, as well as corresponding information distributions, have been absorbed into the construct of application phase space at a higher level of abstraction for the purpose of this disclosure. This higher level of abstraction may also be referred to as a pseudo-phase space.

As noted, i→∞ whenever the pdf (probability density function) is parsed in infinitesimal differential increments. In practice, modern day communications systems often quantize the variable ($V_L$) associated with an output voltage across a load impedance. Even though it may be continuous or discrete at the source, it is often quantized at the apparatus interface. $N_S=2W\tau$ is a prescription for the number of samples over the dimensionality of signal space to reconstruct the message without losing information. The Nyquist sample rate then is given by;

$$R_N = \frac{N_s}{\tau} = 2W$$

$N_s$ samples amongst the i partitions will distribute according to the probability density $p(V_L)$ and the ancillary rules that assign the respective domains. These samples are only partially utilized by the energy partitioning facilities of the apparatus. Additional samples may be required to support v degrees of freedom. In general, it is possible to assign $i \leq 2^k$ partitions to enable an efficient system. The average frequency of samples within each bin (a bin may be thought of as a subset of values or span of values within some range or domain) can be calculated from;

$$\Delta V_L \triangleq \frac{V_{L_{max}}}{2^k}$$

$$p_{\Delta V_{L_i}} \triangleq \left( \int_{V_{L_{i-1}}}^{V_{L_i}} p(V_L) dV_L \right) = \lambda_i$$

$\Delta V_L$ ≡ Average Voltage Increment per Sample

The number of samples per bin is thus $N_s \cdot p \Delta V_{L_i}$. Additionally, $2^k$ sets the sampling resolution for the system.

The potential between fixed and/or sampled energy partitions can be greater than or equal to $V_{L_{max}}/2^k$ specifically set by the FLUTTER™ algorithm to realize an optimized efficiency gain. The rules for assigning the number and frequency of the samples $N_s$ to each of the i bins may be directly attributed to the mapping of H(x) symbol emission to $V_L$ and $(V_L)$, via $\tilde{\Im}\{H(x)_{v,i}\}$.

Note that optimal assignment of partition boundaries is very specific (according to FLUTTER™) and will not in general correspond to binary sampling thresholds determined solely from interpolation theory or envelope tracking/restoration theories.

(i) energy partitions with properly assigned sample clusters, $\eta_i$, preserve the sampling space and therefore the information space. The sample clusters fall within the boundaries of the $i^{th}$ energy partition and are further processed by other degrees of freedom to enhance efficiency and quality metrics of the signal. These additional distinct degrees of freedom have also been enumerated by an index v. The v degrees of freedom within the modulation method described herein can span a portion of, a single, or all i partitions.

The number of partition transitions per unit time per degree of freedom fluctuate in each path of a FLUTTER™ algorithm according to signal statistics and therefore these partition sampling events may be slower than the final composited signal envelope Nyquist sampling rate or bandwidth. The additional (non-energy partition selection) required signal reconstruction sample clusters are distributed to other degrees of freedom and composited through other blended control paths, thus preserving the requirements of the sampling theorem. This is a preferred approach given the minimum fixed number of energy partitions to practically achieve a specified efficiency.

Reconstruction of a sampled signal envelope by linear interpolation and/or filtering such as the type used in Legacy envelope tracking and envelope restoration techniques, does not constitute an efficiency optimization algorithm. An efficient algorithm should also accommodate simultaneous or joint (or concurrent or parallel) optimization max{$\eta$}, mini{$H_x-H_y$}. If joint dependency of efficiency and quality are not explicitly contemplated then the algorithm is 'ad hoc'.

As described above, it is useful to substantiate that the variable for amplitude of a signal may be quantized and that the energy partitions be less than or equal to the number of quantization levels. This is a flexible, or loose, upper bound. The idea of quantization is justified since the continuous random variable $V_L$ can be exactly reproduced according to the sampling theorem and could correspond to an efficiency optimization without requiring an infinite number of differentially spaced partition potentials.

Figure 20:
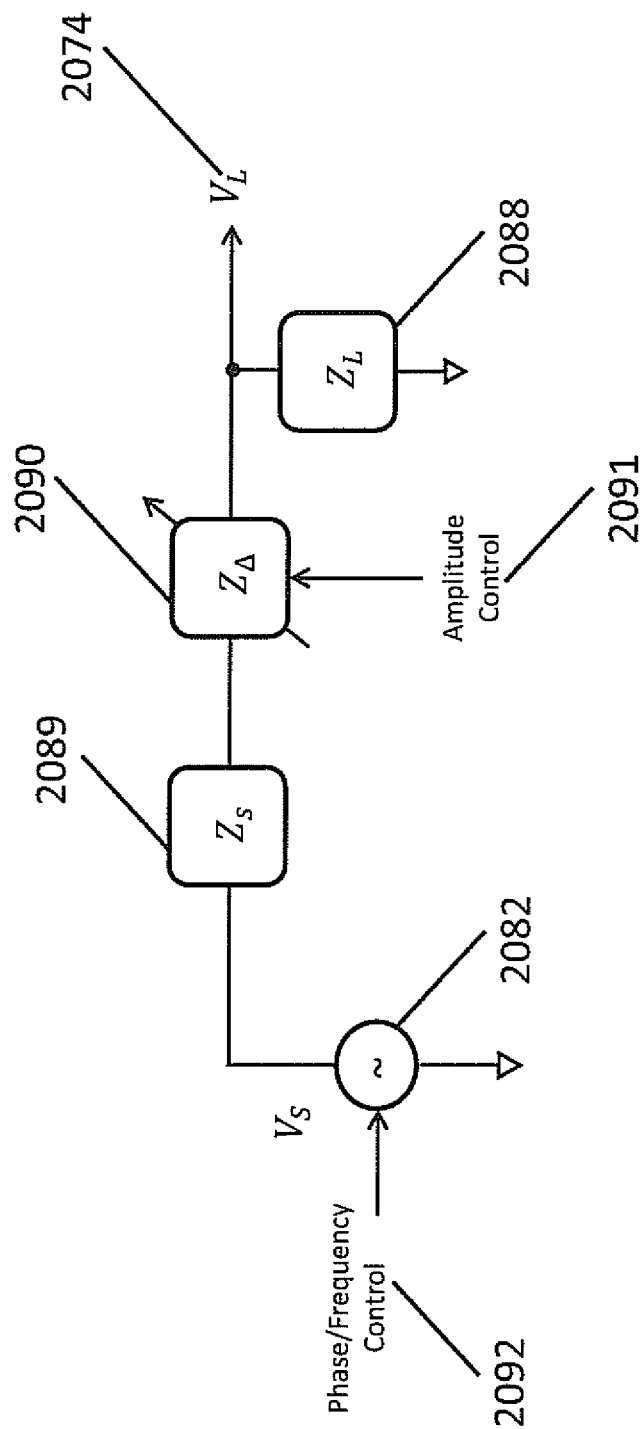
FIG. 20 shows an example of a series Type II modulator.
Figure 21:
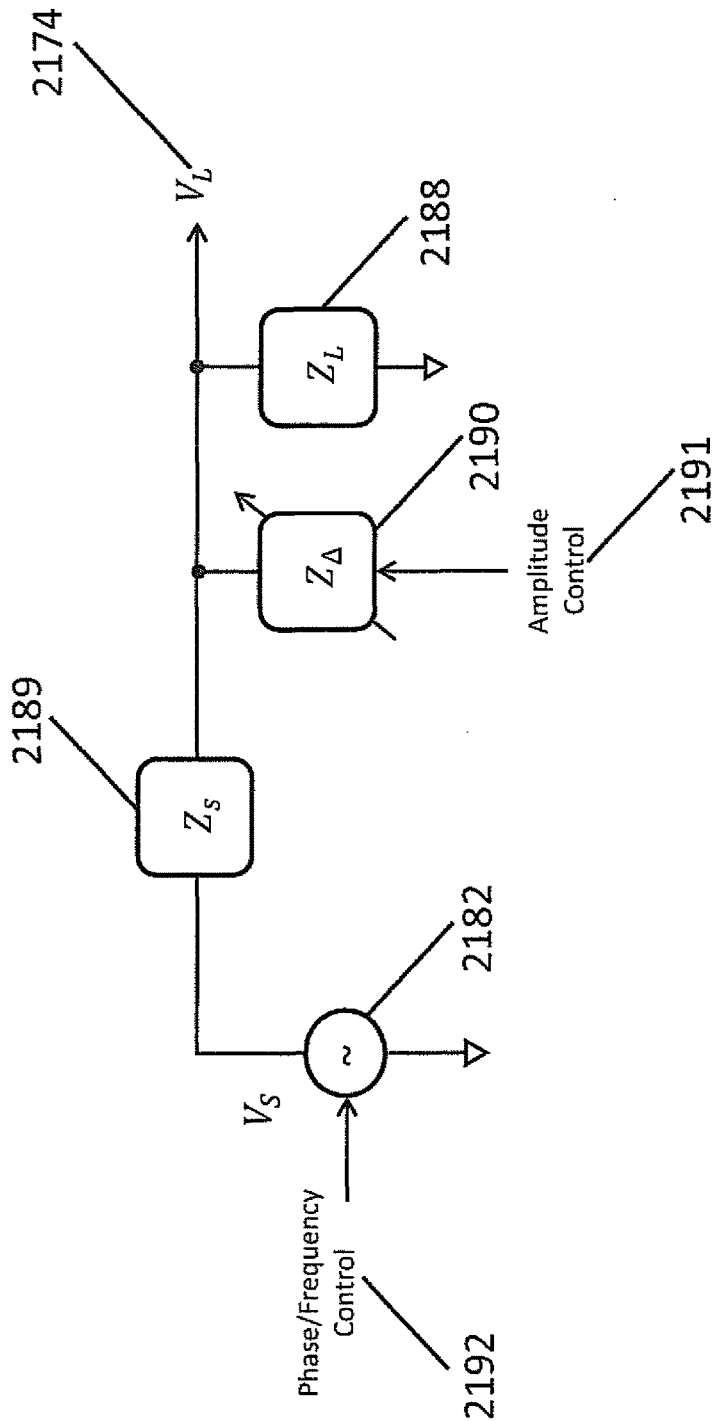
FIG. 21 shows an example of a shunt Type II modulator.

FIGS. 20 and 21 show examples of a Type II modulator model for series and shunt realization, respectively. Equivalent differential topologies are possible and may be assumed in the treatment just as single ended and differential topologies were included for Type I models, as described herein.

FIG. 20 shows an example of a series Type II modulator 2000. This modulator 2000 includes a phase/frequency control input 2092, time variant source voltage $V_s$ 2082, source impedance $Z_s$ 2089. Also shown is variable branch impedance $Z_A$ 2090, which receives control input from amplitude control 2091 and signal input from source $V_s$ 2082. The output from $Z_A$ 2090 is provided to $Z_L$ 2088 and $V_L$ 2074. $V_s$. 2082, may for example be an agile RF carrier with phase modulation from control 2092. The amplitude of $V_L$ 2074 may be changed by changing $Z_A$ 2090 via control 2091. Therefore, output $V_L$ may be phase modulated and amplitude modulated through changes imparted by controls 2092 and 2091.

FIG. 21 shows an example of a shunt Type II modulator 2100. This modulator 2100 includes a phase/frequency control input 2192, time variant source voltage $V_s$ 2182, $Z_s$ 2189. Also shown is a variable impedance $Z_A$ 2190, which receives control input from amplitude control 2191. The impedance from $Z_A$ 2190 is in parallel with $Z_L$ 2188 and affects the amplitude of $V_L$ 2174. The output voltage amplitude of $V_L$ 2174 and phase of $V_L$ 2174 may be changed by varying controls 2191 and 2192.

The series modulator instantaneous waveform efficiency can be derived similar to the methods developed for analyzing the Type I modulators. The partially reduced result is;

$$\tilde{\eta} = \left\{ \frac{P_{out_{WF}}}{P_{in}} \right\} = \left\langle \text{Re} \frac{V_L^2}{V_S V_L - V_L^2 (Z_S / Z_L)} \right\rangle$$

It is noted that the efficiency $\tilde{\eta}$ reduces to that of the Type I model when the overhead for creating a sine wave from a fixed potential is minimal. However, if D.C. blocking is used, for example a capacitor or high pass filter in series with the load output of $Z_S$ 2089, efficiency may be increased.

In addition it is verified that Type II shunt model yields approximately the following provided the condition of a short circuit is avoided.

$$\check{\eta} = \left\langle \frac{P_{out}}{P_{in}} \right\rangle = \left\langle \text{Re}\left\{ \frac{\langle V_L^2 \rangle}{V_S V_L - V_L^2 (Z_S/Z_L)} \right\} \right\rangle$$

The proper thermodynamic efficiency $\langle P_{out_{sig}} \langle / \rangle P_{in} \rangle = \eta$ also increases as $\check{\eta}$ increases for these Type II modulator examples. Again, the use of a D.C. blocking circuit such as capacitor or other filter, as part of $Z_s$ 2189 may improve efficiency in this case.

Hence, the Type II modulator models follow the Type I model performance closely over significant dynamic range of the relevant signals. One possible difference is the explicit inclusion of an oscillator source with phase/frequency control as a unique control. A plurality of Type I models can also create complex passband signals. Also $Z_A$ 2090, 2190, may be in general a complex function and its control may likewise be considered as a complex number, thus suitable for complex envelope generation. However, a Type II model is convenient for complex signal generation since the controls may be independently manipulated by scalar functions if desired. However, reserving the ability to drive $Z_A$ 2090, 2190 by a signal consisting of complex numbers can offer some desirable degrees of freedom. The complex numbers may control the real and imaginary portions of the complex impedance $Z_A$ 2090, 2190. Many useful complex signaling scheme can be realized with this model by applying the circuit architectures of FIGS. 20 and 21 to in-phase and quadrature-phase modulation schemes.

As described herein, the focus has been on discussions of optimization of thermodynamic efficiency, $\eta$, with respect to application variable energy partitions applied to modulation techniques, such as those techniques using any modulator technology, or such as d2p™ technology. It is useful to develop the similar efficiency themes but relate the discussion to the encoding of the information metric H(x) into phase, since this is a significant macroscopic degree of freedom for signals and such agility is helpful for modern signaling standards.

There is a common assumption in the communications industry that constant envelope signals given by;

$$|a(t)| = \sqrt{a_I(t)^2 + a_Q(t)^2} = \text{constant}$$

possess maximum efficiency performance. This rule of thumb is approximately true under restricted circumstances but becomes challenged as capacity increases for at least two reasons. The application phase space is smaller dimensionally whenever amplitude modulation is denied and therefore capacity decreases for specified link performance. This usually demands greater transmitter power and bandwidth to offset capacity losses. In fact, regulatory and standards body restrictions render some phase modulation waveforms as obsolete or of narrow application, so as to have limited use.

In addition, the phase modulation, when required to support greater information rates, begins to impact the efficiency of practical infrastructure electronics. This is especially true for significant transmitter power requirements. Changing phase of a carrier at increasingly greater rates corresponds to accelerating and decelerating electrons, which have mass and are also associated with the corresponding electromagnetic fields of radiation possessing momentum. The greater the increase or decrease (+/-) accelerations of the electrons and the uncertainty of their changes, the greater the impact on the efficiency of practical phase modulation schemes. The changing inertia associated with accelerating and decelerating electrons and their fields requires more energy than the case where currents are relatively constant.

Nevertheless, it is also true in practice that phase modulation can be a powerful technique to conserve energy if the phase changes are properly controlled and of moderate rates. The most beneficial solutions address both amplitude and phase, which is assumed in the subsequent portions of this disclosure.

Embodiments of the present invention are also directed to criteria for obtaining energy partitions, which can enhance efficiency for RF modulation processes which includes amplitude and phase modulated signals. The signal envelope magnitude often drives these criteria and the greater the uncertainty metric H(x) the greater the uncertainty for the signal envelope. Rapid and uncertain carrier phase fluctuations, can also impact efficiency. Unipolar signals can be defined as being positive so that $0 \leq a(t) \leq V_{L_{max}}$. This range is parsed into (i) domains consistent with the FLUTTER™ algorithm to improve efficiency. v degrees of freedom may also be independently deployed to control signaling degrees of freedom within the modulation, such as d2p™ modulation, so that signals may be reconstructed, or rendered, accurately while optimizing efficiency. v degrees of freedom may also control magnitude and phase of the complex signal given the constraints imposed within the $i^{th}$ energy partition. The indices, v, i thus point to portions of information space $\tilde{\Im}\{H(x)_{v,i}\}$ which are accessed to generate the physical expression of the v domains. A final output is obtained as a function of blended controls according to $$a(t)e^{j\omega_c t + \theta(t)} = \tilde{\Im}\{H(x)_{v,i}\}$$

$E_{e_{out}}$ the effective energy in the output signal and the waste energy $E_{w_{out}}$, are given by;

$$E_{e_{out}} = \sum_v \sum_i \lambda_{v_i}(\eta_{v_i}) E_{s_{v_i}}$$

$$E_{w_{out}} = \sum_v \sum_i \lambda_{v_i}(1 - \eta_{v_i}) E_{s_{v_i}}$$

$E_e$ is maximized and $E_w$ is minimized. In order to accomplish this optimization, the effective entropy flux, $$S_{j_{e_i}},$$

is generated so that waste entropy flux $$S_{j_{w_i}}$$

is minimized. The term "effective entropy flux" and "waste entropy flux" as applied here refers to perturbations of phase space that impart information through physical means. Such fluctuations possess relatively short time constraints on the order of a symbol duration compared to thermal equilibrium, which can take many symbols to stabilize. Hence, the fluctuations they may be analyzed using methods of extended non-equilibrium thermodynamics.

$E_e$ is the effective output signal energy. One quality of the $E_e$ metric is given by;

$$\langle \eta \rangle = \frac{\langle E_e \rangle}{\langle E_e + E_w \rangle}$$

The other quality metric can be related to the difference in uncertainties H(x) and H(y) for the input and output of the modulation process respectively;

$$\min\{H_x - H_y\} \leq \epsilon$$

$\epsilon$ can be an arbitrarily small number which may be estimated using error vector magnitudes and minimum mean square error techniques which calculate energy differences between the input variable x and output variable y. As a consequence, the additional metric $$\max\{S_{J_{e_i}} - S_{J_{w_i}}\}$$

becomes important because the entropy flux captures the system state uncertainty in a context which ties the emission of symbols from $H_x$ to phase space perturbations expressed by $$S_{J_{e_i}}.$$

Each symbol emitted from the information source is distributed into multiple FLUTTER™ algorithm branches, which may be in general nonlinear. Therefore, as previously described, the nonlinear tradeoff for efficiency should be balanced with the concern for information loss. This tradeoff is managed by the FLUTTER™ algorithm and BLENDED CONTROL FUNCTION BY PARKERVISION™.

Figure 22:
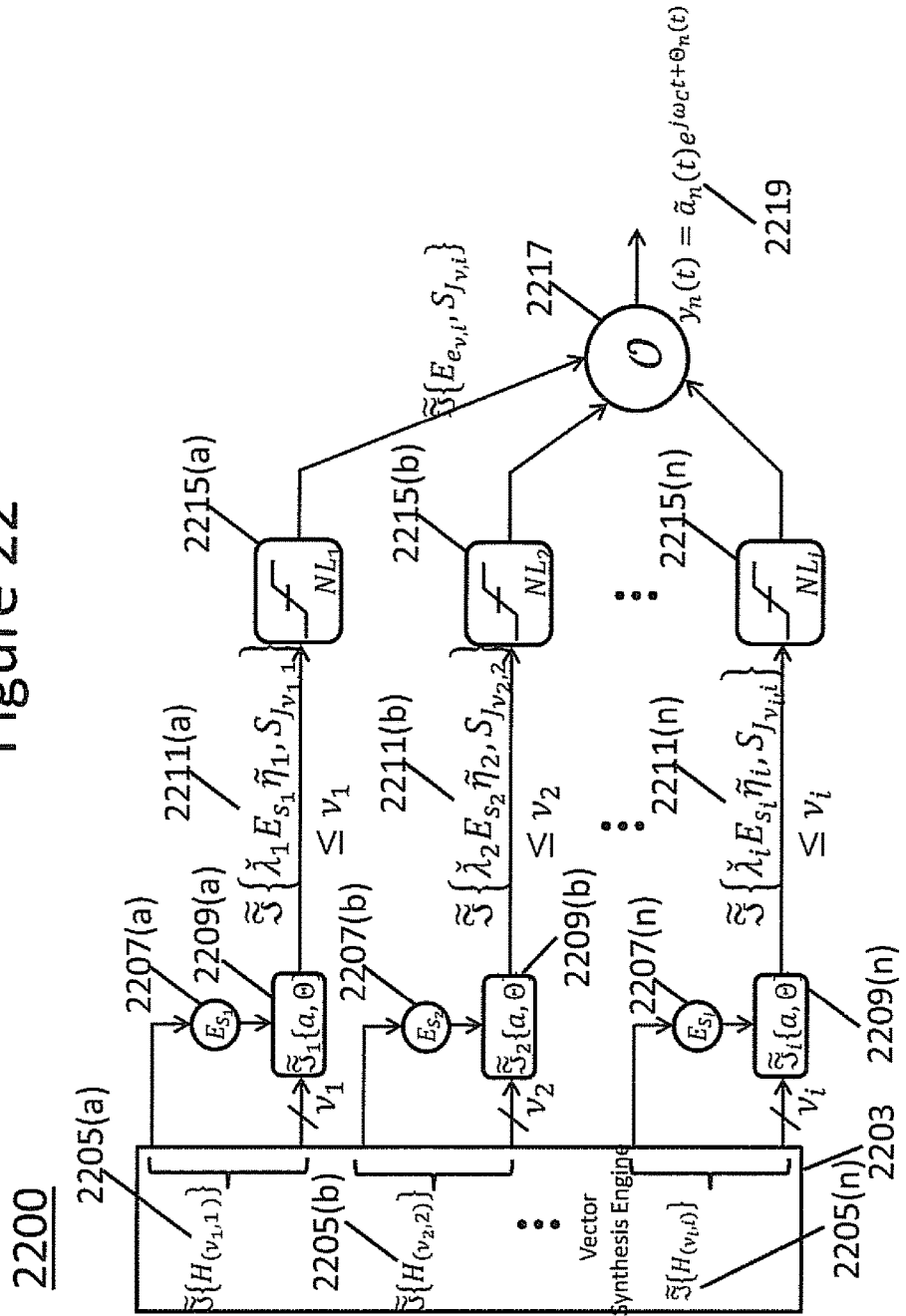
FIG. 22 illustrates an information and energy partition organization in terms of topological signal flow.

FIG. 22 is another illustration of a blended control function distribution architecture which processes vectors of FLUTTER™ algorithm values per each sample or state. These parallel vector states enable v degrees of freedom and i partitions to synthesize portions of subordinate signals with statistical co-dependencies. A vector synthesis engine (VSE) module 2203 calculates the blended control function and renders the parallel control vector per sample of the information bearing function of time. In this example architecture each of the $v_i$ processing branches possesses its distinct set of degrees of freedom and $i^{th}$ energy partition. The degrees of freedom and partitions may overlap domains between the branches. The prominence of each branch or the weighting of each branch is a random variable $\lambda_1$ (part of 2211a) through $\lambda_i$ (part of 2211n) (effective weighting factors) and each branch will possess a corresponding variable efficiency through $\tilde{\eta}_i$. The variable efficiency $\tilde{\eta}_i$ may also be expressed in terms of $\tilde{\eta}$ and/or $\eta$ the instantaneous and thermodynamic efficiencies respectively.

The subordinate signals are in general complex quantities, which are functions of the final desired output amplitude $a_n$ and phase $\Theta_n$ at $n^{th}$ the sample. Each branch may possess a nonlinear characteristic and a final signal synthesis is composited through the action of the output operator $\mathcal{O}$ 2217 and distributed blended controls that optimally integrates each statistically weighted nonlinear branch.

FIG. 22 is a diagram that illustrates one embodiment 2200 and how information and energy partitions may be organized in terms of topological signal flow. This representation 2200 shows assignment of information resources to each branch with consideration of nonlinearity. As shown in FIG. 22, flow diagram 2200 includes portions of VSE (Vector Synthesis Engine) 2203. The VSE module 2203 generates $\Im\{H_{v,i}\}$ 2205(a) . . . (n) (where "n" is any suitable number). These functions (generally 2205) $v_1 \ldots v_i$ and produce an associated energy, $E_{s_1}$ 2207 (a), $E_{s_2}$ 2207 (b) and $E_{s_i}$ 2207 (n) (where "n" is any suitable number) and a derived function 2209(a) . . . (n) (where "n" is any suitable number). The output of function 2209(a) . . . (n) (generally 2209) is shown as 2211 (a) . . . (n), respectively (generally 2211). The signals 2211(a) . . . (n) are provided to and associated with $NL_1$ 2215 (a), $NL_2$ 2215 (b) . . . $NL_i$ 2215 (n) (where "n" is any suitable number). The outputs from 2215(a) . . . (n) are composited by operation module "$\mathcal{O}$" 2217 and operations of each algorithm branch and render output 2219. The operator $\mathcal{O}$ module 2217 leverages the FLUTTER™ algorithm using apriori knowledge of the apparatus and a desired signal as well relationships derived from the following variables, functions and parameters:

$v_{i,l}$: A set of degrees of freedom ranging from 1 to $\mu$. That is,

Here the $l^{th}$ instantiation of the v indices may assume any combination from the set $1 \leq \mu$, i, is a partition number and l may contain any grouping of partitions. $\mathcal{O}$ may operate on these sets and groupings internally.

i: $i^{th}$ energy partition increment, which can be associated with a subset of up to v system degrees of freedom.

$\tilde{\eta}_i$: $\eta$ or suitable function of $\eta$ in $i^{th}$ path considering one or more inefficiencies of that path, including the interacting (compositing) of the $v_i$ subsets of degrees of freedom.

H(x): Information source (or other suitable representation) input whose pdf (probability density function) is p(x) (or other suitable representation).

H(y): Information output (or other suitable representation) whose pdf (probability density function) is p(y) (or other suitable representation).

$X_n(t)$: $n^{th}$ signal sample for ideal reference.

$Y_n(t)$: $n^{th}$ signal sample for system output.

The vector synthesis engine (VSE) module 2203 calculates the per sample, functions for the $v_i$, domains supporting functions 2207, 2209, 2211, and 2215. The calculations include apriori knowledge of the apparatus configuration and technology characterization. Models consider efficiency and signal space geometries for one or more system states γ which contemplate, signal type, signal rate, temperature, dynamic range, power supply variation, etc.

FIG. 22 is an operational mixture of functions that illustrate the joint processing of signal energy and the associated information metrics encoded into $y_n(t)$ 2219 mapping, or blending, or compositing, at the output.

Functions/modules 2209 (a . . . n), 2211 (a . . . n). 2215 (a . . . n), 2217, 2205 (a . . . n), and 2203, may be implemented by a suitable blend of hardware and software using microprocessor and/other appropriate configurable and/or programmable technologies. Also analog technology may be used to implement these functions with suitable A/D and D/A interfaces where applicable to transition between analog and digital processing functions/modules.

As previously indicated $R_{xy}$ or corresponding covariance is a useful metric for indirectly assessing $S_{J_e}, S_{J_w}$.

$$|1 - |R_{xy}|| \propto k S_{J_w}$$

If this quantity is zero then $S_{J_e}$ is maximized and $S_{J_w}$ is minimized, as a necessary but not sufficient condition.

Since x and y are complex signals the cross-correlation may also be a complex number. $R_{xy}$ may therefore also be used to obtain errors for signal magnitudes and phase. This is necessary and sufficient.

An apparatus that includes multiple technologies operated in nonlinear regions is difficult to model. The complex impulse response consists of a series of Volterra kernels. FIG. 22 illustrates the Vector Synthesis Engine (VSE) 2203, which generates the intermediate blended controls 2211 based on knowledge of the apparatus partitions, desired output signal 2219, targeted efficiency vs. signal quality metric, and modeled or characterized nonlinearities, $NL_1$, $NL_2$, ... $NL_i$ 2215 ($a$), 2215($b$) ... 2215($n$) (where "n" is any suitable number). Models based on Volterra functional series are usually complex and, therefore, typically difficult to analyze and compensate in hardware for real time application. Rather, embodiments of the present invention are directed to creating an image that provides what may be described as an "entropy flux surface", or herein after, simply "differential surface". The surfaces (entropy flux surfaces) are extracted as sets of 3-dimensional cross sections of higher order complex hyper-geometric manifolds. Each set of surfaces corresponds to a particular state of one or more modulators plus supporting functions, or collectively the apparatus and each state is characterized by at least 2 differential surfaces that may be obtained from a cross-correlation function, or a corresponding covariance.

Figure 23B:
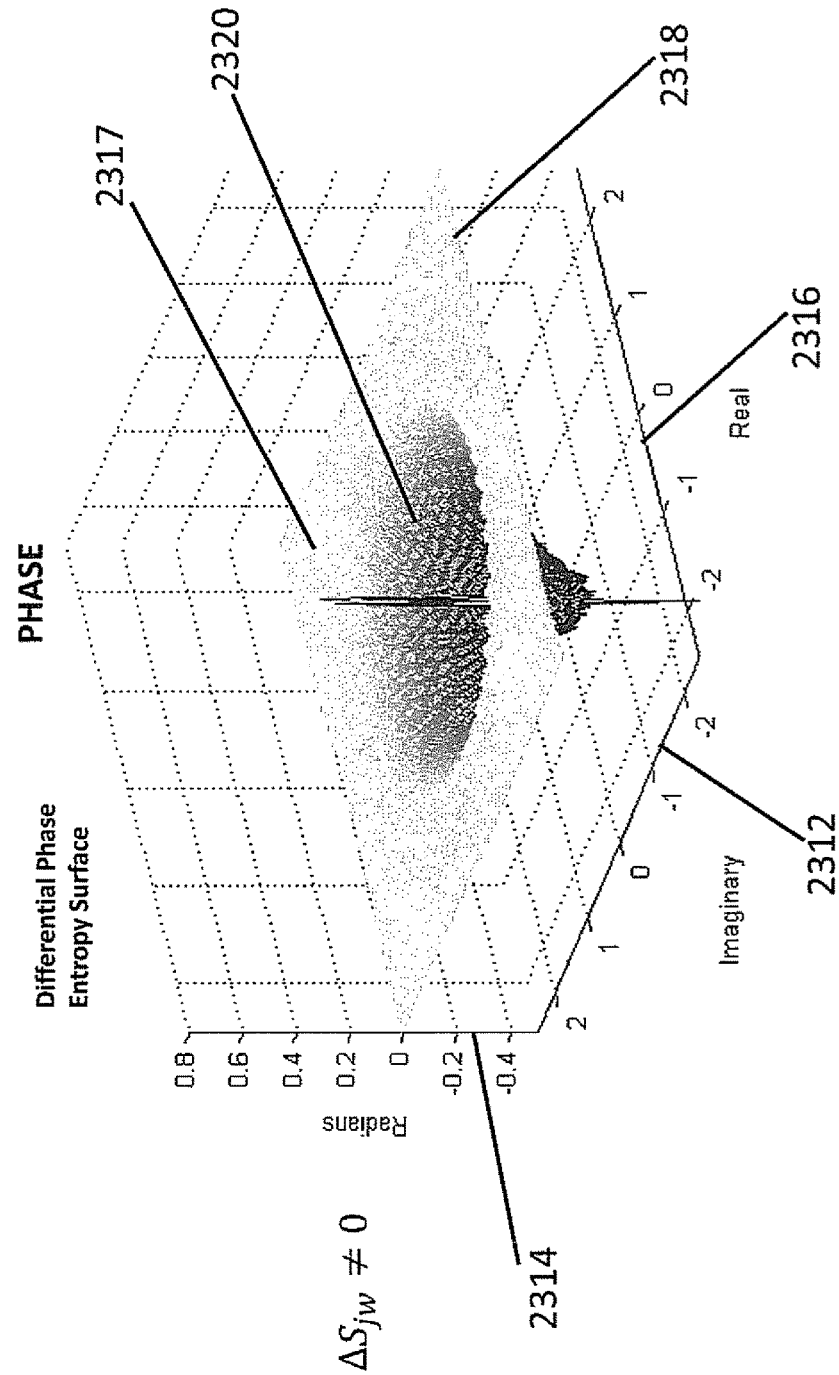

FIGS. 23A and 23B are graphics that illustrate an example of the differential surfaces for a particular state. Specifically, FIG. 23A shows a graphical illustration 2300 of a differential magnitude entropy surface 2307 and FIG. 23B shows a graphical illustration 2301 of a phase entropy surface 2317.

As shown in FIG. 23A, the differential magnitude entropy surface 2307 is plotted on X-axis 2302, Y-axis 2304 and Z-axis 2306. As shown in FIG. 23A, the differential magnitude entropy surface 2307 has a substantially flat portion 2308 and a substantially conical portion 2310. The substantially conical portion 2310 of the phase entropy surface 2307 is illustrated as being "positive" which is merely a convention choice. The differential surface 2307 could also be represented as "negative". Also, the designation of the X, Y and Z axes is a convention choice. Any suitable coordinate system may be used to plot the differential magnitude entropy surface. Although surface portion 2310 appears conical for this example, it may assume other forms.

FIG. 23B shows a graphical illustration 2301 of a differential phase entropy surface 2317. This differential phase entropy surface 2317 is plotted on a coordinate space, shown as X-axis 2312, Y-axis 2314 and Z-axis 2316. Differential phase entropy surface 2317 has a substantially flat portion 2318 and a substantially conical portion 2320. The substantially conical portion 2320 of the differential phase entropy surface 2317 is illustrated as being "negative" which is merely a convention choice. The surface 2317 could also be represented as "positive". Also, the designation of the X, Y and Z axes is a convention choice. Any suitable coordinate system may be used to plot the differential phase entropy surface. Although surface portion 2320 appears conical for this example if may assume other forms.

Sets of such surfaces 2307, 2317 characterize an operational domain of γ states. Surface data are transformed to function coefficients, which may be further interpolated and extrapolated over the entire set of γ states. This interpolated data feeds the FLUTTER™ algorithm to enable the creation of Blended Control™ (also known as BLENDED CONTROL BY PARKERVISION™) $\tilde{\Im}\{H_{v,i}\}$ in concert with the other parameters previously listed. The process renders new functions that possess properties that minimize $S_{J_w}$ production, the result of which is illustrated in FIGS. 24A and 24B.

FIG. 24A shows a graphical illustration 2400 of a reduced differential magnitude entropy surface 2408. This reduced differential magnitude entropy surface 2408 is plotted on X-axis 2402, Y-axis 2404 and Z-axis 2406. As shown in FIG. 24A, the reduced differential magnitude entropy surface 2408 has a substantially flat portion. ("Substantially" is used as a relative term with respect to a quality metric that is a system design parameter.) The designation of the X, Y and Z axes is a convention choice. Any suitable coordinate system may be used to plot the differential magnitude entropy surface.

Figure 24B:
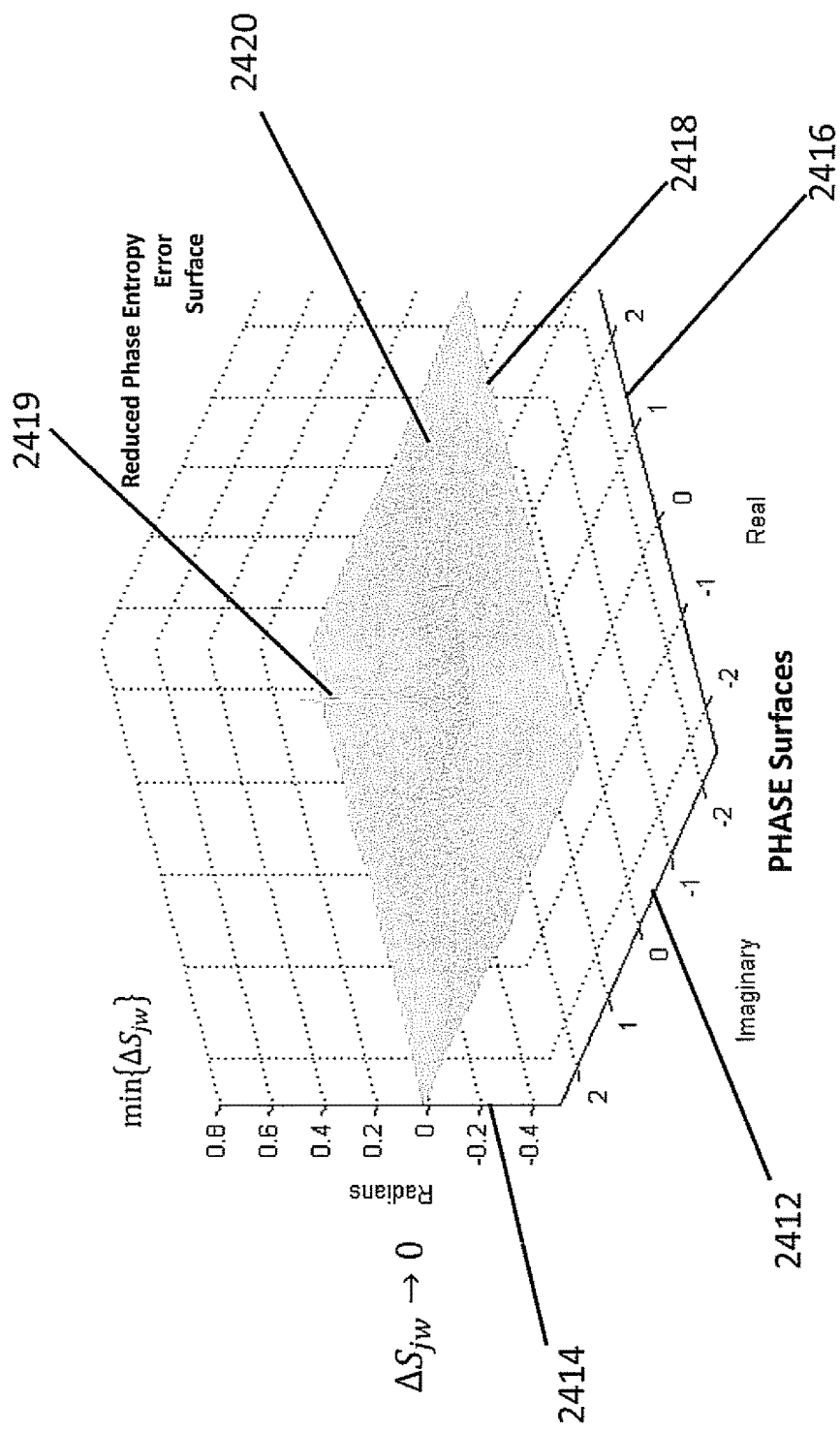

FIG. 24B shows a graphical illustration 2401 of a reduced differential phase entropy surface 2418. This reduced differential phase entropy surface 2418 is plotted X-axis 2412, Y-axis 2414 and Z-axis 2416. The reduced differential phase entropy surface 2418 has a substantially flat portion 2420 and a substantially conical portion 2419. The substantially conical portion 2419 of the reduced differential phase entropy surface 2418 is substantially more narrow (less surface area) than the phase entropy error conical portion of FIG. 23B. The designation of the X, Y and Z axes is a convention choice. Any suitable coordinate system may be used to plot the differential phase entropy surface.

As shown in FIGS. 24A and 24B, the error metric $S_{J_w}$ is reduced to the lowest acceptable, or lowest compliant, value through $\tilde{\Im}\{H_{v,i}\}$ while articulating the most efficient resources available within the apparatus to produce $S_{J_w}$. Since nonlinearities in one branch, as shown in FIG. 22, 2205, may reduce the capacity of that branch while enhancing efficiency, another branch makes up the difference in information capacity. The relative partial information capacities and efficiencies of algorithm branches may fluctuate dynamically during compositing. Branch domains may overlap through the sets of $\tilde{\Im}\{H_{v,i}\}$ even if energy domains (i) may or may not overlap. Whenever overlap of $v_1$, $v_2$, $v_3$ control domains overlap, the statistics of the significant pdfs (probability density functions) $p_{v_1}$, $p_{v_2}$ . . . will possess cross-correlation properties. This permits each energy partition (i) to excite $v_\mu$ controls in parallel with the proper statistical weighting, thus blending, or compositing, information from $\tilde{\Im}\{H_{v,i}\}$ domains.

Figure 25:
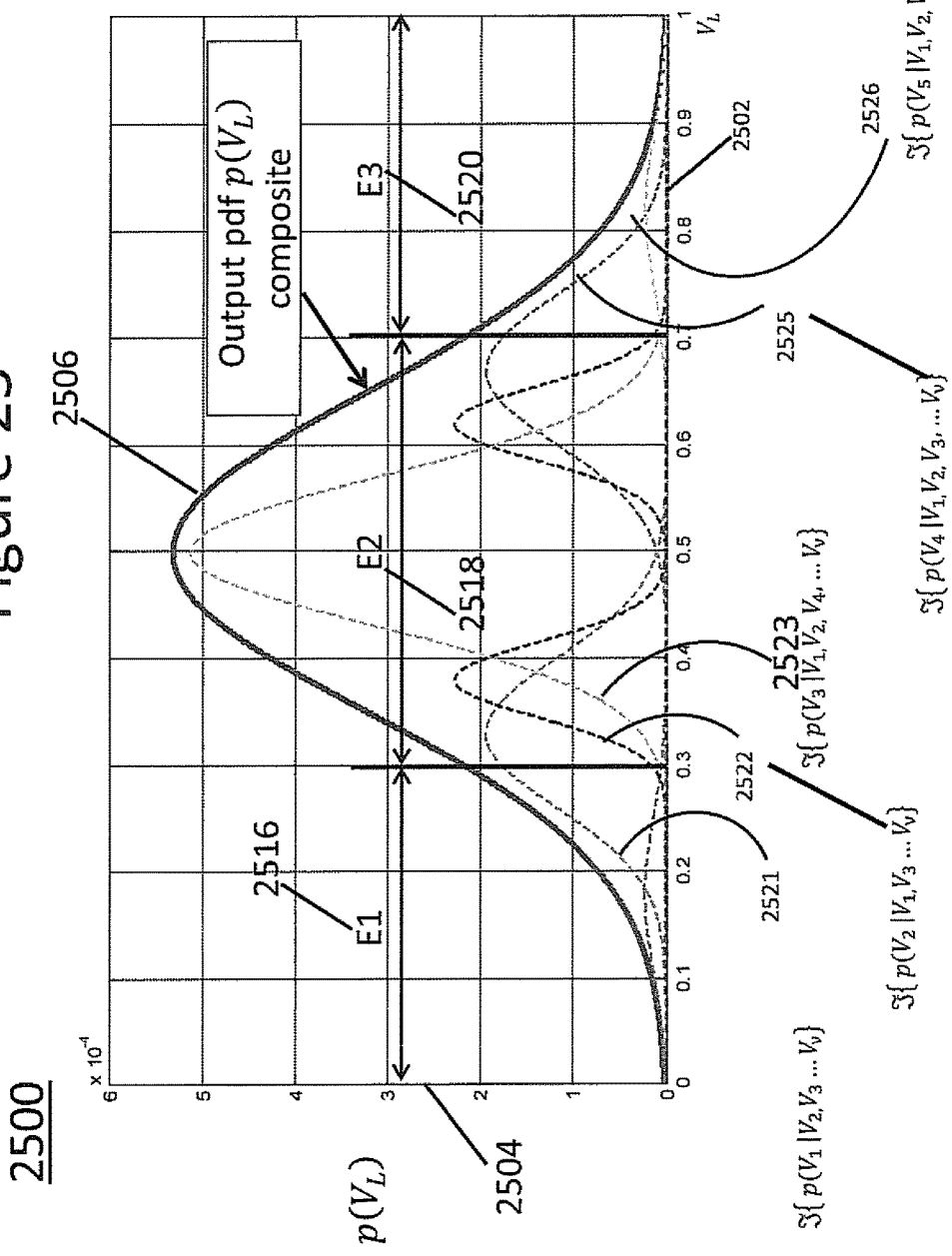
FIG. 25 shows an example of a composite statistic of the information bearing function of time and statistics of domains of signals plotted on voltage and probability axes.

FIG. 25 shows an example of a joint probability space diagram 2500. As shown in FIG. 25 an output amplitude domain waveform pdf (probability density function) $p(V_L)$ 2506 is generated from $\tilde{\Im}\{H(p_1, p_2, \ldots p_v)\}$, v which is composite, or blended control, PDFs (probability distribution function). Each member of this composited set is a pdf (probability density function) of a non-stationary random variable, which may be continuous, discrete or both (illustrated as continuous for example).

As seen in FIG. 25, the solid line 2506 illustrates the composited pdf (probability density function) $p_v(V_L)$ can be considered as a joint distribution that is dependent on several subordinate pdfs joint (probability density functions) or joint sub-distributions $\tilde{\Im}\{p(V_1|V_2, V_3 \ldots V_v)\}$ 2521, $\tilde{\Im}\{p(V_2|V_1, V_3 \ldots V_v)\}$ 2522, $\tilde{\Im}\{p(V_3|V_1, V_2, V_4 \ldots V_v)\}$ 2523, $\tilde{\Im}\{p(V_4|V_1, V_2, V_3 \ldots V_v)\}$ 2525, and $\tilde{\Im}\{p(V_v|V_1, V_2, \ldots V_{v-1})\}$ 2526 in this example. The graph 2500 is plotted with respect to X-axis 2502 vs. Y-axis 2504. Several degrees of freedom (v) were used to form the example statistic shown in FIG. 25. Specifically, 3 energy partitions $E_1$, $E_2$, $E_3$ (i=3, ζ=2) are illustrated (2516, 2518 and 2520) (without any consideration for optimization). Notice that the subordinate $p_a$, functions 2521, 2522, 2523, 2525 and 2526 interact statistically to form a composite representation, shown as line 2506. FIG. 25 provides a statistical description of a representation of an information bearing function of time. Components of phase, amplitude and frequency are contemplated as extensions of the composited statistic. Hence, the variables possess some correlation for the region of overlap. This correlation is a variable which is a function of the set of voltages or signals $V_L$, $\tilde{\Im}\{(V_1, V_2, \ldots V_v)\}$. Also each energy partition 2516, 2518 and 2520 may span a subset of the blend from the available $p_{v_\mu}$. In addition, a suitable blend of subordinate joint pdfs is possible which possess tailored cross covariance.

FIG. 25 shows a 2-dimensional RV; however, the RV is in general applicable to any suitable number of complex dimensions. FIG. 25 illustrates how an output $V_L$ may be a composited result of several constituents ($V_1, V_2, V_3 \ldots V_v$).

Figure 26:
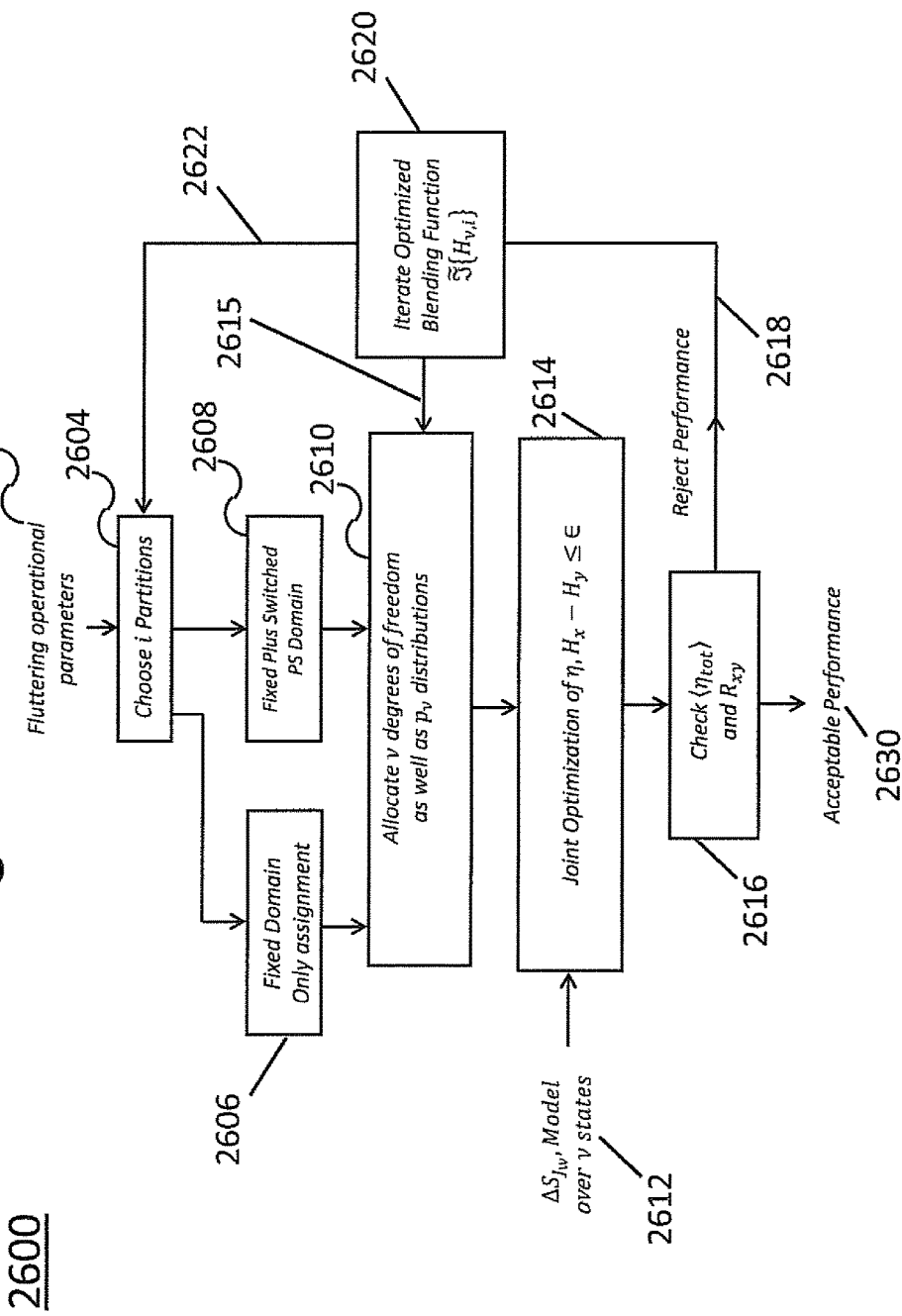
FIG. 26 shows a flowchart for synthesizing FLUTTER™ and blended controls.

FIG. 26 shows a flow chart 2600 that illustrates a FLUTTER™ algorithm development approach that considers up to v plus i additional macroscopic degrees of freedom for the apparatus. As shown in FIG. 26, the flow chart 2600 begins with start step 2602 having a particular set of FLUTTER™ operational parameters and apriori knowledge of the apparatus characteristics. Energy partitions (i) are chosen, as shown in step 2604 according to input 2602. This selection of a number of energy partitions to partition one or more energy sources depends on a desired resolution to render a signal or a waveform that can be encoded with information (generally referred to herein as an information bearing function of time). The (i) partitions may be fixed domain (as shown in step 2606) or fixed plus switch PS domain (as shown in step 2608).

v degrees of freedom are allocated, as shown in step 2610. The allocation of step 2610 is used for compositing, as well as $p_v(V_L)$ distributions.

Joint optimization of $\eta$, $H_x$–$H_y$ is performed, as shown in step 2614. This joint optimization of step 2614 also is a function of $\Delta S$ 2612. The result of the joint optimization is analyzed as shown in step 2616. This analysis includes checking $\tilde{\Im}\{\langle \eta_{tot} \rangle\}$ and $\tilde{\Im}\{R_{xy}\}$. The result of this analysis of step 2616 is either acceptable, as shown by reaching step 2630 or rejected, as shown by line 2618, which shows that the optimized blending function is iterated, as shown in step 2620. This optimization may be accomplished by some combination of characterization, measurement and calculation which can be iterative or solved through the calculus of variations. The result of the possibly iterative optimization process (2620) is used in step 2610, as shown by line 2615. The result from the iterative optimization process (2620) may also be used in the partitioning step 2604, as shown by line 2622. Once this optimization is complete, the resulting optimization parameters may be applied in a feed forward application of FLUTTER™. FIG. 26 illustrates a general method for obtaining a statistical characterization of an apparatus supporting the FLUTTER™ algorithm which utilizes the characterization as prior system knowledge and apriori knowledge For many applications it is advantageous to reduce individual FLUTTER™ domain sample rates and dynamic ranges, particularly if a switched or switching power supply is utilized in one or more than one of the energy partitions.

The number of signal samples per energy partition can be approximately obtained from;

$$n_i = \lambda_i 2 W \tau$$

$$n_{i_{max}} = \lambda_{i_{max}} 2 W \tau$$

$$n_{i_{min}} = \lambda_{i_{min}} 2 W \tau$$

$$\frac{n_{i_{min}}}{2\tau\lambda_{i_{min}}} \leq W_i \leq \frac{n_{i_{max}}}{2\tau\lambda_{i_{max}}}$$

The sampling rate for the $i^{th}$ can then be given by $2 W_i$, where $W_i$ is the required bandwidth of joint FLUTTER™ processes in $i^{th}$ partition, although there is a finite probability of switching between any of the domains from sample to sample, the averaged switch frequency on a per domain basis is given by;

$$R_i = \lambda_i R_{sx} \leq 2 W_i$$

where $R_{sx}$ is the maximum switch rate, and $\lambda_i$ is a suitable rate multiplier.

This rate can be further reduced by redistribution of, or suitable distribution of, the frequency components of the FLUTTER™ blended controls. Additional amplitude and phase information not accommodated by switching power supply or switched power supply control is allocated to the v remaining degrees of freedom. These parallel paths permit the full dynamic range and resolution of the signal to be reconstructed "on the fly", sample by sample, using the VSE (Vector Synthesis Engine) module to optimize $\langle \eta \rangle$ and $R_{xy}$.

The amplitude modulations are partially instantiated by the energy domain control at each $V_{S_i}$ boundary. Additional amplitude control is facilitated in the v remaining degrees of freedom (as shown by step 2610) for the modulator device.

Figure 27:
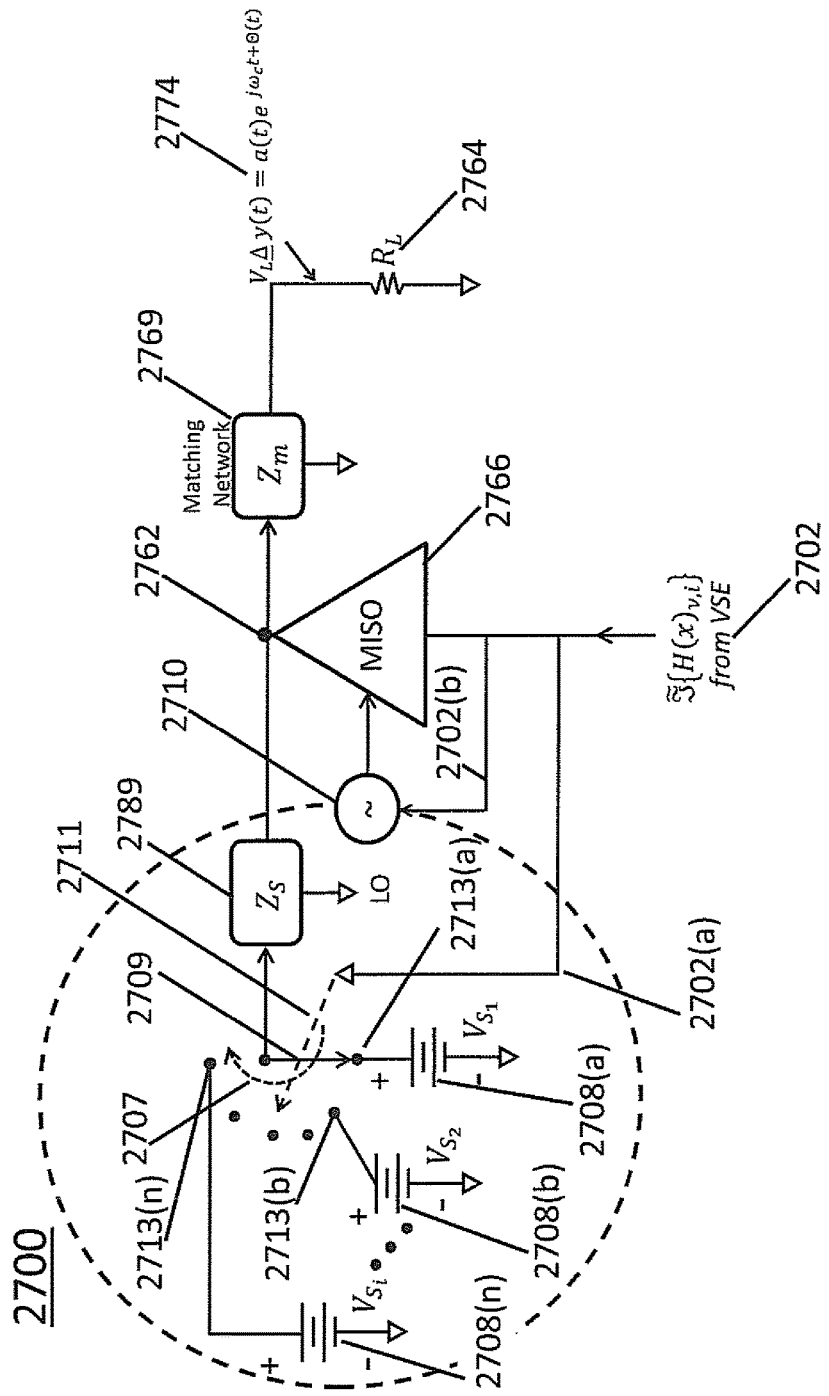
FIG. 27 shows an example of a circuit using FLUTTER™ with (i) fixed power source partitions and v auxiliary degrees of freedom.

It is helpful to describe embodiments of the present invention using a variety of general topologies, which incorporate FLUTTER™ for a modulator. FIG. 27 shows an example of FLUTTER™ with (i) partitions and v auxiliary degrees of freedom. Indeed, FIG. 27 shows one topology 2700 related to d2p™ application with Type I modulation properties.

The embodiment shown in FIG. 27 shows an example of one embodiment 2700 of the present invention. FIG. 27 shows energy sources $V_{S_1}, V_{S_2}, \ldots V_{S_i}$ 2708 (a), 2708(b) and 2708(n), respectively) where "n" is any suitable number. It is an embodiment of the present invention that any suitable number of energy sources may be used. Although illustrated as DC batteries for this example, it is understood that the energy sources may possess any statistic of voltage or current and may also be encoded with information. Blended controls, $\tilde{\Im}\{H(x)_{v,i}\}$ 2702 are generated from a VSE (Vector Synthesis Engine), as described herein. A portion 2702(a) of the control function 2702 is provided to a switching control to selectively access one of the energy sources (generally 2708) connection as shown by 2711, 2709 and 2713. The switch contact, 2709 and connection nodes 2713 (a . . . n) are activated based on the control signals of 2702(a) and switch control 2711. The selected energy source of the plurality of sources (generally 2708) provides energy, in any suitable form, which may include voltage, current, excitation or other stimulus to impedance module –$Z_S$ 2789.

Figure 28:
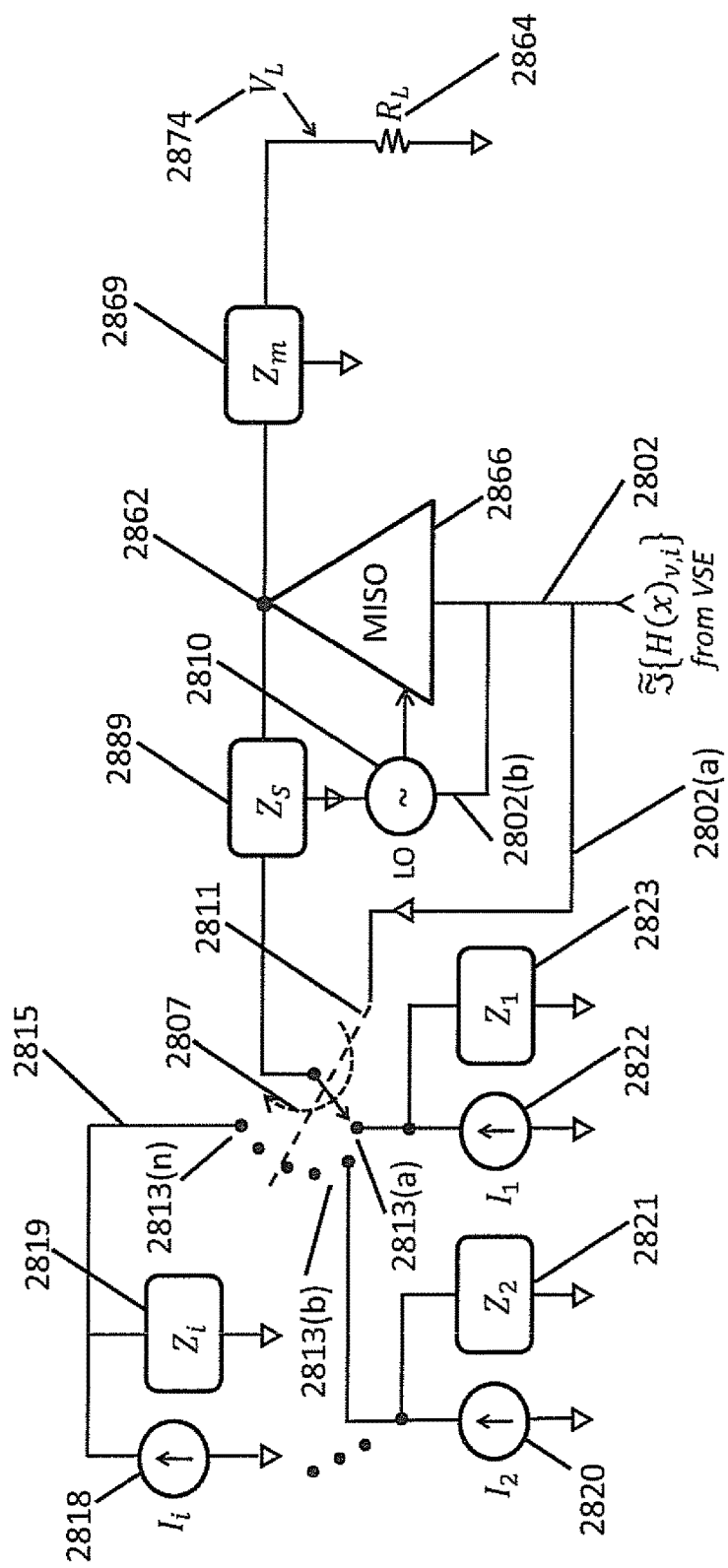
FIG. 28 shows an example of a Thévenized equivalent of FIG. 27.

A second portion of blended control, 2702 is 2702(b), which is provided to LO (local oscillator) 2710, which then provides input to modulator module 2766. The modulator module 2766 may be, for example a MISO (multiple input single output module). The matching impedance 2769 receives the interaction of $Z_S$ 2789-modulator module 2766, and the sources 2708(a) . . . (n). $V_L \Delta y(t)$ 2774 is rendered at load 2764. In this example, the energy sources 2708 (generally) are partitioned according to control signals 2702 (a), which partition the energy samples into a number of partitions, which can be enumerated as $i \leq 2^k$ where k is the resolution used for reconstructing the signal amplitude and/ or phase typically i<<k for fixed partitions. Indeed, it is contemplated that i may be a suitable integer of fixed partitions to obtain a desirable efficiency. For example i could be an integer such as 2 and offer performance advantage (compared to legacy technologies) in the rendered output signal $V_L$ 2774 at load $R_L$ 2764. In this example, none of the partitions require switching power supplies. Switching power supplies may also be used. The additional v dimensions provide for complex signal reconstruction, or rendering, of both desired magnitude and phase at the output 2774 given the constraint of the $i^{th}$ energy partition. FIG. 28 shows the Thévenized equivalent of FIG. 27.

In FIG. 28, the embodiment shown as 2800 shows that the several voltages of FIG. 27 are replaced by the parallel combination of $I_i$ and $Z_i$. These combinations of $I_i$ and $Z_i$ are shown as pairs 2818, 2819; 2820, 2821; and 2822, 2823. Current is provided to $Z_s$ 2889 as a function of control signals, such as FLUTTER™ blended control signals, 2802, which includes 2802(a) and 2802(b). A portion (2802(a)) of the control function 2802 is provided to a switching control to selectively access one of the pairs (2818, 2819; 2820, 2821; 2822, 2823) as shown by 2813 and 2811. This selective access is shown as element 2807. The connections 2815, 2813 and 2811 are activated based on the control signals of 2802(a). The selected energy source of the plurality of sources provides energy, in any suitable form, which may include voltage, current, power or any other excitation force to impedance module $Z_s$ 2889. Although illustrated as a generic current sources for this example, it is understood that the energy sources may possess any statistic of current and may also be encoded with information (portion of H(x)).

A second portion of control, or FLUTTER™ blended control function 2802 is 2802(b), which is provided to LO (local oscillator) 2810, which then provides input to a modulator module which may be for example a MISO 2866.

Also, a portion of the control signals from 2802 may also be provided to a modulator module which may be for example a MISO 2866.

The modulator module 2866 may be, for example a MISO (multiple input single output module). The matching impedance 2869 receives the output from $Z_s$ 2889 and the interaction of modulator module 2866 renders $V_L$ 2874 at load 2864.

Similar to the embodiment described in relation to FIG. 27, the energy sources of FIG. 28 are partitioned according to control signals 2802(a), which partition the energy sample into a number of partitions, which can be explained as $i \leq 2^k$ where k is the resolution used for reconstructing the signal amplitude and/or phase. Typically i<<k for fixed partitions. Indeed, it is contemplated that i may be a suitable integer based on the available resources desired efficiency and signal quality as well cost of implementation, to obtain a desirable efficiency. For example i may be an integer such as 2 and offer performance advantage.

Figure 29:
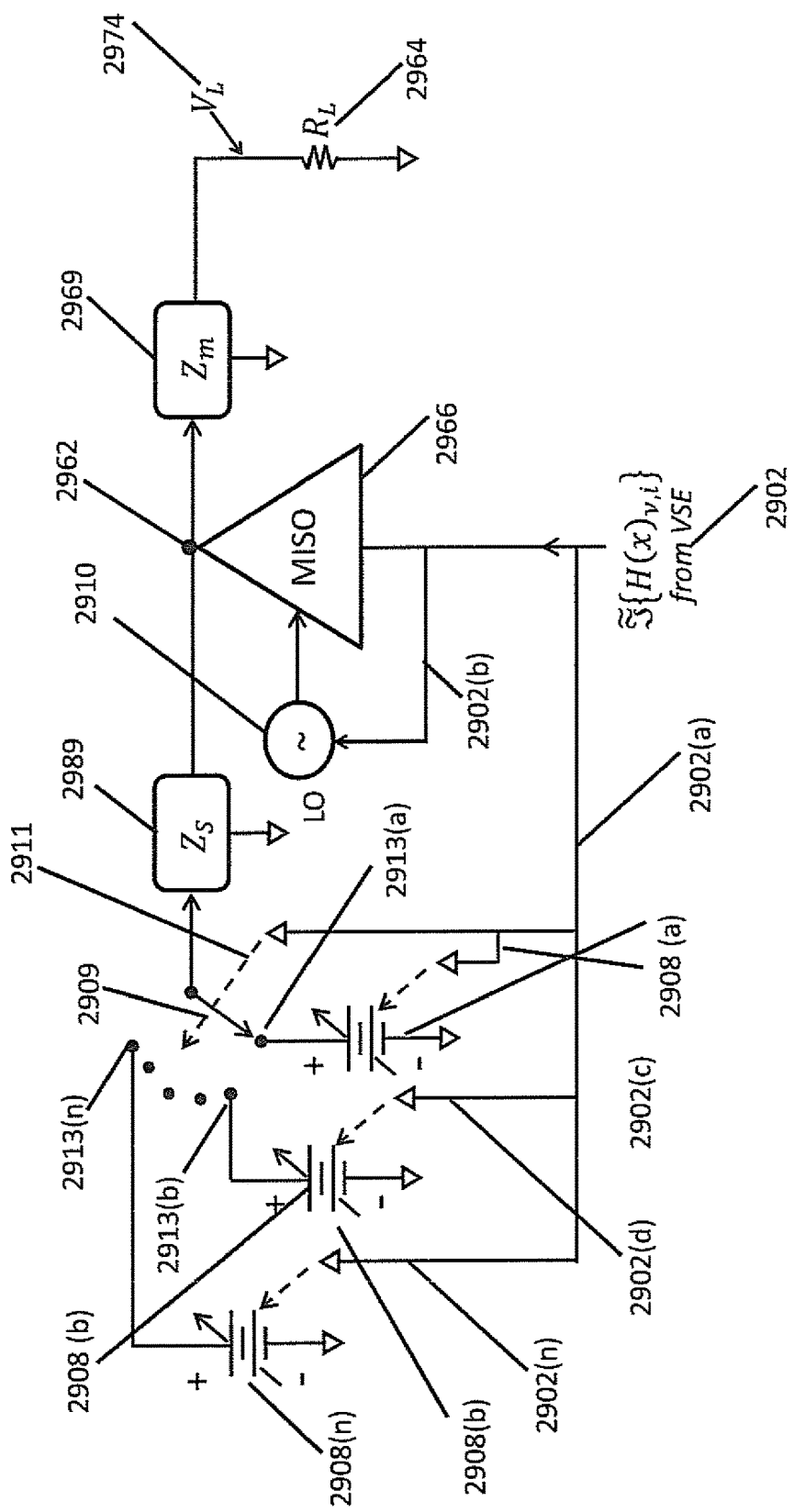
FIG. 29 shows an example of a circuit using FLUTTER™ with switching or variable power supplies for one or more of the energy partitions.

FIG. 29 shows an embodiment 2900 of the present invention. FIG. 29 accommodates variable switching power supplies for one or more of the partitions. As shown in FIG. 29, power supplies 2908(a) . . . (n) (where "n" is any suitable number) receive a first portion of control signals 2902(a). For example, the power supplies (generally 2908) receive control signals 2902(a). Switching of switch 2909, is controlled by switch control 2911 via some portion of the signals 2902(a). Once selected a power source 2908 (a) . . . (n) provides energy to $Z_S$ 2989 as well as other portions of 2900.

A second portion of the control function signals 2902(b) is provided to modulator module, which may be, for example a MISO (multiple input single output module) 2966 and LO (local oscillator) 2910. The modulator module 2966 power source interacts with circuit impedances $Z_S$ 2989, $Z_m$ 2969, $R_S$ 2964, LO 2910, switch 2909, power sources 2908 (a . . . n) and controls 2902 to generate an output $V_L$ 2974.

The architecture shown in FIG. 29 represents nesting of partitions within partitions. Each of the (i) partitions 2902 may be separately subdivided into partitions that can be implemented by a variable, or switching, power supply. Controls 2902 (c . . . n) provide a means of adjusting energy source voltages 2908 (a . . . n) within a selected partition. One or more of the (i) partitions can be realized in this manner. Depending on the specific partitions, ⟨η9⟩ may be increased while providing finer control of amplitude reconstruction over some portion of the envelope dynamic range. Any domain not controlled by a switching power supply may be supplied by a fixed source (source with a significantly constant describing pdf for voltage or current). A Thévenized architecture may replace the variable, or selectable, voltage sources.

Alternative strategies may be presumed for power supply partitioning. This consideration may be applied to any architecture employing FLUTTER™.

Figure 30:
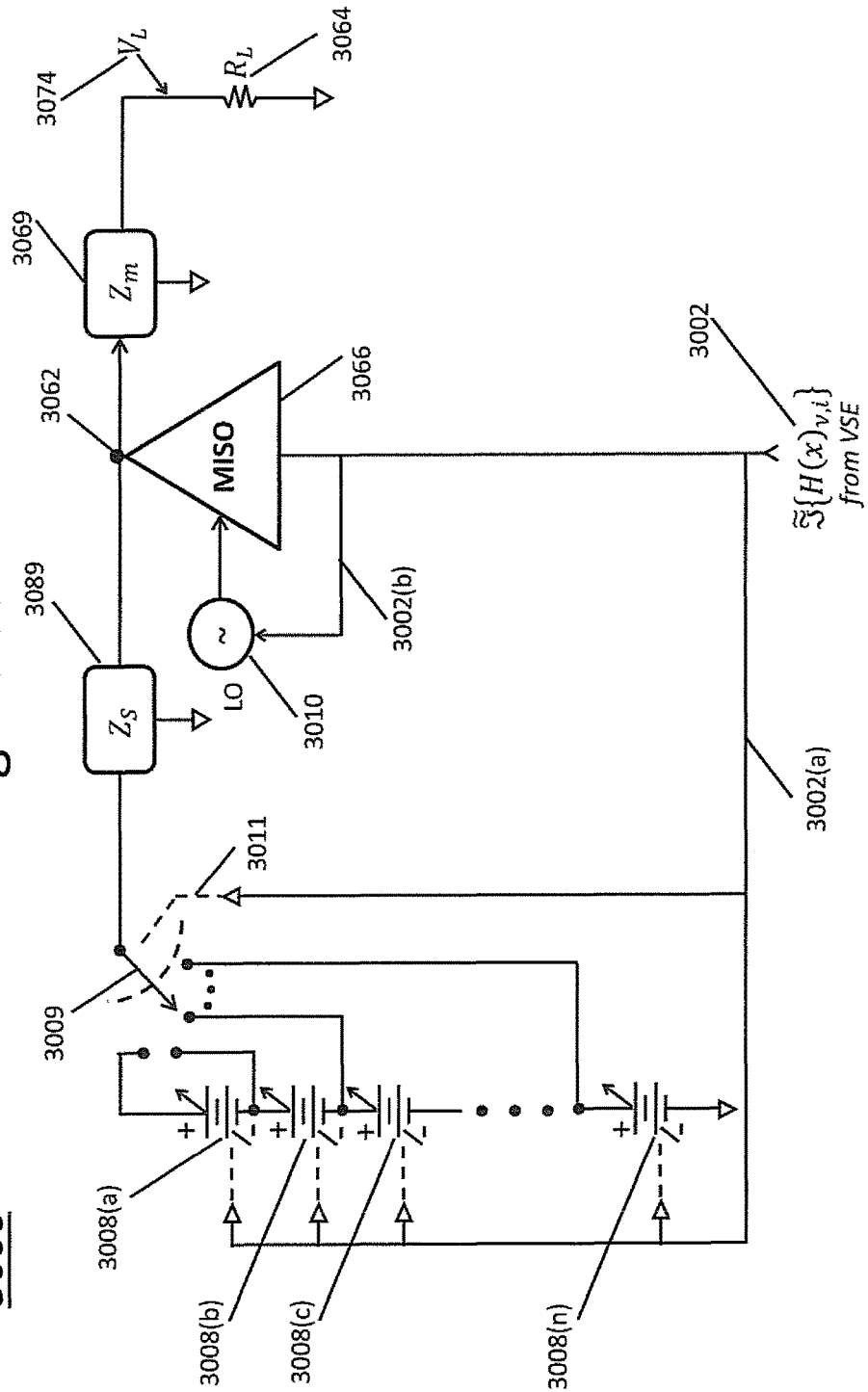
FIG. 30 shows of a series equivalent of FIG. 29.

FIG. 30 shows an alternate embodiment 3000 of the present invention. As shown in FIG. 30, the embodiment 3000 presents the power source cascading, alternative. Portions of the control function signals 3002 (3002(a) and 3002(b)) are provided to energy sources 3008 (a) . . . (n) (where "n" is any suitable number) and to modulator module 3066 as well as LO 3010. The energy sources (generally 3008) may provide voltage, current, power, or any other suitable excitation waveform or energy of any suitable statistic to $Z_s$ module 3089 via controlled switching mechanisms 3011 and 3009. Node 3062 is also shown. Node 3062 is a node which possesses a composite signal statistic.

A signal generated at node 3062 from the interaction of 3066, and 3089, 3009, as well as 3008 is also provided to $Z_m$ 3069, which is then provided to the load 3064, to render $V_L$ 3074.

The structure may also be Thévenized. In addition, both series and parallel power sources can be utilized in place of the fixed series power source bank. Also, as an alternative embodiment, none of the power supplies may be variable or any subset may be variable. Variable supplies are typically switching power supplies, or other equivalently efficient technology.

Figure 31:
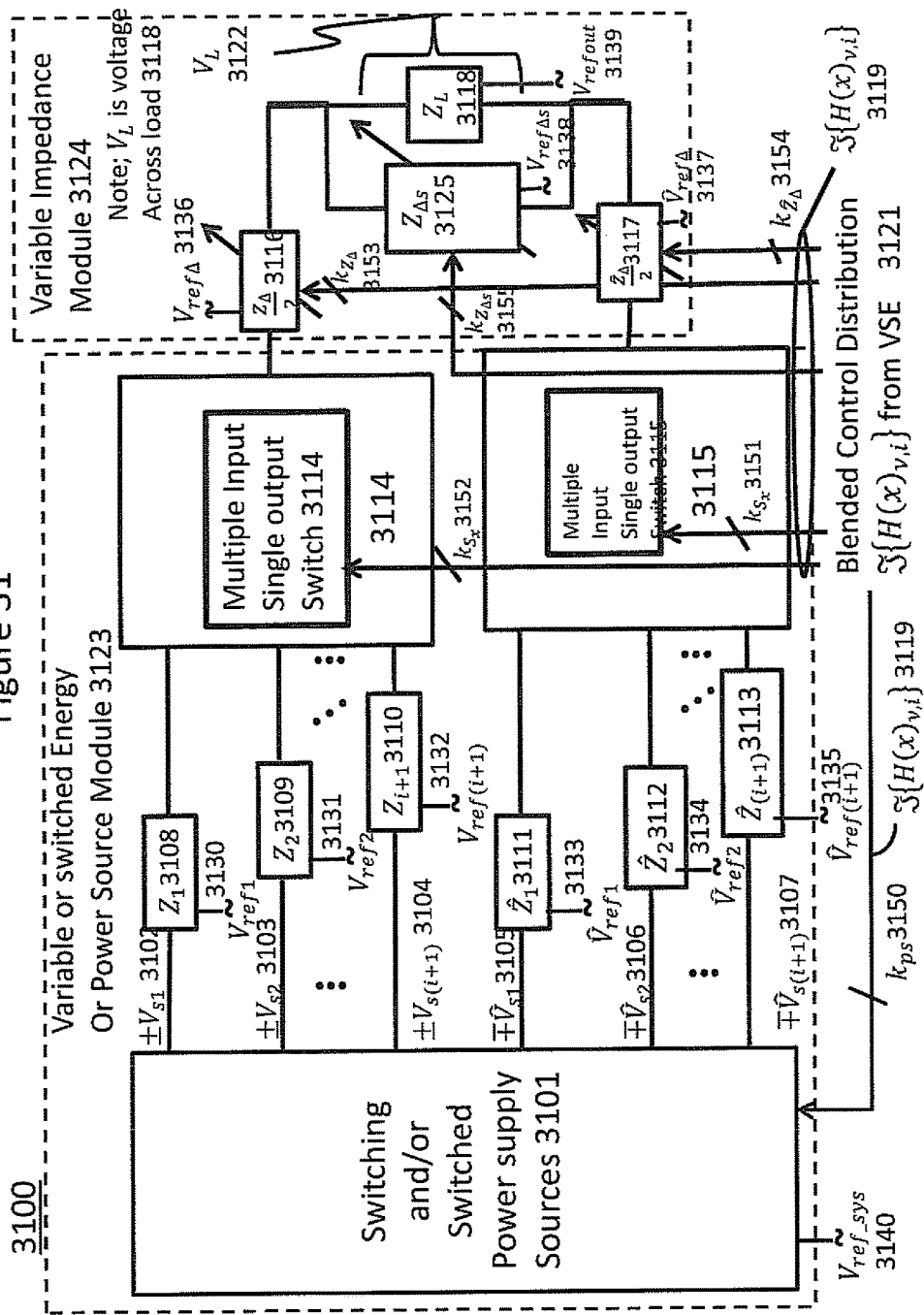
FIG. 31 shows an example of a modulator architecture which may be used with the FLUTTER™ algorithm.

FIG. 31 illustrates another embodiment 3100 of the invention. 3100 is a modulation architecture which supports the FLUTTER™ algorithm. This structure 3100 may also be referred to as a Type 3 modulator. 3100 may be instantiated one or more times to support complex baseband or pass band modulations.

3101 is any suitable energy source consisting of up to 2(i+1) distinct sources and associated branches which may possess currents which have D.C., A.C. characteristics or both. The voltages +/− $V_{s_1}$ 3102, +/−$V_{s_2}$ 3103 up to +/−$V_{i+1}$ 3104 where i+1 is some suitable integer supporting up to i partitions, along with the voltages −/+$V_{s_1}$ 3105, −/+$V_{s_2}$ 3106 up to −/+$V_{i+1}$ 3107 are supplied by module 3101.

Impedance $Z_1$, 3108, is allocated to the circuit branch associated with +/−$V_{s_1}$ 3102. Impedance $Z_2$, 3109 is allocated to the circuit branch associated with +/− $V_{s_2}$ 3103. Impedance $Z_{i+1}$ 3110 is allocated for the circuit branch associated with the voltage +/−$V_{s_{i+1}}$ 3104 in the $(i+1)^{th}$ power supply branch. Impedance $\hat{Z}_1$ 3111, is allocated to the circuit branch associated with $-/+\hat{V}_{s_1}$ 3105. Impedance $\hat{Z}_2$ 3112 is allocated to the circuit branch associated with $-/+\hat{V}_{s_2}$ 3106. Impedance $\hat{Z}_{i+1}$ 3113 is allocated to the circuit branch associated with $-/+\hat{V}_{s_{i+1}}$ 3107.

Switch or Commutator 3114 accesses voltages $+/-V_{s_1}$ 3102, $+/-V_{s_2}$ 3103 ... $+/-V_{s_{i+1}}$ 3104 after interaction with impedances $Z_1$, 3108, $Z_2$, 3109, up to and including $Z_{i+1}$ 3110.

Switch or Commutator 3115 accesses voltages $-/+\hat{V}_{s_1}$ 3105, $-/+\hat{V}_{s_2}$ 3106 ... $-/+\hat{V}_{s_{i+1}}$ 3107 after interaction with impedances $\hat{Z}_1$ 3111, $\hat{Z}_2$ 3112, up to and including $\hat{Z}_{i+1}$ 3113.

Switches or commutators 3114, 3115 are controlled via function 3119 which is a subset of blended controls $\tilde{S}\{H(x)_{v,i}\}$ distributed from a VSE 3121.

$Z_L$ 3118 Load Impedance develops a differential output voltage $V_L$ 3122 according to currents flowing in the circuit determined by selected power sources, voltages $+/-V_{s_1}$ 3101, $+/-V_{s_2}$ 3103 ... $+/-V_{s_{i+1}}$ 3104, voltages $-/+\hat{V}_{s_1}$ 3105, $-/+\hat{V}_{s_2}$ 3106 ... $-/+\hat{V}_{s_{i+1}}$ 3107 as well as impedances $Z_1$ 3108, $Z_2$ 3109, ... $Z_{i+1}$ 3110, impedances $\hat{Z}_1$ 3111, $\hat{Z}_2$ 3112 ... $\hat{Z}_{i+1}$ 3113, impedance $Z_\Delta/2$ 3116, impedance $\hat{Z}_\Delta/2$ 3117, and $Z_L$ 3118.

This modulator topology can deliver unipolar, bipolar, balanced or unbalanced signals, $V_L$ 3122 across the load $Z_L$ 3118 depending on the choice of supply voltages and their relative average values with respect to some system reference potential. A fully differential and balanced output with an average of zero volts at $V_L$ 3122 improves efficiency.

The impedances $Z_\Delta/2$ 3116 and $\hat{Z}_\Delta/2$ 3117 can be implemented with transistors or other suitable structure including MISO functions conveying trans-impedances which may be modeled as $Z_\Delta/2$ 3116 and $\hat{Z}_\Delta/2$ 3117.

A Type 4 modulator may be implemented by adding $Z_{\Delta_s}$ 3125 a shunt impedance used across the $Z_L$ 3118 load impedance terminals and controlled by a subset of blended control 3119.

Impedances $Z_1$ 3108, $Z_2$ 3109, up to and including $Z_{i+1}$ 3110 as well as $\hat{Z}_1$ 3111, $\hat{Z}_2$ 3112 up to and including $\hat{Z}_{i+1}$ 3113 are partially reflective of source power supply parasitic impedances. However, these impedances may be augmented with reactive components to assist in the reconstruction of analytic signal envelopes from circuit currents and voltages.

The modulator structure 3100 of FIG. 31 may be embedded in FIG. 14 to implement complex modulation schemes. The variable or switched energy or power source module 3123 may be deployed in part or whole to modules 1420 and 1430 of FIG. 14. Also, module 3124, the variable impedance module, may be deployed in part or whole to module 1460 of FIG. 14 as part of the $\mathcal{O}$ operator. It should also be noted that controls 3119 correspond to some subset of the controls 1401 of FIG. 14.

While a Type 3 modulator requires variable impedances $Z_\Delta/2$ 3116, $\hat{Z}_\Delta/2$ 3117 is considered optional. A Type 4 modulator utilizes the shunt impedance $Z_{\Delta_s}/2$ 3125.

The switching and/or switched power supply sources may consist of up to 2(i+1) discrete fixed/constant power sources or up to 2(i+1) variable power sources, or a mix of constant and variable types. The power sources may be current sources or voltage sources. The characteristics and values associated with each power source giving rise to voltages $+/-V_{s_1}$ 3102, $+/-V_{s_2}$ 3103 ... $+/-V_{s_{i+1}}$ 3104, $-/+\hat{V}_{s_1}$ 3105, $-/+\hat{V}_{s_2}$ 3106 ... $-/+\hat{V}_{s_{i+1}}$ 3107, are selected and controlled via a subset of blended controls 3119 distributed from a VSE 3121 by suitable analog or digital means.

The power spectral density (psd) of each blended control may be unique. The psd of each blended control may be dynamic and a function of time or state of 3100.

The rates and/or bandwidths of each blended control may be tailored to select or adjust each switch, function, or impedance to reconstruct a desired signal $V_L$ 3122 according to some desired metric. The rates and/or control bandwidths are distributed to maximize apparatus efficiency while conserving H(x) some desired information entropy conveyed through the system to produce $V_L$ 3122.

In general, each function block of 3100 may possess unique reference voltages which are distributed to internal circuit nodes of the indicated or associated impedances or functions. The reference voltage, $V_{ref\_sys}$ 3140, is associated with 3101, switching and/or switched power supply sources. Reference voltage $V_{ref_1}$ 3130 is associated with $Z_1$ 3108. Reference voltage $V_{ref_2}$ 3131 is associated with $Z_2$ 3109. Reference voltage $V_{ref_i}$ 3132 is associated with $Z_{i+1}$ 3110. Reference voltage $\hat{V}_{ref_1}$ 3133 is associated with $\hat{Z}_1$ 3111. Reference voltage $\hat{V}_{ref_2}$ 3134 is associated with $\hat{Z}_2$ 3112. Reference voltage $\hat{V}_{ref_{i+1}}$ 3135 is associated with $\hat{Z}_{i+1}$ 3113. Reference voltage $V_{ref_\Delta}$ 3136 is associated with $Z_\Delta/2$ 3116.

Voltage Reference $\hat{V}_{ref\Delta}$ 3137 is associated with $\hat{Z}_\Delta/2$ 3117.

Voltage Reference $V_{ref\Delta_s}$ 3138 is associated with $Z_{\Delta_s}$ 3125.
Voltage Reference $V_{ref_{out}}$ 3139 is associated with $Z_L$ 3118.

In general the reference voltages for the impedances and functions of circuit 3100 may possess differing values. The reference voltages may possess the same values. The reference voltages may be zero or any other suitable value. The choice of reference voltages will depend on the bias requirements for each circuit impedance or function, the interface requirements for connected circuits or functions and the requirement to implement waveform or signal offsets within 3100.

Blended control Distribution 3121 provides blended controls $\tilde{S}\{H(x)_{v,i}\}$ 3119 to various functions and impedances within 3100. The controls 3119 may be digital, analog or a mix of both. Each control path is labeled with a dimension indicating the number of unique control signals allocated to the indicated path. $k_{ps}$ 3150 is a number of controls less than or equal to 2(v+i) and associated with the switching and/or switched power supply sources 3101. $k_{sx}$ 3152 is a number of controls less than or equal to v+i, and associated with switch 3114. $k_{\widehat{sx}}$ 3151 is a number of controls less than or equal to v+i, and associated with switch 3115. $k_{z_\Delta}$ is a number of controls less than or equal to v+i, and associated with variable impedance $Z_\Delta/2$ 3116. $k_{\hat{z}_\Delta}$ is a number of controls less than or equal to v+i, and associated with variable impedance $\hat{Z}_\Delta/2$ 3117. $k_{z_{\Delta s}}$ is a number of controls less than or equal to v+i, and associated with variable impedance $Z_{\Delta_s}$ 3125. The number of control signals may or may not correspond exactly to the number of physical connections in each control path at each function interface. Controls may be distributed serially or otherwise distributed or multiplexed on a common connection, wire, or path.

Figure 32:
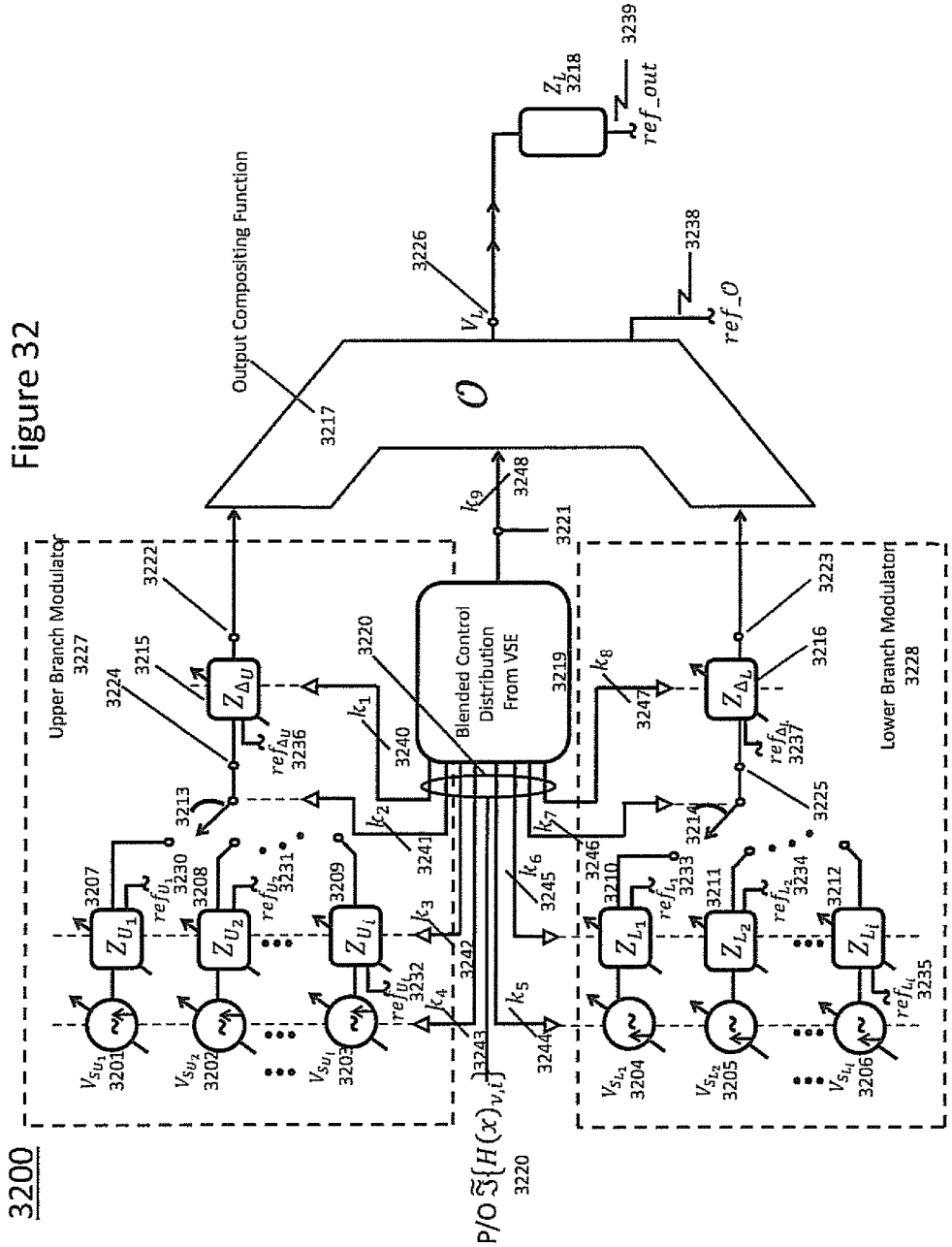
FIG. 32 shows an example of a modulator architecture which may be used with the FLUTTER™ algorithm.

Another embodiment 3200 of the invention is illustrated in FIG. 32. 3200 is a general modulation architecture capable of supporting FLUTTER™ algorithms. 3200 can create virtually any signal in an efficient manner when operated in conjunction with the FLUTTERY™ algorithm.

$V_{S_{U_1}}$ 3201, $V_{S_{U_2}}$ 3202, up to and including $V_{S_{U_i}}$ 3203, are variable voltage or current sources associated with upper branch modulator 3227.

$$V_{S_{L_1}} 3204, V_{S_{L_2}} 3205,$$

up to and including $$V_{S_{L_i}} 3206$$

are variable voltage or current sources associated with the lower branch modulator 3228. Collectively these sources are controlled via blended controls distributed through digital and/or analog methods from a VSE 3219. Collectively the voltage and/or current sources $$V_{S_{U_1}} 3201, V_{S_{U_2}} 3202,$$

up to and including $$V_{S_{U_i}} 3203$$

are referred to as upper branch sources. Collectively, the voltage and/or current sources $$V_{S_{L_1}} 3204, V_{S_{L_2}} 3205$$

up to and including $$V_{S_{L_i}} 3206$$

are referred to as lower branch sources. The upper branch sources and lower branch sources may be composed of any combination of current and voltage sources. The upper branch sources and lower branch sources may be D.C., A.C., or mixed and possess any suitable statistic of voltages or currents. The upper branch sources and lower branch sources may be harmonic functions or modulated harmonic functions. The upper branch sources and lower branch sources may be random. The upper branch sources and lower branch sources may possess both harmonic and random waveform metrics as may be required. The fundamental frequency of each of the upper branch sources and each of the lower branch sources may be independently varied from 0 Hz (D.C. case) to any suitable upper frequency limit. The phase of each of the upper branch sources and each of the lower branch sources may be independently varied from 0° degrees to modulo 360° degrees as required. The amplitudes for each of the upper branch sources and each of the lower branch sources may be independently controlled as required.

$Z_{U_1}$ 3207 is a variable impedance associated with voltage or current source $$V_{S_{U_1}} 3201. Z_{U_2} 3208$$

is a variable impedance associated with voltage or current source $$V_{S_{U_2}} 3202$$

up to and including $Z_{U_i}$ 3209 variable impedances are associated with up to and including $$V_{S_{U_i}} 3203$$

voltage or current sources.

$Z_{L_1}$ 3210 is a variable impedance associated with voltage or current source $$V_{S_{L_1}} 3204.$$

$Z_{L_2}$ 3205 is a variable impedance associated with voltage or current source $$V_{S_{L_2}} 3211$$

up to and including $Z_{L_j}$ 3212 variable impedances are associated with up to and including $$V_{S_{L_i}} 3206$$

voltage or current sources.

Collectively $Z_{U_1}$ 3207, $Z_{U_2}$ 3208 up to and including $Z_{U_i}$ 3209 variable impedances are referred to as upper branch source impedances. Collectively $Z_{L_1}$ 3210, $Z_{L_2}$ 3211, up to and including $Z_{L_1}$ 3212 variable impedances are referred to as lower branch source impedances.

A variable portion of each upper branch impedance and each lower branch impedance are controlled via a subset of blended controls 3220 distributed by digital and/or analog means from a VSE 3219.

The index value i enumerating the upper branch sources, upper branch source impedances, lower branch sources, and lower branch source impedances, may assume any suitable integer value.

An upper branch commutator or switch 3213 selects an upper branch source via an associated upper branch source impedance based on a subset of blended controls 3220. A lower branch commutator or switch 3214 selects a lower branch source via an associated lower branch source impedance based on a subset of blended controls 3220.

The selected upper branch commutator or switch 3213 output 3222 is routed to variable upper branch impedance $Z_{\Delta_U}$ 3215. The selected lower branch commutator or switch 3214 output 3225 is routed to variable lower branch impedance $Z_{\Delta_L}$ 3216.

$Z_{\Delta_U}$ 3215 and $Z_{\Delta_L}$ 3216 variable upper branch and lower branch impedances respectively are controlled by a subset of blended controls 3220 distributed by digital and/or analog means from a VSE 3219.

An output 3222 from variable upper branch impedance $Z_{\Delta_U}$ 3215 is routed to output compositing Function 3217 also labeled as $\mathcal{O}$. An output 3223 from variable lower branch impedance $Z_{\Delta_L}$ 3216 is routed to output compositing Function 3217 also labeled as $\mathcal{O}$.

Output Compositing Function 3217 operates on inputs 3222 and 3223 to create output composited signal $V_L$ 3226 at load impedance $Z_L$ 3218. Control/s 3221 varies of the output Compositing Function 3217 according to a subset of blended controls 3221.

The upper branch modulator 3227 and lower branch modulator 3228 along with blended controls 3220 and 3221 distribution of suitable prepared controls from the VSE 3219 and Compositing Function 3217, include a universal modulator generating virtually any modulated waveform/signal at $V_L$ 3226, over frequency spans from baseband to any suitable carrier frequency. Furthermore, blended controls 3220, 3221, may be at suitable rates to support desired signal data rates and bandwidths, any signal path as well as at the output $V_L$ 3226.

Each upper branch source, each lower branch source, each upper branch source impedance, each lower branch source impedance, variable upper branch impedance, variable lower branch impedance as well as compositing function may possess independent controls with independently variable information control rates and/or bandwidths.

A certain portion of information entropy H(x) distributed as a function of apparatus degrees of freedom and partitions. $\tilde{\Im}\{H(x)_{v,i}\}$ is distributed via blended controls 3220, 3221, to each variable functions and modules comprising 3200.

As a consequence, a differing portion of information entropy H(x) is supported or conveyed by each variable function or module of 3200 such that an output compositing function 3217 conserves input information entropy H(x) at the output $V_L$ 3226 albeit in a signaling format of choice which may be for example a modulated RF carrier signal. Each variable function or module of 3200 is assigned some portion of the input entropy H(x) based on the portion of the originating information describing probability density function p(x) which exploits the most efficient modes of the apparatus. That is, an original density function p(x) with associated information entropy H(x) may be parsed to a set of joint probability densities $p(x)_{v,i}$ each with associated entropies $H(x)_{v,i}$ which may be independent or partially correlated. The manner in which the set $p(x)_{v,i}$ is defined is based on a maximization of distributed apparatus efficiency (and hence total efficiency) and the requirement to conserve H (x) in the modulation process.

For example, for a particular application of 3200 it may be efficient to restrict the rate at which the upper branch sources and lower branch sources may be varied. Amplitudes may be fixed or slowly varied at one sample rate of bandwidth. Phases may be varied at differing rates which are more rapidly varying than amplitudes of the sources. The upper branch source impedances and lower branch source impedances may vary at unique rates. The commutator or switch 3218, 3214 selection rates may be unique. The variable upper branch impedance 3215 and the variable lower branch impedance 3216 may vary at unique rates. Operations within the output compositing function 3217 may vary at unique rates. Each blended control may possess an associated unique power spectral density (psd). Each blended control may possess a power spectral density that varies. In this manner the output modulation of signal $V_L$ 3226 is a composited blend of functions within the apparatus which are optimized according to control rate vs. efficiency and dynamic range vs. efficiency per function or module. The total efficiency is the average efficiency for all functions or modules of 3200 operating in concert.

In general, each unique desired output signal statistic may utilize new rates for all functions and modules and redefine the set $p(x)_{v,i}$ which in turn modifies the weighting of the blended controls $\tilde{\Im}\{H(x)_{v,i}\}$.

All degrees of freedom illustrated in FIG. 32 may not be required for every application. For instance, some applications may not require upper branch source impedances which vary and lower branch source impedances which vary. In some circumstances upper branch source frequency and lower branch source frequency may be fixed. Logical redaction is apparent to those skilled in the art.

It is also apparent that either the upper branch modulator 3227 or lower branch modulator 3228 may function as modulators separate from one another provided they benefit from suitable blended controls 3220, 3219 and output compositing function 3217.

The output compositing Function 3217 is a specific portion of a distributed compositing function. Most generally, compositing is a distributed function embedded in the blended control attributes, in the form of rates relative sample weighting and nonlinear mappings. However, the operator $\mathcal{O}$ possesses a prominent position in the modulator signal processing flow and final entropy reconstruction and thus is also referred to as an output compositing function in this topology. More specifically, it is a final mapping in the compositing process which constructs the desired output signal whilst conserving H(x).

There are the following reference voltages which may be associated with internal circuit nodes for the associated impedances and functions which are subordinate to 3200.

| Reference Voltage | ref_$u_1$ | 3230 is associated with $Z_{U_1}$ 3207. |
|---|---|---|
| Reference Voltage | ref_$u_2$ | 3231 is associated with $Z_{U_2}$ 3208. |
| Reference Voltage | ref_$u_i$ | 3232 is associated with $Z_{U_i}$ 3209. |
| Reference Voltage | ref_$L_1$ | 3233 is associated with $Z_{L_1}$ 3210. |
| Reference Voltage | ref_$L_2$ | 3234 is associated with $Z_{L_2}$ 3211. |
| Reference Voltage | ref_$L_i$ | 3235 is associated with $Z_{L_i}$ 3212. |
| Reference Voltage | ref_$\Delta_U$ | 3236 is associated with $Z_{\Delta_U}$ 3215. |
| Reference Voltage | ref_$\Delta_L$ | 3237 is associated with $Z_{\Delta_L}$ 3216. |
| Reference Voltage | ref_$\mathcal{O}$ | (3238) is associated with output Compositing Function (3217). |
| Reference Voltage | ref out | 3239 is associated with output load $Z_L$ 3218. |

The above listed reference voltages may assume any suitable value for distribution to circuit nodes internal to the associated impedances or functions. The reference voltages may or may not be equal. The reference voltages may or may not be zero. The choice of reference voltage for each function or impedance depends on whether the functions impedances require some particular operational bias voltage to implement a respective function, facilitate interface to connected impedances or functions, or to implement waveform or signal offset values.

In general each circuit internal to the impedances $Z_{U_1}$ 3207, $Z_{U_2}$ 3208, up to and including $Z_{U_i}$ 3209, $Z_{L_1}$ 3210, $Z_{L_2}$ 3211 up to and including $Z_{L_i}$ 3212, $Z_{\Delta_U}$ 3215, $Z_{\Delta_L}$ 3216 and $Z_L$ 3218 may possess series and shunt circuit elements with respect to input, output, and reference voltage terminals as well as any defined system ground potential. Likewise, output compositing function $\mathcal{O}$ may consist of series and shunt circuit elements with respect to input, output, blended control and reference voltage ref_$\mathcal{O}$ 3238 voltage terminals as well as any defined system ground potential.

Blended controls 3220 and 3221 distributed from VSE 3219 consist of the illustrated control paths from 3219 to each respective applicable function within 3200. Each illustrated control path is assigned a dimension labeled $k_1$ 3240, $k_2$ 3241, $k_3$ 3242, $k_4$ 3243, $k_5$ 3244, $k_5$ 3245, $k_7$ 3246, $k_8$ 3247, $k_9$ 3248. Each dimension can assume a number less than or equal to the number v+i the total number of control degrees of freedom. Each of the dimensions $k_1$, $k_2$ $k_3$, $k_4$, $k_5$, $k_6$ $k_7$, $k_8$ $k_9$, may be unique. The dimension values indicate the number of control signals assigned to each control path. Each control path is some subset of the blended controls 3220, 3221. The number of control signals per path may or may not correspond to the number of physical connections between the distribution interface of the VSE 3219 and the respectively connected function within 3200. Each control path may support a number of signals different than the number of physical path connections through techniques of serial control, parallel control, as well as multiplexing or a mixture of these techniques.

| | | |
|---|---|---|
| Control path dimension | $k_1$ | 3240 is associated with $Z_{\Delta_U}$ 3215. |
| Control path dimension | $k_2$ | 3241 is associated with Switch (3213). |
| Control path dimension | $k_3$ | 3242 is associated with Impedances $Z_{U_1}$ 3207, $Z_{U_2}$ 3208 ... $Z_{U_i}$ 3209. |
| Control path dimension | $k_4$ | 3243 is associated with Power Sources $V_{S_{U^1}}$ 3201, $V_{S_{U^2}}$ 3202 ... $V_{S_{U^i}}$ 3203. |
| Control path dimension | $k_5$ | 3244 is associated with Power Sources $V_{S_{L^1}}$ 3204, $V_{S_{L^2}}$ 3205 ... $V_{S_{L^i}}$ 3206. |
| Control path dimension | $k_6$ | 3245 is associated with Impedances $Z_{L_1}$ 3210, $Z_{L_2}$ 3211 ... $Z_{L_i}$ 3212. |
| Control path dimension | $k_7$ | 3246 is associated with Switch 3214. |
| Control path dimension | $k_8$ | 3247 is associated with $Z_{\Delta_L}$ 3216. |
| Control path dimension | $k_9$ | 3248 is associated with output composite Function 3217 also on occasion referred to as operator $\mathcal{O}$. |

Figure 33:
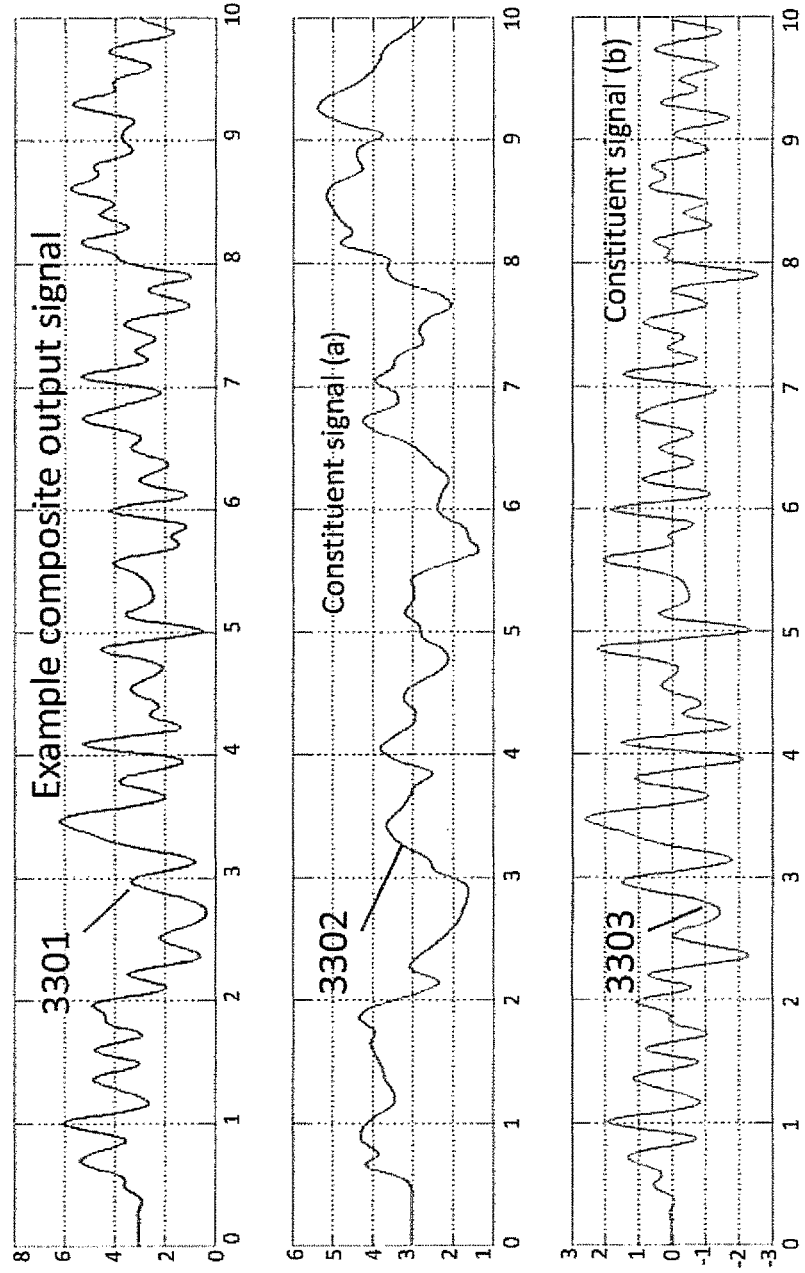
FIG. 33 shows an example of some signals associated with application of blended controls as part of the FLUTTER™ algorithm.

FIG. 33 illustrates a graphic (3300) depicting an example composited signal 3301 along with 2 constituent signals, constituent signal (a) 3302 and constituent signal (b) 3303. Each of the illustrated constituents, 3302 and 3303, may also be a composite of other constituents, not illustrated.

The constituent signals (a and b) 3302 and 3303 are used as a part of a streamlined example to illustrate several aspects of FLUTTER™ as pertains to the use of blended controls which manipulate architectures such as the kind illustrated in FIGS. 1, 2, 3, 4, 13, 14, 18, 22, 26, 27, 28, 29, 30, 31 and 32.

Constituent signals (a) 3302 and (h) 3303 are obtained from subsets of blended controls $\tilde{\Im}\{H(x)_{v,i}\}$ which shall be labeled $\tilde{\Im}\{H(x)_{v,i}\}_a$ for subset (a) corresponding to constituent signal (a) 3302 and $\tilde{\Im}\{H(x)_{v,i}\}_b$ subset (b) corresponding to constituent signal (b) 3303. $\tilde{\Im}\{H(x)_{v,i}\}_a$, $\tilde{\Im}\{H(x)_{v,i}\}_b$ may also be referred to as domains of blended controls or simply as Domains depending on context.

Graphic 3301, example output composite, is a desired output signal. It may also represent an amplitude envelope for the amplitude modulated portion of an RF carrier modulated signal, where the carrier wave has been omitted for convenience of illustration. Signal 3301 therefore possesses the associated desired information entropy $H(x)$. Signal 3302 possesses some information entropy $H_a(x)$ which is less than $H(x)$. Signal 3303 likewise possesses some information entropy $H_b(x)$ which is less than $H(x)$. The output composite of constituent signal (a) (3302) and constituent signal (b) (3303) is obtained through an operator, say for example operator $\mathcal{O}$, which reconstitutes $H(x) = \tilde{\Im}\{H_a(x), H_b(x)\}$ subject to some time domain signal requirement, in this case the illustrated signal 3301.

Close examination of constituent signal (a) 3302 reveals an apparent bandwidth different than the final composite 3301. This signal 3302 possesses less than half the bandwidth of signal 3301 for purposes of illustration, and this specific example.

Examination of constituent signal (b) 3303 reveals an apparent bandwidth on the order of the output signal 3301.

Thus, the effective bandwidth and/or sample rate for $\tilde{\Im}\{H(x)_{v,i}\}_a$ may be different than $\tilde{\Im}\{H(x)_{v,i}\}_b$. This can represent an advantage for cases involving apparatus hardware functions which possess varying degrees of performance limitations as a function of sample rate and/or bandwidth. Both efficiency and information entropy conservation may be tailored as sample rate requirements and bandwidth requirements increase, or decrease. By distributing the information $H(x)$ into entropies $H_a(x)$ and $H_b(x)$ the constituent probability densities $\{p_a(x)\}_{v,i}$ and $\{p_b(x)\}_{v,i}$ may be tailored to match the degrees of freedom available in the apparatus, allocating information amongst these degrees of freedom to optimize efficiency, and permit conservation of $H(x)$ in the output signal complex envelope.

In this simple example the composite output signal 3301 is a simple sum of constituent (a) 3302 and constituent (b) 3303 to facilitate disclosure. That is, the output operator $\mathcal{O}$ is linear in this simplified example. In general this may not be the case and $\mathcal{O}$ example may be a more intricate nonlinear function of its input constituents. Moreover, the $\mathcal{O}$ output operator may possess more than two input constituents. The constituent signals associated with $\tilde{\Im}\{H(x)_{v,i}\}_a$ and $\tilde{\Im}\{H(x)_{v,i}\}_b$ may be optional inputs to the output compositing procedure on occasion referred to as $\mathcal{O}$. In general $\tilde{\Im}\{H(x)_{v,i}\}_a$ and $\tilde{\Im}\{H(x)_{v,i}\}_b$ may be regarded as nonlinear functions.

It should be noted that if composite output signal 3301 represents an output envelope or a signal derived from a complex envelope, that the constituent signals (a) 3302 and (b) 3303 do not follow the envelope of 3301. This is in contrast to envelope following and envelope restoration technologies which strive to follow the envelope as accurately as possible. FLUTTER™ relaxes the requirement for signal processing functions such as switching power supplies, for example, to possess extreme instantaneous dynamic range in concert with bandwidth. As an example consider that some portion of $\tilde{\Im}\{H(x)_{v,i}\}_a$ is allocated to a variable power source. Then to some extent constituent signal (a) 3302 may be formed from the variation of such a variable power source. Such a power source may vary without explicitly tracking the output signal envelope while enhancing efficiency. In contrast 3303 may possess a single power supply partition to facilitate $\tilde{\Im}\{H(x)_{v,i}\}_b$ processing for this example. The allocation of i energy partitions to certain processing domains depends on the efficiency of functions available to those domains vs. the linearity requirements (capacity to conserve information) associated with those processing functions. Therefore, in this simplified example it is plausible to allocate i=1 or some other relatively low index for the number of energy partitions to process constituent signal (b) 3303 as compared to the number of energy partitions allocated to process constituent signal (a) 3302.

Constituent signal (a) 3302 and constituent signal (b) 3303 are characterized by random variables with probability density functions. These constituents are subordinate to the composite output signal 3301. The three signals possess differing power spectral densities. In addition, constituent signals subordinate to constituent (a) 3302 and constituent signals subordinate to constituent signal (b) 3303 may possess differing power spectral densities. FLUTTER™ trades efficiency vs. processing bandwidth and spectral characteristics according to the sustainable efficiency vs. information throughput for each function of the apparatus.

Linearity is not required for each function nor is it necessarily preferred. Rather efficiency is preferred, metering, subordinate signals approximately through nonlinearities such that the compositing process reconstitutes a desired signal without waste or distortion. Undesirable qualities of nonlinear processing are effectively suppressed at the composited output signal 3301 exploiting algorithm symmetries, nonlinear discrimination techniques as well as filtering. Thus, the FLUTTER™ technology and philosophy significantly contrast with pre-distortion technologies which strive to correct all system nonlinearities. FLUTTER™ accentuates the prominence and role of certain classes of nonlinearities rather than eliminating them.

Figure 34:
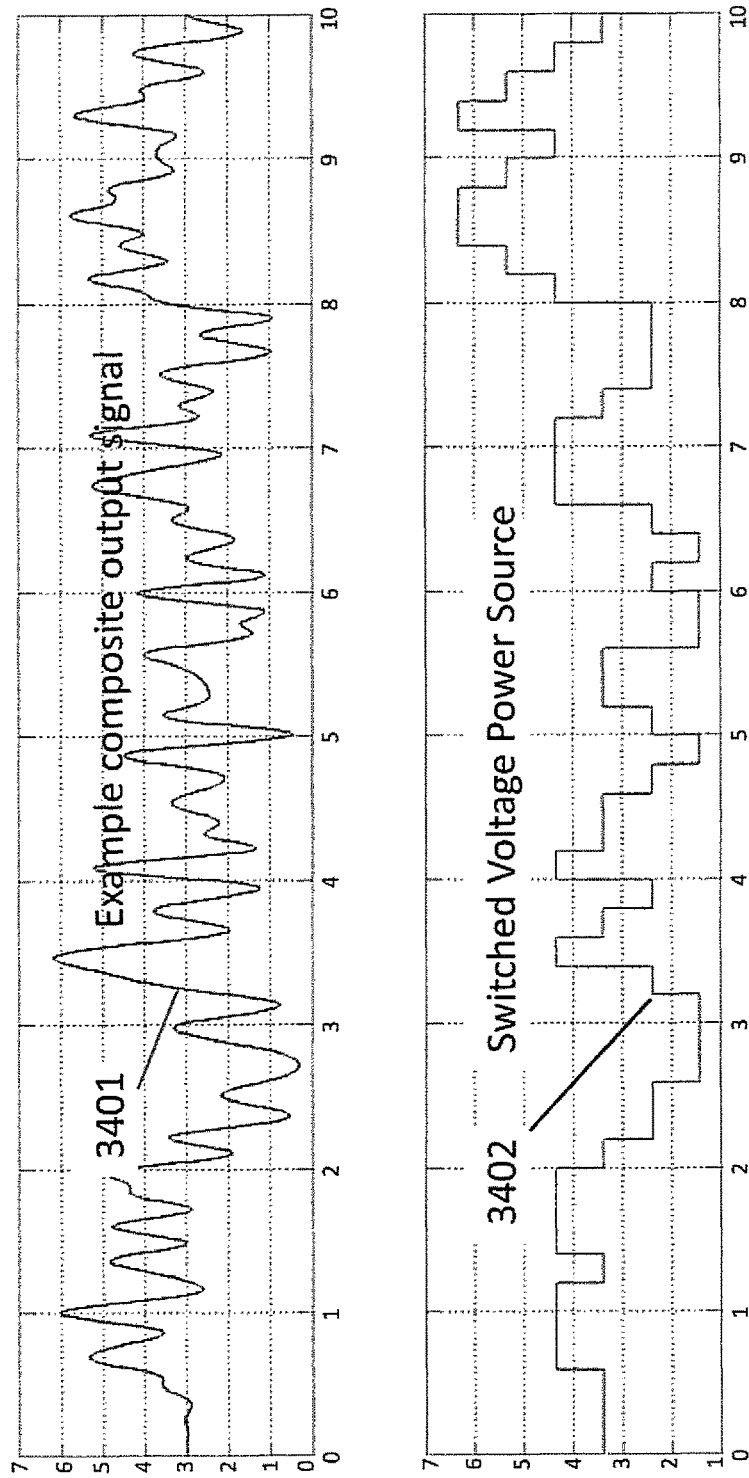
FIG. 34 shows an example of some signals associated with application of blended controls as part of the FLUTTER™ algorithm.

FIG. 34 illustrates an example composite output signal 3401 which is the same as for the example of FIG. 33. Graphic 3402 illustrates a waveform corresponding to switched voltages of a variable or switched power source. For example this graphic could be associated with one or more outputs of function/module 3101 in FIG. 31. In general it may apply to any power source for FIGS. 1, 2, 3, 4, 14, 18, 22, 26, 27, 28, 29, 30, 31 and 32.

Notice the discrete voltage levels depicted in 3402. These levels may correspond to i energy partitions which are selected by commentator or switch functions similar to 3116 and 3117 of FIG. 31 for example. It is apparent after reviewing 3401 and 3402 that the switched voltage power sources 3402 do not track the example composite output signal 3401. Yet, the switched power sources 3402 signal/waveform are used to reconstruct 3401. Indeed a portion of the composite output signal 3401 information entropy is captured in the describing pdf for 3402. It is also apparent that the average sample rate for 3402 is noticeably less than the required Nyquist sample rate for a reconstruction of signal 3401. The number of partition thresholds associated with i partitions of the waveform 3402 and the threshold levels between partitions are functions of the required efficiency, limitations of the switched power source circuitry and the pdf associated with the information entropy allocated to the switched power source function. Nonlinearities of the waveform 3402 are effectively suppressed by other discriminating techniques of the FLUTTER™ algorithm, as well as filters.

Since switching efficiency $\eta_{sx}$ can become a design consideration, architectures should take advantage of switch topologies that minimize cascading. Therefore, an example of hierarchical cascading, which is convenient for binary distributions, is shown in FIG. 35.

For n such cascades the switch efficiency progresses $\propto \eta_{sx}^n$. This quickly siphons energy at the point of delivery and increases waste entropy $S_w$.

Figure 35:
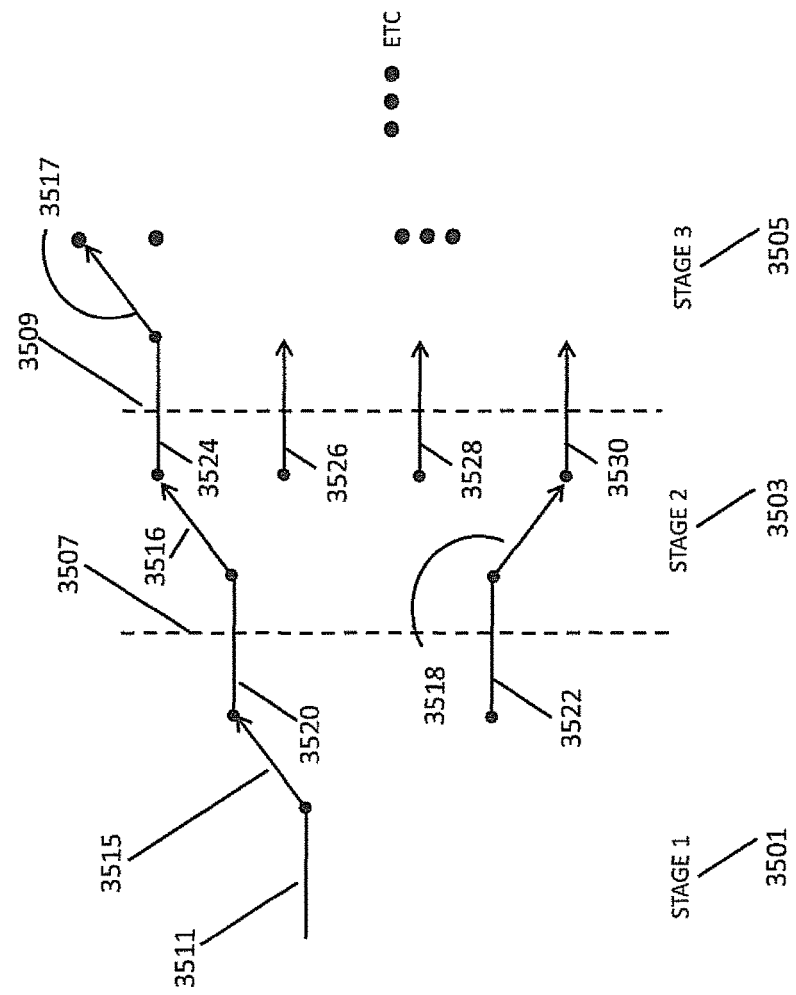
FIG. 35 shows a cascaded switch structure.

As shown in FIG. 35, embodiment 3500 shows three stages 3501, 3503 and 3505, defined by boundaries 3507 and 3509. 3511, 3520, 3522, 3524, 3526, 3528, and 3530 represent signal paths accessing switching stages 3501, 3503, and 3505 respectively. The switching stages are composed of one or more switching elements 3515, 3516, 3517 and 3518. Although three stages are illustrated the architecture may continue, accommodating a sequence of more stages. Furthermore, one stage may suffice for some applications. Such switching architectures may also be deployed in parallel or series.

Figure 36:
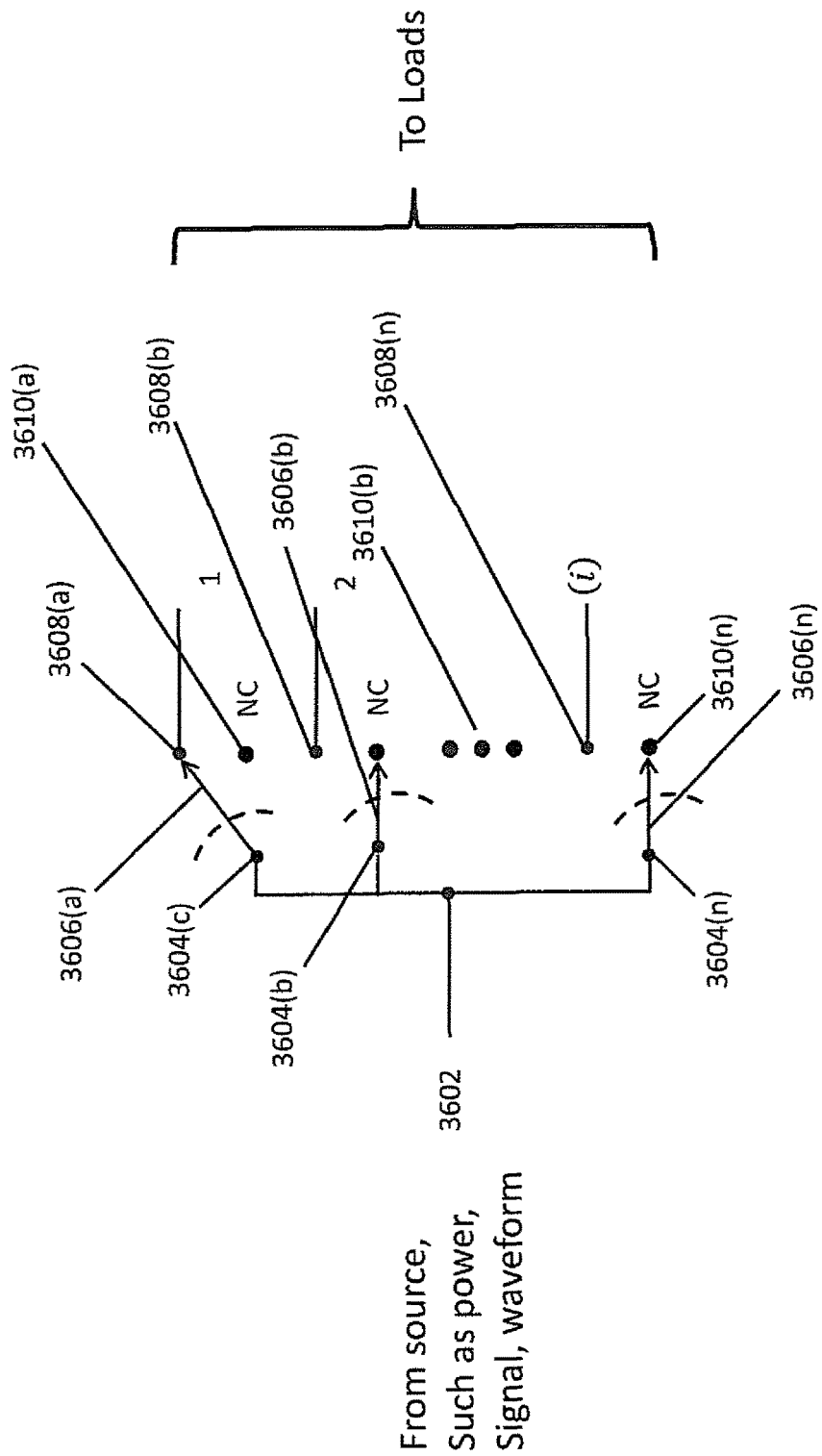
FIG. 36 shows a parallel switch topology.

Alternatively, parallel switch architectures may be utilized. This topology is illustrated as shown in FIG. 36 as embodiment 3600. Source 3602 supplies energy or signal or waveform to nodes 3604(a) . . . (n) where "n" is any suitable number, via the switch selection process. An "on" switch 3606(a) . . . (n) can connect nodes 3604(a) . . . (n) to nodes 3608(a) . . . (n). As shown in FIG. 36, each switch possesses a "no connect" (NC) option 3610(a) . . . (n) respectively. In this embodiment, only one switch may access a power partition or a signal or a waveform 3602 at any given instant and transfer 3602 to 3606(a) . . . (n). The efficiency, of this switch topology is on the order of $\eta_{sx}$. The load impedances attached to this switch at nodes 3608(a) . . . (n) (outputs), as well as "soft" shut down, and "soft" start must be specifically tailored for the source at 3602 to avoid deleterious contentions and poorly behaved initial conditions when switching between outputs. In some cases the equivalent of a time variable transition conductance may be employed within the switching circuits in conjunction with adjustment of the source at 3602 and the loads connected to the switch to eliminate transition discontinuities in charge transfer through various circuit nodes of 3600. Although loads are not illustrated it is understood that suitable impedances may be connected to nodes 3608(a) . . . (n).

The FLUTTER™ algorithms and its related energy partitioning schemes may be adapted to traditional RF modulators and transmitters to enhance efficiency. FLUTTER™ does not require exclusive implementation. FLUTTER™ processing algorithms may enhance the efficiency for;

Polar Architectures
Kahn's Technique
Envelope Restoration
Envelope Tracking
LINC
Chireix Outphasing
Doherty
Complex Modulators followed by Amplifier Chains Indeed, embodiments of the present invention also apply to architectures that connect and control with fields and not conductors or switches. For example apparatus which use electromagnetic coupling, optical coupling, pressure coupling and combinations thereof.

There are several aspects of FLUTTER™ and the disclosed architectures that enable standards based communications applications as well as emerging standards. This includes the support of CDMA, WCDMA, LTE, OFDM based, GSM, as well as ultra wide band waveforms amongst others. In addition, spread spectrum as well as frequency hopped signaling schemes are contemplated in terms of benefits offered by FLUTTER™. In general, an information bearing function of time (signal) may be continuous in nature, discrete or a combination. Such signals may be multiplexed to include time division multiplexed TDM, frequency division multiplexed (FDM), code division multiple access (CDMA), and hybrid schemes. The signals may be pulse modulated as well as pulse width modulated at regular or random intervals of time. The pulses may be of a variety of shapes such as rectangular, Gaussian, sine-like, etc., symmetric or asymmetric in time. Waveforms which may be modulated to produce these signals may be baseband in nature or based on the modulation of local oscillators or other harmonic functions produced through modulation of complex impedances to produce pass band signals as well.

Although much of the discussion includes optimization for information and energy partitions, it should be apparent to those skilled in the art that a variety of practical tradeoffs in cost, hardware availability, etc., may on occasion dictate sub optimal partitions which perhaps perform at some lower efficiency. This disclosure has enabled such tradeoffs, providing the necessary guidance for design compromises using the FLUTTER™ algorithm.

Figure 37:
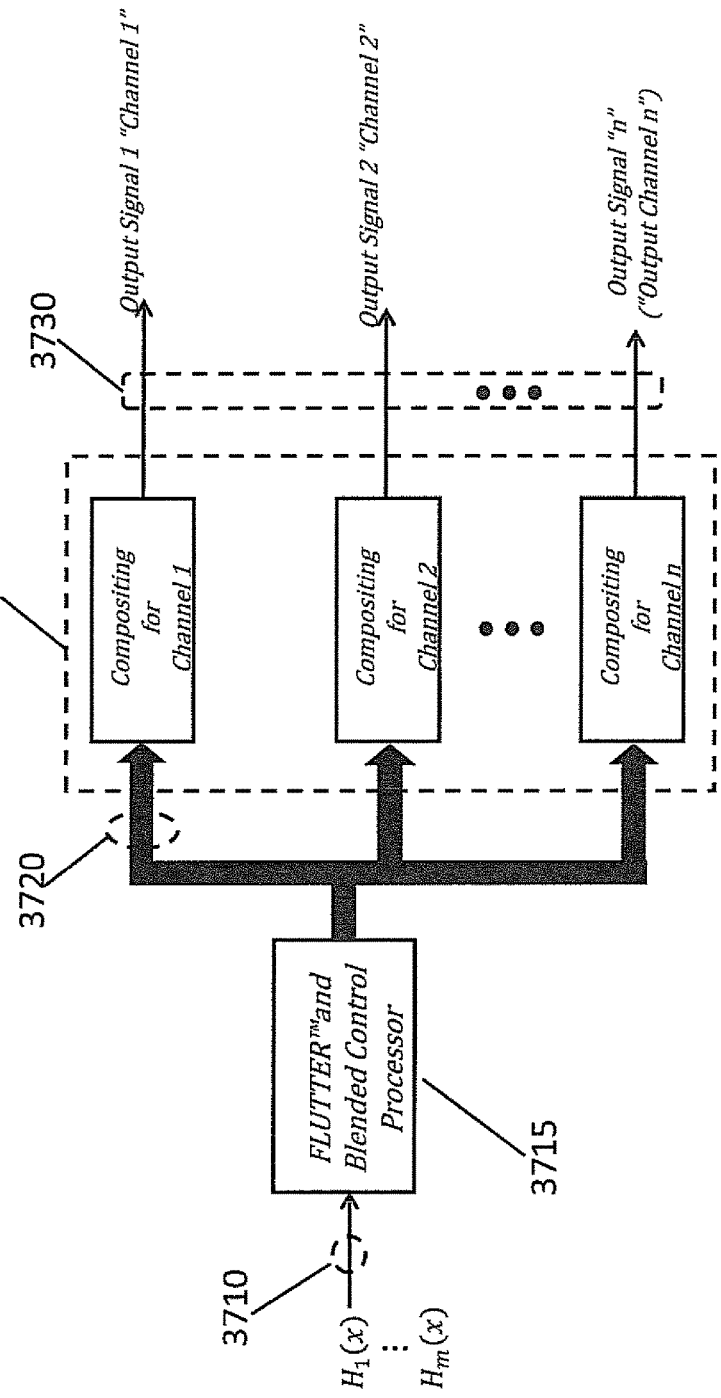
FIG. 37 shows an example of one or more composite information bearing functions of time, constructed from one or more information sources, using a FLUTTER™ or blended control based architecture.

FIG. 37 illustrates that FLUTTER™ algorithms may be distributed in nature. Embodiment 3700 includes is a set of information inputs 3710 with uncertainty $\{H_1(x), H_2(x) \ldots H_m(x)\}$. 3715 is a FLUTTER™ and blended control processor with distributed input-output capability. 3725 is a bank of analog compositing functions. 3300 represents a multiplicity of information bearing functions of time, also referred to as output signal 1 through "n" where "n" is any suitable integer.

Multi-channel FLUTTER™ algorithms operate on a set (3710) of information inputs to render information bearing functions of time or output signals using any number of inputs 3710 up to "m" to render any number of outputs 3730 up to "n". There are no restrictions on "n" or "m" other than they be integers greater than or equal to one. Furthermore, the content of the up to "n" output channels may have some portion of information in part or in whole, in common between each output. Also, each output may be completely unique and independent of the other. The compositing process may be any analog or digital processor and utilize software and/or microprocessors.

In another embodiment, blended controls used to access functions and domains which form statistical composites may access general classes of mathematical, logical and geometrical functions in any combination which represent sampled data. The representations may be interpolated, extrapolated, and approximated in any combination from data sets using structures such as points, lines, line segments, splines, surface elements including manifolds, patches, facets and volume elements of any suitable character. The representations may be in part or in whole derived from a priori data and/or real time information sources, $H(x)$. These structures may be employed homogeneously or in any combination to generate differential entropy surfaces, differential entropy volumes or suitable transformations thereof. An differential entropy surface is a 2 dimensional representation. A differential entropy volume is a D dimensional representation where D is an integer greater than or equal to 3. Upon suitable transformation, the resulting composite representations shall be used to render an information bearing function of time.

Figure 38:
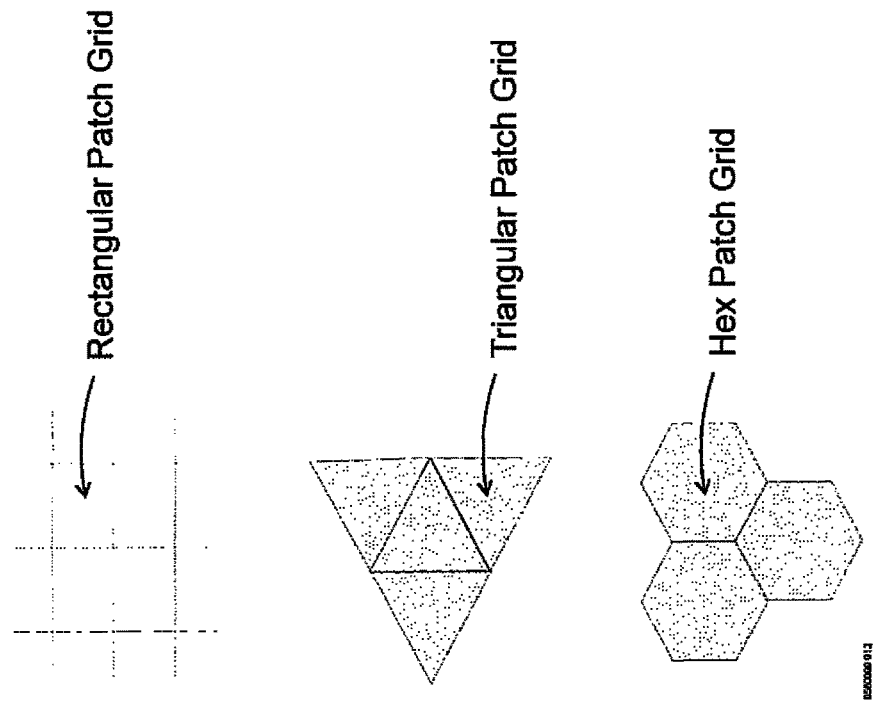
FIG. 38 shows an example of two dimensional geometrical structures for forming differential surfaces.

FIG. 38 illustrates three examples of some structures which may be used to form entropy surfaces. These structures are fit to the surface in a variety of polygonal shapes, sizes and dimensions to permit efficient computational representation of the surface. Similar structures may be conceived in higher dimension geometries but are difficult to represent graphically.

It should be understood by those skilled in the art that various modifications, combinations, sub-combinations and alterations may occur depending on design requirements and other factors insofar as they are within the scope of the appended claims or the equivalents thereof.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments.

The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems and computer program products.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. An apparatus comprising:
one or more energy sources that are encoded with information;
a control signal source that provides a plurality of control signals, the control signals include a first portion and a second portion;
a switching circuit that receives an input from one or more of the energy sources and selectively accesses one or more of the energy sources based on one or more of the first portion of control signals received from the control signal source, the switching circuit partitioning one or more of the energy sources based on the first portion of control signals and provides a switching circuit output signal based on the partitioning;
an oscillator that receives the second portion of the control signal source and provides an oscillator signal; and
a modulator that receives the oscillator signal and the switching circuit output signal and provides an information bearing function of time based on the oscillator signal and the switching circuit output signal.

2. The apparatus as claimed in claim 1, wherein the information bearing function of time is a waveform representation having desired thermodynamic efficiency properties.

3. The apparatus as claimed in claim 1, wherein the partitioning is a function of a domain or domains.

4. The apparatus as claimed in claim 1, wherein an operational state of one or more of the energy sources is modified during partitioning.

5. The apparatus as claimed in claim 1, wherein the partitioning is determined from one or more of: energy, amplitude, phase, statistic or a mixture thereof.

6. The apparatus as claimed in claim 1, wherein the information bearing function of time is a modulated RF carrier waveform with a dynamic range between approximately between 10 dB and 174 dB.

7. The apparatus as claimed in claim 1 wherein the partitioning segments the one or more energy sources into a number of partitions, the number of partitions is a function of the desired resolution as defined by:

$i \leq 2^k$ where:

i=number of partitions; and
k=desired resolution of the information bearing function of time.

8. The apparatus as claimed in claim 1, wherein the control signals coordinate at least two partition paths based on one or more parameters of the information bearing function of time.

9. The apparatus as claimed in claim 1, wherein a number of partitions equals 3.

10. The apparatus as claimed in claim 1, wherein the number of partitions is between three and six.

11. The apparatus as claimed in claim 1, wherein a number of partitions is based on an operational state of the one or more energy sources.

12. The apparatus as claimed in claim 1, wherein the information bearing function of time is an RF carrier signal.

13. The apparatus as claimed in claim 1, wherein parameters of the information bearing function of time are based on apriori information.

\* \* \* \* \*